(12) United States Patent
Newbloom et al.

(10) Patent No.: US 12,515,176 B2
(45) Date of Patent: *Jan. 6, 2026

(54) CERAMIC CATION EXCHANGE MATERIALS

(71) Applicant: Membrion, Inc., Seattle, WA (US)

(72) Inventors: Gregory Matthew Newbloom, Seattle, WA (US); Olivia Marie Lenz, Seattle, WA (US); Phillip Reaves Pickett, Bainbridge Island, WA (US); Rachel Alexis Malone, Seattle, WA (US); Stephanie Lynn Candelaria, Seattle, WA (US); Yiheng Zhang, Seattle, WA (US); Kathryn Lynn Corp, Berkeley, CA (US); Aditya Ashok Salunkhe, Seattle, WA (US); Matthew Jason Canin, Kirkland, WA (US)

(73) Assignee: Membrion, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/736,813

(22) Filed: Jun. 7, 2024

(65) Prior Publication Data

US 2024/0399318 A1   Dec. 5, 2024

Related U.S. Application Data

(63) Continuation of application No. 16/891,510, filed on Jun. 3, 2020, now Pat. No. 12,042,769.

(Continued)

(51) Int. Cl.
*B01D 53/22* (2006.01)
*B01D 67/00* (2006.01)
(Continued)

(52) U.S. Cl.
CPC ..... *B01D 69/148* (2013.01); *B01D 67/00931* (2022.08); *B01D 69/108* (2022.08);
(Continued)

(58) Field of Classification Search
CPC ............ B01D 69/148; B01D 67/00931; B01D 71/701; B01D 69/108; B01D 71/027;
(Continued)

(56) References Cited

U.S. PATENT DOCUMENTS

| | | | |
|---|---|---|---|
| 2,898,311 | A | 8/1959 | Tsunoda et al. |
| 3,887,499 | A | 6/1975 | Hodgdon |

(Continued)

FOREIGN PATENT DOCUMENTS

| | | |
|---|---|---|
| CN | 1481559 A | 3/2004 |
| CN | 102210985 A | 10/2011 |

(Continued)

OTHER PUBLICATIONS

Nagarale et al. Organic-Inorganic Hybrid Membrane: Thermally Stable Cation-Exchange Membrane Prepared by the Sol-Gel Method Macromolecules 2004, 37, 26, 10023-10030 (Year: 2004).*

(Continued)

*Primary Examiner* — Anthony R Shumate
(74) *Attorney, Agent, or Firm* — Wolf, Greenfield & Sacks, P.C.

(57) ABSTRACT

Cation exchange membranes and materials including silica-based ceramics, and associated methods, are provided. In some aspects, cation exchange membranes that include a silica-based ceramic that forms a coating on and/or within a porous support membrane are described. The cation exchange membranes and materials may have certain structural or chemical attributes (e.g., pore size/distribution, chemical functionalization) that, alone or in combination, can result in advantageous performance characteristics in (Continued)

any of a variety of applications for which selective transport of positively charged ions through membranes/materials is desired. In some embodiments, the silica-based ceramic contains relatively small pores (e.g., substantially spherical nanopores) that may contribute to some such advantageous properties. In some embodiments, the cation exchange membrane or material includes sulfonate and/or sulfonic acid groups covalently bound to the silica-based ceramic.

19 Claims, 28 Drawing Sheets

Related U.S. Application Data

(60) Provisional application No. 62/857,224, filed on Jun. 4, 2019.

(51) Int. Cl.
| | |
|---|---|
| *B01D 69/10* | (2006.01) |
| *B01D 69/14* | (2006.01) |
| *B01D 71/02* | (2006.01) |
| *B01D 71/66* | (2006.01) |
| *B01D 71/70* | (2006.01) |
| *B01D 71/78* | (2006.01) |
| *B01D 71/82* | (2006.01) |
| *C25B 9/23* | (2021.01) |
| *C25B 13/04* | (2021.01) |

(52) U.S. Cl.
CPC .......... *B01D 71/027* (2013.01); *B01D 71/66* (2013.01); *B01D 71/701* (2022.08); *B01D 71/78* (2013.01); *B01D 71/82* (2013.01); *C25B 9/23* (2021.01); *C25B 13/04* (2013.01); *B01D 2313/40* (2013.01); *B01D 2323/36* (2013.01); *B01D 2325/0281* (2022.08); *B01D 2325/12* (2013.01); *B01D 2325/14* (2013.01); *B01D 2325/42* (2013.01)

(58) Field of Classification Search
CPC ........ B01D 71/66; B01D 71/78; B01D 71/82; B01D 2325/0281; B01D 2313/40; B01D 2323/36; B01D 2325/12; C25B 9/23; C25B 13/04
See application file for complete search history.

(56) References Cited

U.S. PATENT DOCUMENTS

| | | | |
|---|---|---|---|
| 4,124,471 A * | 11/1978 | Lieb .................... | B01D 61/44 |
| | | | 423/338 |
| 4,902,402 A | 2/1990 | Pebler et al. | |
| 5,122,254 A | 6/1992 | Ammende et al. | |
| 5,210,059 A * | 5/1993 | Matturo .................... | B01J 35/59 |
| | | | 502/4 |
| 5,447,636 A | 9/1995 | Banerjee | |
| 7,923,054 B2 | 4/2011 | Dutta et al. | |
| 8,158,301 B2 | 4/2012 | Moore et al. | |
| 9,138,718 B2 * | 9/2015 | Li ............................ | C01B 3/16 |
| 9,610,548 B2 | 4/2017 | David et al. | |
| 10,124,296 B2 | 11/2018 | Pozzo et al. | |
| 10,525,417 B2 | 1/2020 | Newbloom et al. | |
| 11,198,101 B2 | 12/2021 | Newbloom et al. | |
| 12,042,769 B2 | 7/2024 | Newbloom et al. | |
| 12,087,982 B2 | 9/2024 | Newbloom et al. | |
| 2003/0222015 A1 * | 12/2003 | Oyama .................... | C01B 3/503 |
| | | | 210/488 |
| 2004/0038044 A1 * | 2/2004 | Ruldolph ............. | B01D 71/027 |
| | | | 65/395 |
| 2004/0178141 A1 | 9/2004 | Vidal-Madjar et al. | |
| 2005/0053818 A1 | 3/2005 | St-Arnaud et al. | |
| 2006/0046134 A1 | 3/2006 | Cho et al. | |
| 2007/0022877 A1 | 2/2007 | Marand et al. | |
| 2008/0264778 A1 | 10/2008 | Joshi et al. | |
| 2011/0006009 A1 | 1/2011 | Hamlin et al. | |
| 2011/0104526 A1 | 5/2011 | Boxley et al. | |
| 2011/0108218 A1 | 5/2011 | Flack | |
| 2012/0108418 A1 | 5/2012 | Nair et al. | |
| 2012/0183880 A1 | 7/2012 | Toussaint et al. | |
| 2012/0241391 A1 | 9/2012 | Carlson et al. | |
| 2013/0001197 A1 * | 1/2013 | Inoue ................ | H01L 21/31116 |
| | | | 216/67 |
| 2013/0022509 A1 * | 1/2013 | Tawarayama ........ | B01D 69/108 |
| | | | 427/535 |
| 2013/0288153 A1 | 10/2013 | Yang | |
| 2015/0151984 A1 | 6/2015 | Han et al. | |
| 2015/0235721 A1 | 8/2015 | Grandjean et al. | |
| 2016/0049658 A1 | 2/2016 | Chae et al. | |
| 2016/0296891 A1 | 10/2016 | Kong et al. | |
| 2017/0216832 A1 | 8/2017 | Takahashi et al. | |
| 2018/0117535 A1 | 5/2018 | Pozzo et al. | |
| 2018/0117536 A1 | 5/2018 | Pozzo et al. | |
| 2020/0106117 A1 | 4/2020 | Huang et al. | |
| 2020/0384421 A1 | 12/2020 | Newbloom et al. | |
| 2020/0388871 A1 | 12/2020 | Newbloom et al. | |
| 2021/0260534 A1 | 8/2021 | Newbloom et al. | |
| 2021/0277529 A1 | 9/2021 | Bhavaraju et al. | |
| 2022/0311051 A1 | 9/2022 | Saito et al. | |
| 2024/0246893 A1 * | 7/2024 | Sawamura ............ | C07C 29/152 |
| 2025/0038240 A1 | 1/2025 | Newbloom et al. | |

FOREIGN PATENT DOCUMENTS

| | | |
|---|---|---|
| CN | 102479959 A | 5/2012 |
| CN | 102983344 A | 3/2013 |
| JP | 2005-332801 A | 12/2005 |
| JP | 2007-242524 A | 9/2007 |
| JP | 2009-108114 A | 5/2009 |
| JP | 2009-181788 A | 8/2009 |
| JP | 2009-248497 A | 10/2009 |
| WO | WO 03/083985 A2 | 10/2003 |
| WO | WO 2010/031877 A1 | 3/2010 |
| WO | WO 2010/039480 A1 | 4/2010 |
| WO | WO 2017/172038 A2 | 10/2017 |
| WO | WO 2019/136272 A1 | 7/2019 |

OTHER PUBLICATIONS

Office Action for CN Application No. 202080049596.8 dated May 15, 2024.

Office Action for JP Application No. 2021-572274 dated Apr. 2, 2024.

International Search Report and Written Opinion mailed Sep. 23, 2020, for Application No. PCT/US2020/035878.

International Search Report and Written Opinion mailed Sep. 22, 2020, for Application No. PCT/US2020/035887.

[No Author Listed], About Nonwovens. INDA. Association of the Nonwoven Fabrics Industry. <https://www.india.org/about-nonwovens> [last accessed Aug. 26, 2023]: 1 page.

[No Author Listed], Definition of "gamma function". Collins Dictionary. https://www.collinsdictionary.com/us/dictionary/english/gamma-function. [last accessed Feb. 20, 2023]: 1 page.

Arkles, Tailoring Surfaces with Silanes. ChemTech. Dec. 1977;7(12):766-778.

Berezina et al., Characterization of ion-exchange membrane materials: properties vs structure. Adv Colloid Interface Sci. Jun. 22, 2008;139(1-2):3-28. doi: 10.1016/j.cis.2008.01.002. Epub Jan. 26, 2008.

Beydaghi et al., Cross-linked poly(vinyl alcohol)/sulfonated nanoporous silica hybrid membranes for proton exchange membrane fuel cell. JNC. Apr. 29, 2014;4(97):9 pages.

Buckley et al., The Sol-Gel Preparation of Silica Gels. J Chem Educ. Jul. 1, 1994;71(7):599.

Chua et al., Nanoporous organosilica membrane for water desalination. Chem Commun. Apr. 5, 2013;49(40):4534-6. Author Manuscript.

(56) References Cited

OTHER PUBLICATIONS

Daiko et al., In Situ Oxidation of Alkanethiol Groups and Proton Transfer in Nanopores of Sodium Borosilicate Glasses. J Phys Chem C. Jan. 13, 2009;113(5):1891-5.
Duan et al., Water uptake, ionic conductivity and swelling properties of anion-exchange membrane. J Power Sources. Jun. 25, 2013;243:773-8.
Galama et al., Method for determining ion exchange membrane resistance for electrodialysis systems. Desalination. Feb. 15, 2016;380:1-11.
Ganesan et al., Ion exchange and ion exchange voltammetry with functionalized mesoporous silica materials. Mater Sci Eng B. Mar. 25, 2008;149(2):123-32.
Gebel et al., Swelling study of perfluorosulphonated ionomer membranes. Polymer. 1993;34(2):333-9.
He et al., Crosslinked hydroxyl-conductive copolymer/silica composite membranes based on addition-type polynorbornene for alkaline anion exchange membrane fuel cell applications. Polym Eng Sci. Jan. 2018;58(1):13-21.
Hench et al., The sol-gel process. Chem Rev. Jan. 1, 1990;90(1):33-72.
Izquierdo-Gil et al., Water uptake and salt transport through Nafion cation-exchange membranes with different thicknesses. Chem Eng Sci. Apr. 16, 2012;72:1-9.
Kingsbury et al., Junction Potentials Bias Measurements of Ion Exchange Membrane Permselectivity. Environ Sci Technol. Mar. 15, 2018;52(8):4929-36.
Kingsbury et al., Microstructure Determines Water and Salt Permeation in Commercial Ion-Exchange Membranes. ACS Appl Mater Interfaces. Oct. 25, 2018;10(46):39745-56. Author Manuscript.
Kogure et al., Properties of new inorganic membranes prepared by metal alkoxide methods Part II: New inorganic-organic anion-exchange membranes prepared by the modified metal alkoxide methods with silane coupling agents. J Membr Sci. Apr. 2, 1997;126(1):161-9.
Lee et al., Highly flexible, proton-conductive silicate glass electrolytes for medium-temperature/low-humidity proton exchange membrane fuel cells. ACS Appl Mater Interfaces. Jun. 12, 2013;5(11):5034-43. doi: 10.1021/am400836h. Epub May 22, 2013.
Li et al., Cross-linked comb-shaped anion exchange membranes with high base stability. Chem Commun. Feb. 24, 2014;50(31):4092-5.
Liu et al., Novel quaternized mesoporous silica nanoparticle modified polysulfone-based composite anion exchange membranes for alkaline fuel cells. RSC Adv. May 1, 2015;5(54):43381-90.
Margolese et al., Direct Syntheses of Ordered SBA-15 Mesoporous Silica Containing Sulfonic Acid Groups. Chem Mater. May 15, 2000;12(8):2448-59.
Markowitz et al., Influence of Quaternary Amine Organosilane Structure on the Formation and Adsorption Properties of Surface-Imprinted Silicates. Langmuir. Oct. 2, 2001;17(22):7085-92.
Pedersen, Analysis of small-angle scattering data from colloids and polymer solutions: modeling and least-squares fitting. Adv Colloid Interface Sci. Jul. 18, 1997;70:171-210.
Reichman et al., Novel proton-exchange membrane based on single-step preparation of functionalized ceramic powder containing surface-anchored sulfonic acid. J Power Sources. May 2008;179(2):520-31.
Reinhardt, Chemical surface modification of silica nanoparticles for the labeling of DNA in lipoplexes. Material chemistry. Thesis. Université Sciences et Technologies—Bordeaux I. Jul. 24, 2013. 207 pages.
Rishi, Milliequivalents (mEq) versus Millimole (mmol). RKMD. Dec. 13, 2021. https://rk.md/2021/milliequivalents-meq-versus-millimole-mmol/ [last accessed Dec. 11, 2022]. 1 page.
Safronova et al., New cation-exchange membranes based on cross-linked sulfonated polystyrene and polyethylene for power generation systems. J Membr Sci. May 6, 2016;515:196-203.
Sata, Properties, Characterization and Microstructure of Ion Exchange Membranes. Ion Exchange Membranes: Preparation, Characterizaiton, Modification and Application. 2004;89-134. doi: https://doi.org/10.1039/9781847551177-00089.
Schubert et al., Small angle neutron scattering near Lifshitz lines: Transition from weakly structured mixtures to microemulsions. J Chem Phys. May 1994;101(6):5343-55.
Slade et al., Ionic Conductivity of an Extruded Nafion 1100 EW Series of Membranes. J Electrochem Soc. Jun. 5, 2002;149(12):A1556-64.
Smith et al., March's Advanced Organic Chemistry. John Wiley & Sons, Inc. 2007. 501-2.
Su et al., Proton exchange membranes modified with sulfonated silica nanoparticles for direct methanol fuel cells. J Membr Sci. Mar. 5, 2007;296:21-8.
Tanaka, Chapter 2 Membrane Property Measurements. Membrane Science and Technology. 2007;12:17-36. doi: https://doi.org/10.1016/S0927-5193(07)12002-7.
Teubner et al., Origin of the scattering peak in microemulsions. J Chem Phys. May 1987;87(5):3195-200.
Tripathi et al., 3-[[3-(Triethoxysilyl)propyl]amino]propane-1-sulfonic acid-poly(vinyl alcohol) cross-linked zwitterionic polymer electrolyte membranes for direct methanol fuel cell applications. ACS Appl Mater Interfaces. May 2009;1(5):1002-12. doi: 10.1021/am800228s.
Vijayakumar et al., A quaternized mesoporous silica/polysulfone composite membrane for an efficient alkaline fuel cell application. RSC Adv. May 5, 2015;5(53):42828-35.
Walcarius et al., Ion-exchange properties and electrochemical characterization of quaternary ammonium-functionalized silica microspheres obtained by the surfactant template route. Langmuir. Jan. 3, 2006;22(1):469-77. doi: 10.1021/la051916s.
Wang et al., Structure-Property Relationships in Hydroxide-Exchange Membranes with Cation Strings and High Ion-Exchange Capacity. ChemSusChem. Dec. 2, 2015;8(24):4229-34.
Wong et al., Preparation of Quaternary Ammonium Organosilane Functionalized Mesoporous Thin Films. Langmuir. Jan. 15, 2002;18(4):972-4.
Xu et al., Ion exchange membranes: State of their development and perspective. J Membr Sci. Oct. 15, 2005;263(1-2):1-29.
Yang et al., Fabrication of photocured anion-exchange membranes using water-soluble siloxane resins as cross-linking agents and their application in reverse electrodialysis. J Membr Sci. Mar. 1, 2019;573:544-53. Author Manuscript.
Yarrow et al., The impact of pre-swelling on the conductivity and stability of Nafion/sulfonated silica composite membranes. J Therm Anal Calorim. Dec. 10, 2013;119:807-14.
Zemb et al., Neutron, X-rays and Light. Scattering Methods Applied to Soft Condensed Matter. North Holland. Oct. 30, 2002. 552 pages.
Zhu, Industrial Water Supply Treatment. Tongji University Press. Sep. 30, 2016:262.

* cited by examiner

CERAMIC CATION EXCHANGE MATERIALS

RELATED APPLICATIONS

This application is a continuation of U.S. patent application Ser. No. 16/891,510, filed Jun. 3, 2020, and entitled "CERAMIC CATION EXCHANGE MATERIALS," which claims priority under 35 U.S.C. § 119(e) to U.S. Provisional Patent Application Ser. No. 62/857,224, filed Jun. 4, 2019, and entitled "CERAMIC CATION EXCHANGE MATERIALS," each of which is incorporated herein by reference in its entirety for all purposes.

GOVERNMENT SPONSORSHIP

This invention was made with Government support under Contract No. DE-SC0019554 awarded by the U.S. Department of Energy. The Government has certain rights in the invention.

TECHNICAL FIELD

Ion exchange membranes and materials, and associated methods, are generally described.

BACKGROUND

Cation exchange membranes and materials are used in a variety of industrial applications where the selective transport of positively charged ions is desired. In the case of cation exchange membranes, positively charged ions can be selectively transported through the membrane cross-section. One type of cation exchange membrane is a proton exchange membrane, though cation exchange membranes capable of the selective transport of other types of positively charged ions exist. Certain embodiments of the present disclosure are directed to inventive compositions, membranes, and materials, and related methods, for improving the performance and/or properties of cation exchange membranes and materials.

SUMMARY

Cation exchange membranes and materials including silica-based ceramics, and associated methods, are generally described. The subject matter of the present invention involves, in some cases, interrelated products, alternative solutions to a particular problem, and/or a plurality of different uses of one or more systems and/or articles.

In one aspect, cation exchange membranes are provided. In some embodiments, the cation exchange membrane comprises a porous support membrane and a silica-based ceramic that forms a coating on and/or within the porous support membrane. The silica-based ceramic comprises sulfonate and/or sulfonic acid groups covalently bound to the silica-based ceramic. The cation exchange membrane has a sodium ion ($Na^+$) conductivity of greater than or equal to 0.00001 S/cm.

In some embodiments, the cation exchange membrane comprises a silica-based ceramic, and the cation exchange membrane has a water uptake of greater than or equal to 10 wt % and a linear expansion of less than or equal to 10%.

In some embodiments, the cation exchange membrane comprises a porous support membrane and a silica-based ceramic that coats at least a portion of the porous support membrane. The silica-based ceramic comprises sulfonate and/or sulfonic acid groups covalently bound to the silica-based ceramic. The silica-based ceramic has an average pore diameter of less than or equal to 10 nm.

In some embodiments, the cation exchange membrane comprises a porous support membrane and a silica-based ceramic that forms a coating on and/or within the porous support membrane. The silica-based ceramic comprises sulfonate and/or sulfonic acid groups covalently bound to the silica-based ceramic. The sulfonate and/or sulfonic acid groups are substantially homogeneously distributed within the silica-based ceramic across a thickness of the coating.

In some embodiments, the cation exchange membrane comprises a porous support membrane and a silica-based ceramic that forms a coating on and/or within the porous support membrane. The silica-based ceramic comprises sulfonate and/or sulfonic acid groups covalently bound to the silica-based ceramic. The sulfonate and/or sulfonic acid groups are directly adjacent to a surface of the porous support membrane. The cation exchange membrane comprises an edging material comprising a polymeric material along at least a portion of an edge of the cation exchange membrane.

In some embodiments, the cation exchange membrane comprises a porous support membrane and a silica-based ceramic that coats at least a portion of the porous support membrane. The silica-based ceramic comprises sulfonate and/or sulfonic acid groups covalently bound to the silica-based ceramic. Greater than or equal to 50% of the pore volume of the porous support membrane is filled by the silica-based ceramic. The cation exchange membrane comprises an edging material comprising a polymeric material along at least a portion of an edge of the cation exchange membrane.

In some embodiments, the cation exchange membrane comprises a porous support membrane and a silica-based ceramic that forms a coating on and/or within the porous support membrane. The silica-based ceramic comprises sulfonate and/or sulfonic acid groups covalently bound to the silica-based ceramic. The cation exchange membrane has a cation exchange capacity of greater than or equal to 0.01 meq/g.

In some embodiments, the cation exchange membrane comprises a porous support membrane and a silica-based ceramic that coats at least a portion of the porous support membrane. The silica-based ceramic comprises sulfonate and/or sulfonic acid groups covalently bound to the silica-based ceramic. The sulfonate and/or sulfonic acid groups are present in the cation exchange membrane in an amount of greater than or equal to 0.01 mmol per gram of the cation exchange membrane.

In some embodiments, a cation exchange material is provided. The cation exchange material comprises a silica-based ceramic that comprises sulfonate and/or sulfonic acid groups covalently bound to the silica-based ceramic. The silica-based ceramic comprises Si in an amount greater than or equal to 6 wt % of the silica-based ceramic. The cation exchange material has a cation exchange capacity of greater than or equal to 0.01 meq/g. The silica-based ceramic has an average pore diameter of less than 10 nm.

In some embodiments, a cation exchange membrane is provided. The cation exchange membrane comprises a silica-based ceramic comprising Si in an amount greater than or equal to 6 wt % of the silica-based ceramic. The cation exchange membrane has a cation exchange capacity of greater than or equal to 0.01 meq/g.

In some embodiments, the cation exchange membrane comprises a silica-based ceramic. The cation exchange membrane has a cation exchange capacity of greater than or equal to 0.01 meq/g and a linear expansion of less than or equal to 10%.

In some embodiments, a cation exchange membrane is provided. The cation exchange membrane comprises a silica-based ceramic comprising Si in an amount greater than or equal to 6 wt % of the silica-based ceramic. The cation exchange membrane has a cation permselectivity of greater than or equal to 65%.

In some embodiments, a cation exchange membrane is provided. The cation exchange membrane comprises a silica-based ceramic comprising Si in an amount greater than or equal to 6 wt % of the silica-based ceramic. The cation exchange membrane has a sodium ion ($Na^+$) conductivity of greater than or equal to 0.00001 S/cm.

In some embodiments, the cation exchange membrane has a silica-based ceramic and a $Na^+$ conductivity of greater than or equal to 0.00001 S/cm and a linear expansion of less than or equal to 10%.

In some embodiments, a cation exchange membrane is provided. The cation exchange membrane comprises a silica-based ceramic comprising Si in an amount greater than or equal to 6 wt % of the silica-based ceramic. The cation exchange membrane has an osmotic water permeance of less than or equal to 100 mL/(hr·bar·m$^2$).

In some embodiments, the cation exchange membrane comprises a silica-based ceramic comprising Si in an amount greater than or equal to 6 wt % of the silica-based ceramic. The silica-based ceramic comprises pores, wherein an average diameter of the pores of the silica-based ceramic is larger when the cation exchange membrane is in a hydrated state than when the cation exchange membrane is in a dry state by a factor of greater than or equal to 1.1.

In some embodiments, the cation exchange membrane comprises a silica-based ceramic comprising Si in an amount greater than or equal to 6 wt % of the silica-based ceramic. When the cation exchange membrane is in a dry state, the pores of the silica-based ceramic fit a model of small angle scattering spectra with intensity (I) as a function of a scattering vector, q, as follows:

$$I(q) = \frac{1}{a + c_1 q^2 + c_2 q^4} + bck,$$

wherein a, $c_1$, and $c_2$ are adjustable parameters and bck is background scattering; and when the cation exchange membrane is in a hydrated state the pores of the silica-based ceramic fit a core-shell model of small angle scattering spectra with intensity (I) as a function of a scattering vector, q, as follows:

$$I(q) = P(q)S(q) + bck,$$

$$S(q) = 1 + \frac{D_f \Gamma(D_f - 1)}{[1 + 1/q\xi)^2]^{(D_f-1)/2}} \frac{\sin[(D_f - 1)\tan^{-1}(q\xi)]}{(qR_0)^{D_f}},$$

$$P(q) = \frac{scale}{V_s} \left[ 3V_c(\rho_c - \rho_s) \frac{[\sin(qr_c) - qr_c \cos(qr_c)]}{(qr_c)^3} + 3V_s(\rho_s - \rho_{block}) \frac{[\sin(qr_s) - qr_s \cos(qr_s)]}{(qr_s)^3} \right]^2 + bck,$$

wherein $R_o$ is a radius of the building blocks (pores), $\rho_{solvent}$ is a scattering length density of the silica-based ceramic, $D_f$ is a fractal dimension, $\xi$ is a correlation length, $\Gamma$ is the standard mathematical gamma function, scale is a volume fraction of building blocks of the measured silica-based ceramic, $V_c$ is a volume of the core, $V_s$ is a volume of the shell, $\rho_c$ is a scattering length density of the core, $\rho_s$ is a scattering length density of the shell, $\rho_{block}$ is a scattering length density of the pores, $r_c$ is a radius of the core, $r_s$ is a radius of the shell, and bck is background scattering.

In one aspect, a method for forming a cation exchange membrane is provided. In some embodiments, the method comprises exposing a porous support membrane, coated with a silica-based ceramic comprising an oxidizable functional group, to an oxidizing agent. The silica-based ceramic comprises Si in an amount greater than or equal to 6 wt % of the silica-based ceramic. The method comprises oxidizing the oxidizable functional group to form a sulfonate or sulfonic acid group.

In one aspect, a method for forming a cation exchange material is provided. In some embodiments, the method comprises exposing resin comprising a silica-based ceramic comprising an oxidizable functional group, to an oxidizing agent. The silica-based ceramic comprises Si in an amount greater than or equal to 6 wt % of the silica-based ceramic. The method comprises oxidizing the oxidizable functional group to form a sulfonate or sulfonic acid group.

In some embodiments, a method for using a cation exchange membrane described herein in an electrochemical application is provided. The method comprises contacting the cation exchange membrane with an electrolyte. The method comprises passing current through an electrode in electrical communication with the electrolyte.

In some embodiments, a method for using a cation exchange material described herein in an electrochemical application is provided. The method comprises contacting the cation exchange material with an electrolyte. The method comprises passing current through an electrode in electrical communication with the electrolyte.

In some embodiments, a method for using a cation exchange membrane described herein as an adsorbent material is provided. The method comprises flowing a fluid through the cation exchange membrane. The method comprises adsorbing a component of the fluid.

In some embodiments, a method for using a cation exchange material described herein as an adsorbent material is provided. The method comprises flowing a fluid through the cation exchange material. The method comprises adsorbing a component of the fluid.

In some embodiments, a method for using a cation exchange membrane described herein in a separation application is provided. The method comprises applying a transmembrane pressure to the cation exchange membrane.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
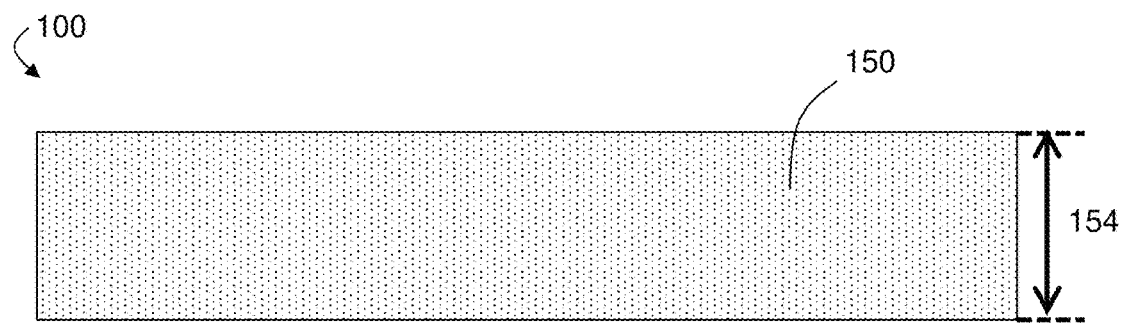
FIG. 1A is a schematic cross-sectional illustration of an exemplary cation exchange membrane comprising a silica-based ceramic, according to some embodiments.

Cation exchange membranes and materials including silica-based ceramics, and associated methods, are provided. In some aspects, cation exchange membranes that include a silica-based ceramic that forms a coating on and/or within a porous support membrane are described. The cation exchange membranes and materials may have certain structural or chemical attributes (e.g., pore size/distribution, chemical functionalization) that, alone or in combination, can result in advantageous performance characteristics in any of a variety of applications for which selective transport of positively charged ions through membranes/materials is desired. For example, the cation exchange membranes or materials described herein may display relatively high cation exchange capacity, cation conductivity, cation permselectivity, and/or mechanical burst strength, while in some cases also undergoing relatively low dimensional swelling (e.g., when in contact with water). In some embodiments, the silica-based ceramic contains relatively small pores (e.g., substantially spherical nanopores) that may contribute to some such advantageous properties.

In some embodiments, the cation exchange membrane or material includes sulfonate and/or sulfonic acid groups covalently bound to the silica-based ceramic. In some such cases, the sulfonate and/or sulfonic acid groups are present in relatively high loadings compared to certain existing cation exchange materials. In some embodiments, the sulfonate and/or sulfonic acid groups are substantially homogeneously distributed within the silica-based ceramic across a thickness of a coating formed by the silica-based ceramic, which can, in some cases, lead to benefits over certain existing membranes that may be functionalized only at or near the surface.

In some embodiments, the cation exchange membranes and materials described herein can be produced via sol-gel techniques, such as via the co-condensation of certain silanes on porous support membranes. The cation exchange membranes and materials may be useful in a number of applications, such as electrochemical (e.g., redox flow battery) and purification (e.g., desalination, gas/liquid separation) processes.

Certain existing cation exchange membranes that are commercially available are made from hydrocarbon- or perfluorocarbon-based polymers containing covalently bound sulfonate and/or sulfonic acid moieties. As a result, these cation exchange membranes have nanostructures characterized by a mixture of interconnected worm-like hydrophilic domains in a hydrophobic matrix. In the presence of water (e.g., when certain existing cation exchange membranes are in use), these hydrophilic domains tend to swell (e.g., undergo dimensional swelling such as linear expansion). Swelling of cation exchange membranes can be problematic in certain applications, because the swelling can cause tensile forces that can lead to tearing of the membrane and device failure. While certain techniques such as chemical cross-linking and/or mechanical reinforcement of the membrane can sometimes reduce swelling, improved compositions and architectures that can more effectively reduce swelling while preserving or even enhancing the performance of cation exchange membranes and materials are needed.

It has been observed that cation exchange membranes that include rigid structures such as ceramics can undergo less swelling than hydrocarbon- or perfluorocarbon-based membranes. However, certain existing ceramics have been considered too brittle to be used in standalone ceramic-based membranes. Therefore, previous attempts at introducing ceramics into cation exchange membranes have typically involved incorporation of ceramic nanoparticles into, for example, polymer matrices. In the context of the present disclosure, it has been unexpectedly observed that it is possible to achieve cation exchange membranes and materials that include silica-based ceramics without needing to resort to using nanoparticles incorporated into polymeric matrices. For example, it has been observed that cation exchange membranes containing silica-based ceramics comprising functional groups such as sulfonate and/or sulfonic acid group that are covalently bound to the silica-based ceramic are achievable. In some embodiments, such functionalized silica-based ceramic compositions can have ordered, nanoporous structures. In some embodiments, the resulting cation exchange membranes display unexpectedly beneficial performance characteristics (e.g., relatively high cation exchange capacity, relatively high sodium ion conductivity, relatively high permselectivity, high mechanical burst strength), while displaying relatively low dimensional swelling. Such cation exchange membranes and materials, and methods for making and using them, are described herein.

In one aspect, cation exchange membranes are generally described. FIG. 1A is a schematic cross-sectional illustration of an exemplary cation exchange membrane 100. In some embodiments, the cation exchange membrane can realize any of a variety of advantageous properties and performance characteristics reported in the present disclosure. For example, cation exchange membrane 100 may display a relatively high cation exchange capacity, relatively high cation permselectivity, relatively high sodium ion conductivity, relatively low osmotic water permeance, and/or relatively low dimensional swelling (e.g., relatively low linear expansion), the details of which are provided in greater detail below. As mentioned above, the cation exchange membrane may be suitable for use in any of a variety of applications, described in more detail below.

Figure 1B:
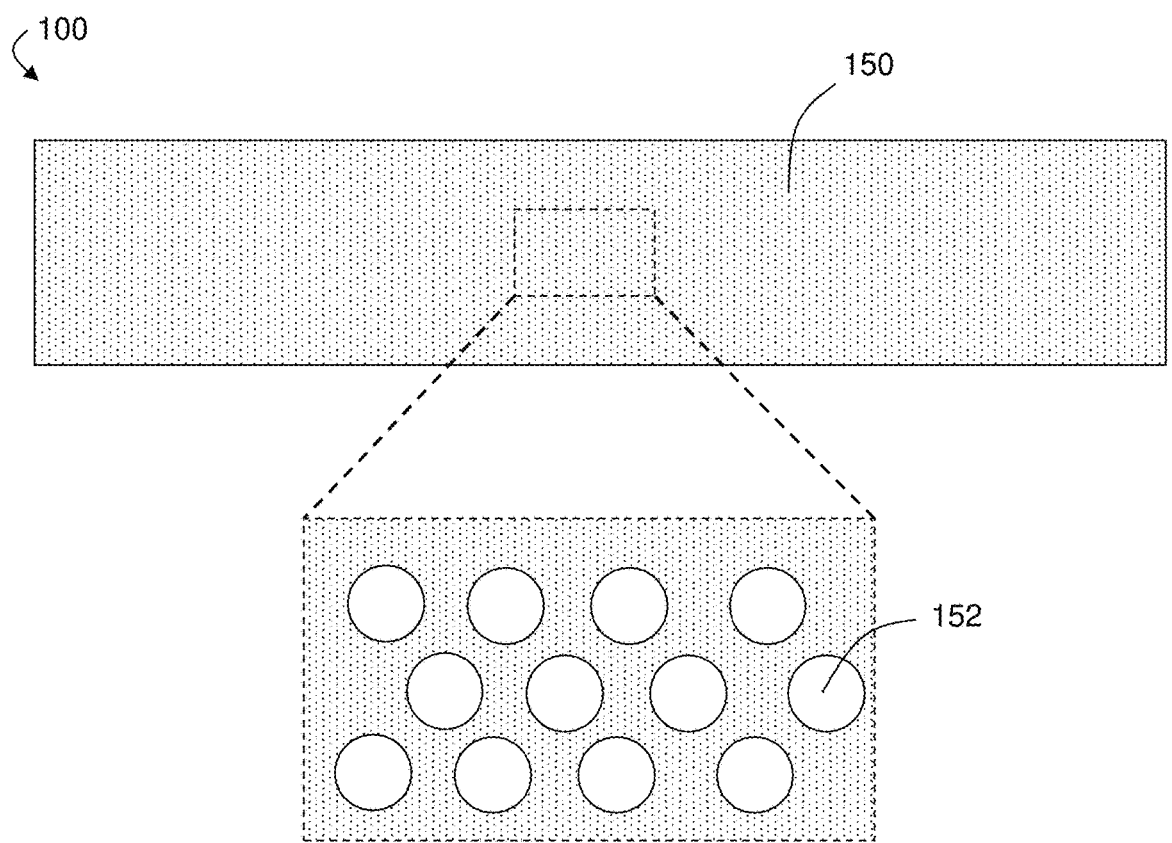
FIG. 1B is a schematic cross-sectional illustration of an exemplary cation exchange membrane comprising a silica-based ceramic, and an inset showing a zoomed in view of pores of the silica-based ceramic, according to some embodiments.

Referring again to FIG. 1A, exemplary cation exchange membrane 100 comprises silica-based ceramic 150. In some embodiments, the silica-based ceramic is a ceramic comprising or formed of a network of silica ($SiO_2$), though the silica-based ceramic can include groups (e.g., terminal moieties) not encompassed by the $SiO_2$ formula. In some embodiments, the silica-based ceramic is porous (e.g., nanoporous). FIG. 1B is a schematic cross-sectional illustration of an exemplary cation exchange membrane 100 comprising an exemplary silica-based ceramic 150 that is porous (e.g., nanoporous), according to some embodiments. FIG. 1B shows an inset depicting a zoomed-in view of silica-based ceramic 150 showing exemplary pores, including an exemplary pore 152. The porosity (e.g., nanoporosity) of the silica-based ceramic may contribute, at least in part, to the performance characteristics of the cation exchange membrane. The silica-based ceramic is described in more detail below. It should be understood that the figures shown herein are for illustrative purposes, and may not necessarily be drawn to scale.

Figure 2A:
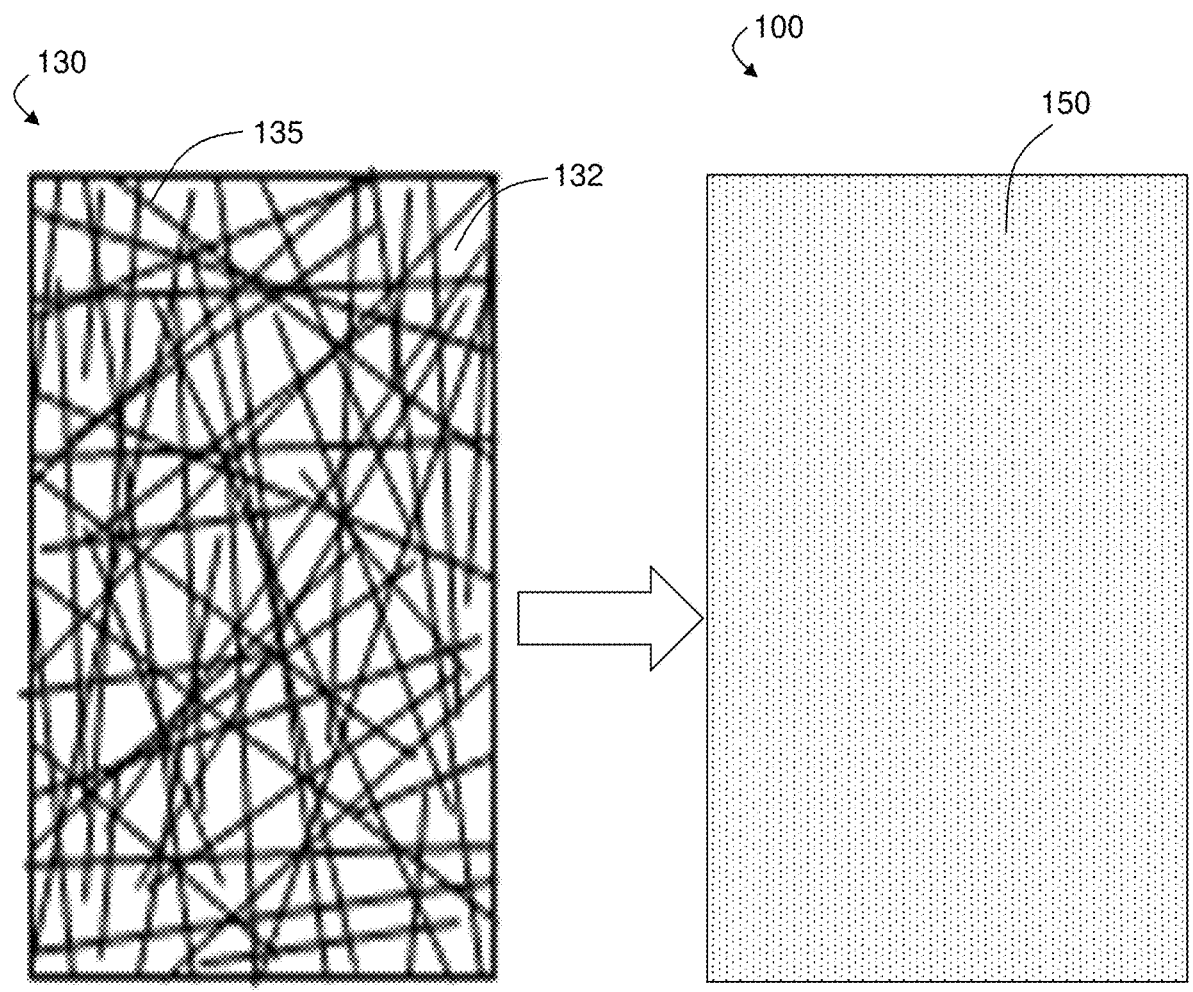
FIG. 2A is a schematic top-down illustration of an exemplary cation exchange membrane comprising a silica-based ceramic and a porous support membrane, according to some embodiments.

In some embodiments, the cation exchange membrane comprises a porous support membrane. For example, in some embodiments, cation exchange membrane 100 comprises a porous support membrane. The porous support membrane may provide for mechanical support for the overall cation exchange membrane. FIG. 2A shows a schematic top-down illustration of an exemplary cation exchange membrane 100 comprising a silica-based ceramic 150 and a porous support membrane 130 hidden by silica-based ceramic 150, according to some embodiments. For illustrative purposes, FIG. 2A shows porous support membrane 130 without a silica-based ceramic 150 present to the left of the arrow, while cation exchange membrane 100 to the right side of the arrow includes silica-based ceramic 150 present, which hides porous support membrane from view. It should be understood that FIG. 2A is illustrative for a non-limiting embodiment, and in some embodiments, the coating formed by the silica-based ceramic does not completely cover the porous support membrane. For example, in some such embodiments, portions of porous support membrane 130 may not be hidden by silica-based ceramic 150.

In some embodiments, the cation exchange membrane comprises a silica-based ceramic that coats at least a portion of the porous support membrane. Referring again to FIG. 2A, cation exchange membrane 100 comprises silica-based ceramic 150, which coats porous support membrane 130 (hidden from view in cation exchange membrane 100 to the right of the arrow). In some such embodiments, the silica-based ceramic forms a coating on and/or within the porous support membrane. For example, the porous support membrane may be impregnated or encapsulated in the silica-based ceramic. In such embodiments, the porous support membrane may be substantially coated with the silica-based ceramic. In some embodiments, the silica-based ceramic coats a portion, but not all, of the porous support membrane.

Figure 2B:
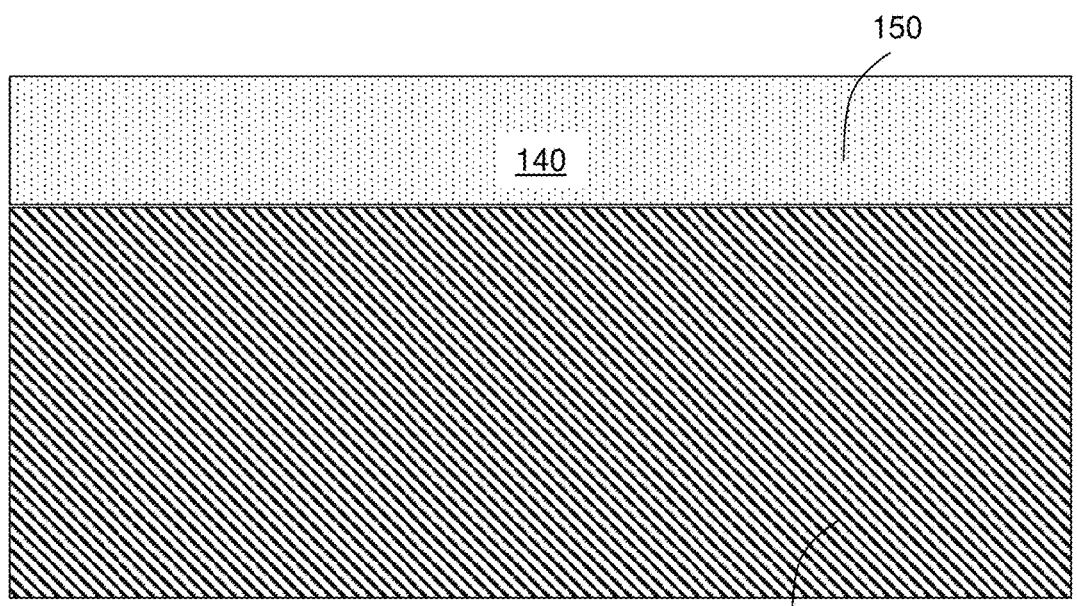
FIG. 2B is a schematic cross-sectional illustration of an exemplary silica-based ceramic coating on a portion of a porous support membrane component, according to some embodiments.

FIG. 2B shows a schematic cross-sectional view of an exemplary coating 140 formed by silica-based ceramic 150, according to some embodiments. As shown illustratively in this figure, coating 140 of silica-based ceramic 150 is on a surface of porous support membrane component 135 (e.g., a single fiber on or within a porous support membrane), a cross-section of which is shown in FIG. 2B, in accordance with some embodiments. This exemplary embodiment (e.g., a coated fiber) may be a part of a cation exchange membrane in which a silica-based ceramic coats the porous support membrane completely, or coats a porous support membrane partially.

It should be understood that when a portion (e.g., layer, coating,) is "on", "adjacent", "in contact with", or "supported by" another portion, it can be directly on the portion, or an intervening portion (e.g., layer, coating) also may be present. A portion that is "directly on", "directly adjacent", "in direct contact with", or "directly supported by" another portion means that no intervening portion is present. It should also be understood that when a portion is referred to as being "on", "adjacent", "in contact with", or "supported by" another portion, it may cover the entire portion or a part of the portion.

In some embodiments, the coating of the silica-based ceramic (e.g., coating 140) is present on (e.g., directly on) the surface of the porous support membrane. In some embodiments, the coating is present on the surface of the porous support membrane while the interior of the porous support membrane is not substantially coated. However, in other embodiments, the coating of the silica-based ceramic is present within at least a portion of the interior of the porous support membrane (i.e., through the thickness of the porous support membrane). As one example, the coating of the silica-based ceramic is formed on components in the interior of the porous support membrane accessible via, for example, pores or voids. In some such cases, the coating fills at least a portion or all of the pores of the porous support membrane. In some embodiments, at least a portion of the interior of the porous support membrane is coated, while the surface of the porous support membrane is not substantially coated.

As described in more detail below, the porous support membrane may include support components such as fibers that provide structural support to the membrane. In some embodiments, substantially all of the support components of the porous support membrane are coated with the silica-based ceramic. As one example, in some embodiments, the porous support membrane comprises a non-woven fabric of fibers. In some such cases, substantially all of the fibers, including fibers in the interior of the porous support membrane, are coated with the silica-based ceramic. However, in other embodiments, not all of the support components of the porous support membrane are coated with the silica-based ceramic. For example, in some embodiments in which the porous support membrane comprises fibers as support components, not all fibers are coated with a silica-based ceramic. The extent of the coating may vary. In some cases, the coating of the silica-based ceramic covers the entire porous support membrane (e.g., as shown with cation exchange membrane 100 to the right of the arrow in FIG. 2A), though in other cases, the coating of the silica-based ceramic covers only a portion of the porous support membrane (e.g., only a subset of the area of the porous support membrane is coated, or only a portion of the support components are coated).

In some embodiments in which the silica-based ceramic forms a coating on and/or within the porous support membrane, the silica-based ceramic fills substantially all of the pores of the porous support membrane. For example, referring again to FIG. 2A, in some embodiments, when the silica-based ceramic coats porous support membrane 130, all of the pores of porous support membrane 130, including pore 132, are completely filled by the silica-based ceramic. In such embodiments, the porosity of the resulting overall cation exchange membrane would correspond to the porosity of the silica-based ceramic material. In other embodiments in which the silica-based ceramic forms a coating on and/or within the porous support membrane, the silica-based ceramic does not completely fill the pores of the porous support membrane, but reduces the pore size (e.g., average pore diameter) of the porous support membrane. In such embodiments, the overall porosity of the resulting overall cation exchange membrane would be different than the porosity of the silica-based ceramic material itself. The resulting overall exchange membrane in this case will have a porosity that is different than the porosity of the silica-based ceramic coating because both the reduced-in-size pores of the porous support membrane and the pores corresponding to the silica-based ceramic will be present. In such embodiments, the silica-based ceramic coating may have a porosity in one or more of the ranges described herein, and the overall cation exchange membrane may have a porosity in one or more of the ranges described herein.

In some, but not necessarily all embodiments, the cation exchange membrane comprises one or more additional layers or coatings on the coating comprising the silica-based ceramic (e.g., on top of the silica-based ceramic coating). However, in some embodiments, no other layers or coatings are present on the coating comprising the silica-based ceramic (e.g., the silica-based coating forms the outer-most surface of the cation exchange membrane). In some embodiments, the silica-based ceramic forms a single layer on the porous support membrane.

The formation of a coating of the silica-based ceramic on and/or within at least a portion of the porous support membrane can be accomplished using any of a variety of suitable techniques. In some embodiments, the coating of the silica-based ceramic (e.g., coating 140) is formed using sol-gel techniques. For example, referring back to FIG. 2A, in some embodiments, porous support membrane 130 (shown to the left of the arrow) is coated using sol-gel techniques, thereby resulting in cation exchange membrane 100 comprising a silica-based ceramic 150 coated on and/or within at least a portion of porous support membrane 130 (shown to the right of the arrow). In some cases, sol-gel techniques such as those described herein can provide for a relatively rapid and inexpensive formation of cation exchange membranes comprising silica-based ceramics. In some such cases, relatively mild conditions can be used to form the coating of the silica-based ceramic using sol-gel techniques, and the resulting silica-based ceramics may possess certain structural properties (e.g., ordered nanopores) that can in some cases provide for advantageous performance. Exemplary sol-gel techniques are described in more detail below.

In some embodiments, the silica-based ceramic comprises one or more functional groups covalently bound to the silica-based ceramic. The presence of functional groups covalently bound to the silica-based ceramic may contribute at least in part to the performance of the cation exchange membrane. For example, in some embodiments, the silica-based ceramic comprises functional groups capable of associating and disassociating cations. In some embodiments, the functional groups covalently bound to the silica-based ceramic are acid-base functional groups. For example, in some embodiments, the functional groups covalently bound to the silica-based ceramic are sulfonate ($-SO_3^-$) and/or sulfonic acid ($-SO_3H$) groups. In some embodiments, the functional groups covalently bound to the silica-based ceramic are carboxylate and/or carboxylic acid groups. In some embodiments, the functional groups covalently bound to the silica-based ceramic are phosphonate and/or phosphonic acid groups. The functional groups may be bound to Si in the silica-based ceramic via a linking group (e.g., an organic linking group). For example, the sulfur of the sulfonate and/or sulfonic acid groups may be covalently bound to Si in the silica-based ceramic via an organic linker such as a linker chosen from optionally-substituted $C_{1-18}$ alkylene and arylene (or $C_{1-8}$ alkylene and arylene, or $C_{1-4}$ alkylene and arylene). It should be understood that in the present disclosure, any description of an item being "chosen from" a list of items can be replaced with a description of an item being selected from a "group consisting of" those items. For example, in some embodiments, the sulfur of the sulfonate and/or sulfonic acid groups may be covalently bound to Si in the silica-based ceramic via an organic linker such as a linker selected from the group consisting of optionally-substituted $C_{1-18}$ alkylene and arylene.

The functional group may be able to associate and dissociate cations such as protons or certain metal ions. As an example, sulfonate and/or sulfonic acid groups bound to the silica-based ceramic may be able to associate and disassociate cations such as protons or certain metal cations. Exemplary metal cations that may be able to associate and dissociate with the functional groups (e.g., sulfonate/sulfonic acid groups) include alkali cations (e.g., $Li^+$, $Na^+$, $K^+$), alkaline earth metal cations (e.g., $Mg^{2+}$, $Ca^{2+}$, $Sr^{2+}$), and transition metal cations (e.g., $Fe^{3+}$, $Fe^{2+}$, $Cu^{2+}$, $Cr^{2+}$, $Cr^{3+}$) and other metal or metalloid cations (e.g., $Pb^{2+}$, $Hg^{2+}$, $As^{3+}$).

Figure 3:
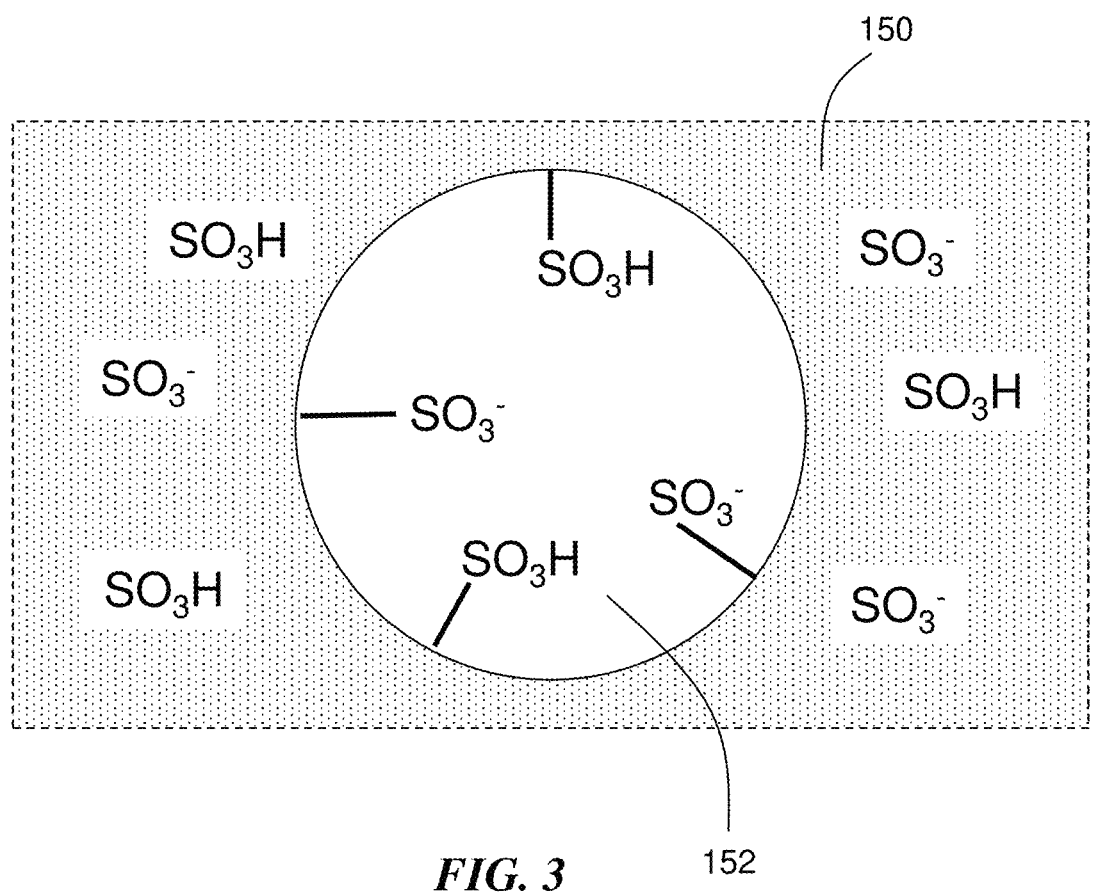
FIG. 3 is a schematic illustration of sulfonate and sulfonic acid groups covalently bound to silica-based ceramic, according to some embodiments.

FIG. 3 is a schematic illustration of sulfonate and sulfonic acid groups covalently bound to a silica-based ceramic 150, according to some embodiments. As shown illustratively in this figure, the sulfonate and sulfonic acid groups are covalently attached to the interior portions of the silica-based ceramic material. In some embodiments, the functional groups (e.g., sulfonate and/or sulfonic acid groups) are exposed at an exterior surface of the silica-based ceramic (e.g., the exterior of a coating of the silica-based ceramic). In some cases, the functional groups covalently bound to the silica-based ceramic groups (e.g., sulfonate and/or sulfonic acid groups) are exposed at surfaces of pores in the silica-based ceramic. For example, in FIG. 3, sulfonate and sulfonic acid groups covalently bound to silica-based ceramic 150 are shown exposed at a surface of a pore 152 of the silica-based ceramic. Having functional groups such as sulfonate and/or sulfonic acid groups present at the surface of pores of the silica-based ceramic may, in some embodiments, allow for relatively efficient transport of cations through the cation exchange membrane, and/or relatively high cation exchange capacity for the cation exchange membrane.

It should be understood that while both sulfonate and sulfonic acid groups are shown in figures in the present disclosure, a person of skill in the art would understand that the relative amount of sulfonate versus sulfonic acid groups present at any given time will depend on the conditions and environment of the cation exchange membrane or material. For example, the relative number of sulfonate versus sulfonic acid groups will depend at least in part on the pH of any solution with which the membrane or material is in contact, the $pK_a$ of other functional groups if present, and/or the concentration of cations in any solution for which the membrane or material is in contact.

Figure 4A:
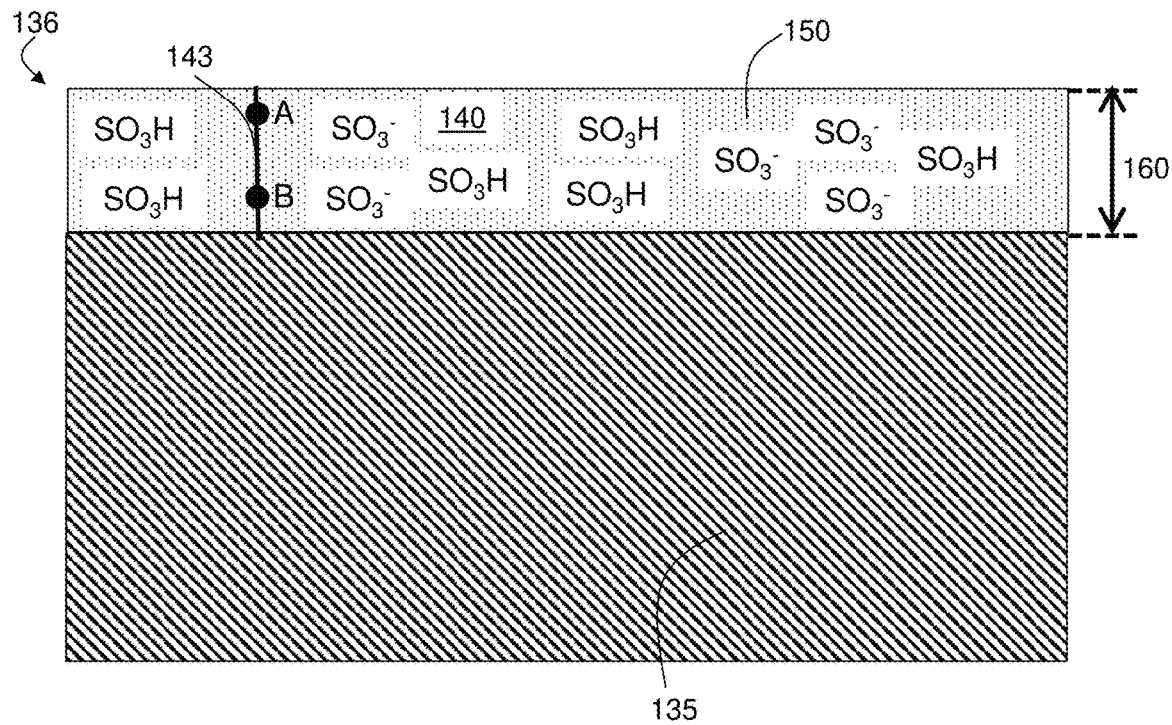
FIG. 4A is a schematic cross-sectional illustration of an exemplary silica-based ceramic coating on a portion of a porous support membrane component, where the coating comprises sulfonate and sulfonic acid groups that are substantially homogeneously distributed within the silica-based ceramic across a thickness of the coating, according to some embodiments.

In some embodiments, the silica-based ceramic comprises sulfonate and/or sulfonic acid groups covalently bound to silica-based ceramic, and the sulfonate and/or sulfonic acid groups are substantially homogeneously distributed within the silica-based ceramic across a thickness of the coating. A thickness of the coating refers to a thickness in a direction going from a surface of the component of the porous support membrane coated by the coating (e.g., the surface of a single fiber of the porous support membrane) to the closest exposed surface of the silica-based ceramic coating. An exposed surface of the silica-based ceramic coating refers to any surface of the silica-based ceramic that interfaces with the exterior of the cation exchange membrane, another layer or domain of material, or an unfilled pore or void of the porous support membrane. For example, in one embodiment, an exposed surface may be exposed to air or another environment different from the silica-based ceramic coating itself. FIG. 4A is a schematic cross-sectional illustration of an exemplary coating 140 of a silica-based ceramic 150 on a portion of a porous support membrane component 135 (e.g., a fiber on or within a porous support membrane), according to some embodiments. In some embodiments, coating 140 in FIG. 4A comprises sulfonate and sulfonic acid groups that are substantially homogeneously distributed within silica-based ceramic 150 across a thickness 160 of coating 140. Having functional groups such as sulfonate and/or sulfonic acid groups substantially homogeneously distributed within the silica-based ceramic across a thickness of the coating may, in some cases, result in a number of advantages. One advantage may be that a substantially homogeneous distribution of functional groups in the silica-based ceramic can allow for a relatively high loading of the functional groups for a given amount of silica-based ceramic, which can lead to high cation exchange capacities per unit mass, and beneficial performance characteristics. Another possible advantage is that a substantially homogeneous distribution of functional groups in the silica-based ceramic can result in relatively small distances between functional groups within the membrane, as opposed to certain existing membranes where functional groups (e.g., sulfonate and/or sulfonic acid groups) are relatively localized (e.g., near a surface), which can result in regions of the membrane having a relatively low amount of the functional groups and can limit cation conductivity. A substantially homogeneous distribution of functional groups (e.g., sulfonate and/or sulfonic acid groups) can be achieved, for example, using certain sol-gel techniques, as described in more detail below.

Figure 4B:
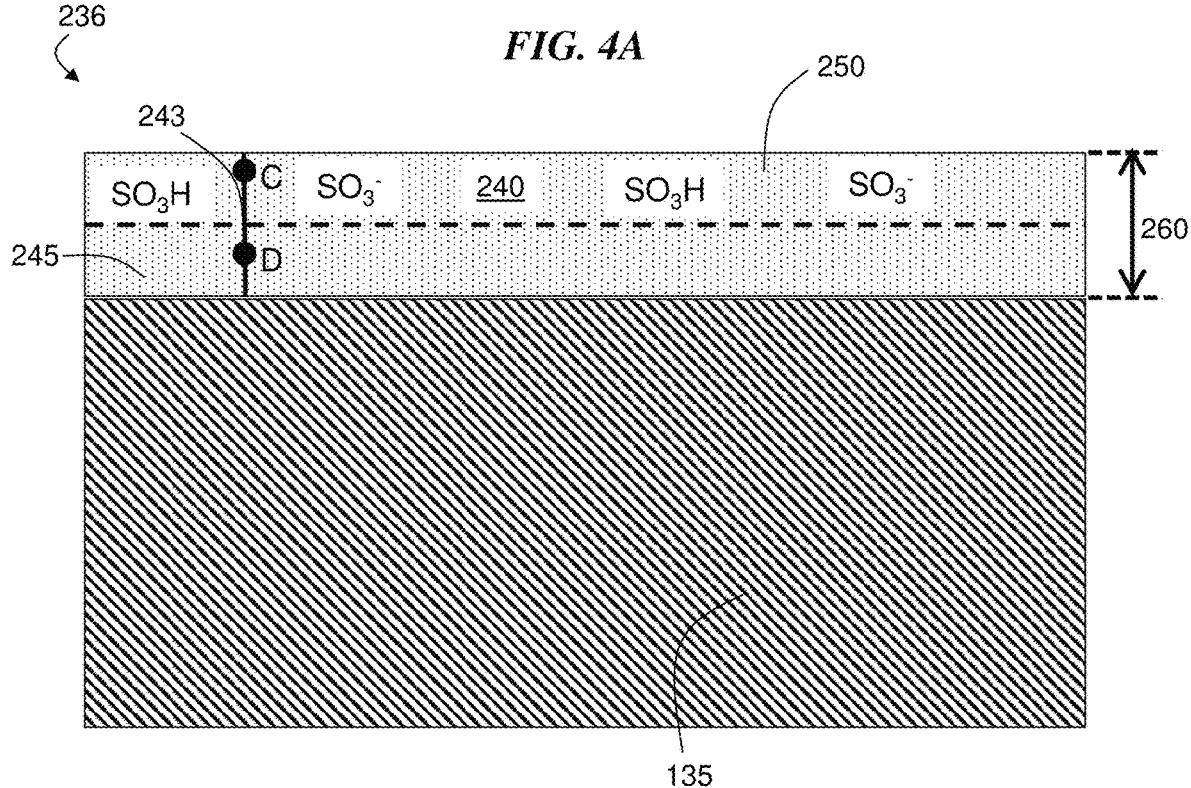
FIG. 4B is a schematic cross-sectional illustration of an exemplary silica-based ceramic coating on a portion of a porous support membrane component, where the coating comprises sulfonic acid groups that are not substantially homogeneously distributed within the silica-based ceramic across a thickness of the coating, according to some embodiments.

FIG. 4B is a schematic cross-sectional illustration of an exemplary coating 240 comprising a silica-based ceramic 250 on a portion of a porous support membrane component 135 (e.g., a fiber on or within a porous support membrane), according to some embodiments. In FIG. 4B, coating 240 comprises sulfonic acid groups that are not substantially homogeneously distributed within silica-based ceramic 250 across a thickness 260 of coating 240. Rather, in FIG. 4B, the sulfonate and sulfonic acid groups are localized at or near the surface of coating 240, leaving a region 245 of the coating without sulfonate and/or sulfonic acid groups.

Such a distribution of sulfonate and sulfonic acid groups that is not substantially homogeneously distributed may result from coating techniques that use surface functionalization, rather than the certain sol-gel techniques described herein. For example, a coating comprising a silica-based ceramic comprising sulfonate and/or sulfonic acid groups that are not substantially homogeneously distributed may result from fabrication techniques where a support (e.g., porous support membrane) is first coated with a material (e.g., with a ceramic such as a silica-based ceramic) that does not comprise sulfonate and/or sulfonic acid groups (or a relatively low amount of sulfonate and/or sulfonic acid groups). Then, following the first coating step, a second coating step is performed where a material that does comprise sulfonate and/or sulfonic acid groups (or comprises a relatively higher amount of sulfonate and/or sulfonic acid groups) is coated on the first coating. Having a silica-based ceramic coating that does not have a substantially homogeneous distribution of sulfonate and/or sulfonic acid groups may result in relatively poor performance of the resulting cation exchange membrane. For example, in some embodiments, the cation exchange membranes may have a relatively lower loading of sulfonate and/or sulfonic acid groups compared to cation exchange membranes having coatings that have a substantially homogeneous distribution of sulfonate and/or sulfonic acid groups. Additionally, in some cases, such coatings that do not have a substantially homogeneous distribution of sulfonate and/or sulfonic acid groups and consequently have regions having a relatively low abundance of sulfonate and/or sulfonic acid groups (e.g., region 245) may have relatively lower cation conductivity due to such regions.

In some embodiments in which the sulfonate and/or sulfonic acid groups are substantially homogeneously distributed within the silica-based ceramic across a thickness of the coating, the amount of sulfonate and sulfonic acid groups does not vary by more than 50% at any given point within a cross-section of thickness of the coating compared to an average amount of the sulfonate and sulfonic acid groups in the silica-based ceramic. For example, referring again to FIG. 4A, the amount of sulfonate and sulfonic acid groups at an arbitrary point A, or at an arbitrary point B, of cross-section 143 of coating 140 does not vary by more than 50% compared to the average amount of sulfonate and sulfonic acid groups in coating 140. In some embodiments in which the sulfonate and/or sulfonic acid groups are substantially homogeneously distributed within the silica-based ceramic across a thickness of the coating, the amount of sulfonate and sulfonic acid groups is distributed within the silica-based ceramic such that any given point within a cross-section of thickness of the coating is within greater than or equal to 50%, greater than or equal to 60%, greater than or equal to 70%, greater than or equal to 75%, greater than or equal to 80%, greater than or equal to 90%, greater than equal to 95%, or greater than or equal to 99% of the average amount of sulfonate and sulfonic acid groups in the coating. In some embodiments, the amount of sulfonate and sulfonic acid groups is distributed within the silica-based ceramic such that any given point within a cross-section of thickness of the coating is within less than or equal to 100%, less than or equal to 99%, less than or equal to 95%, less than or equal to 90%, less than or equal to 75%, less than or equal to 70%, less than or equal to 60%, or less of the average amount of sulfonate and sulfonic acid groups within the coating. Combinations of these ranges are possible. For example, in some embodiments, the amount of sulfonate and sulfonic acid groups is distributed within the silica-based ceramic such that any given point within a cross-section of thickness of the coating is within greater than or equal to 50% and less than or equal to 100% of the total average amount of sulfonate and sulfonic acid groups within the coating. As an exemplary calculation, if a silica-based ceramic were determined to have an average amount of sulfonate and sulfonic groups of 5 weight percent (wt %) (as determined by scanning electron microscopy/energy-dispersive X-ray techniques (SEM/EDX)), and all points within at least 5 cross-sections across the thickness of the silica-based ceramic (e.g., point A in FIG. 4A) are determined to have an amount of sulfonate and sulfonic acid groups of greater than or equal to 2.5 wt % and less than or equal to 7.5 wt %, then that silica-based ceramic would be considered to have sulfonate and/or sulfonic acid groups substantially homogeneously distributed across a thickness of the coating based on the average amount of sulfonate and/or sulfonic acid groups measured.

In contrast, in some cases in which the sulfonate and/or sulfonic acid groups are not substantially homogeneously distributed within the silica-based ceramic across a thickness of the coating, the amount of sulfonate and sulfonic acid groups are within less than 50% of the average amount of sulfonate and sulfonic acid groups within the coating (in other words, the amount of sulfonate and sulfonic acid groups varies by more than 50% at any given point within a cross-section of thickness of the coating compared to an average total amount of the sulfonate and sulfonic acid groups in the silica-based ceramic). For example, referring again to FIG. 4B, the amount of sulfonate and sulfonic acid groups at an arbitrary point C, or at an arbitrary point D, of cross-section 243 of coating 240 varies by more than 50% compared to the average amount of sulfonate and sulfonic acid groups in coating 240. As an exemplary calculation, if a silica-based ceramic were determined to have an average amount of sulfonate and sulfonic acid groups of 5 wt %, and any point within a cross-section across the thickness of the silica-based ceramic (e.g., point D in FIG. 4B) were determined to have an amount of sulfonate and sulfonic acid groups of less than 2.5 wt % or greater than 7.5 wt %, then that silica-based ceramic would not be considered to have sulfonate and/or sulfonic acid groups substantially homogeneously distributed across a thickness of the coating based on the average amount of sulfonate and/or sulfonic acid groups measured.

In some embodiments in which the sulfonate and/or sulfonic acid groups are substantially homogeneously distributed within the silica-based ceramic across a thickness of the coating, the amount of sulfonate and sulfonic acid groups does not vary by more than 75% at any given point within a cross-section of thickness of the coating compared to a maximum amount of the sulfonate and sulfonic acid groups in the silica-based ceramic. For example, referring again to FIG. 4A, the amount of sulfonate and sulfonic acid groups at an arbitrary point A, or at an arbitrary point B, of cross-section 143 of coating 140 does not vary by more than 75% compared to the maximum amount of sulfonate and sulfonic acid groups in coating 140. In some embodiments in which the sulfonate and/or sulfonic acid groups are substantially homogeneously distributed within the silica-based ceramic across a thickness of the coating, the amount of sulfonate and sulfonic acid groups is distributed within the silica-based ceramic such that any given point within a cross-section of thickness of the coating is greater than or equal to 25%, greater than or equal to 30%, greater than or equal to 40%, greater than or equal to 50% greater than or equal to 60%, greater than or equal to 70%, greater than or equal to 75%, greater than or equal to 80%, greater than or equal to 90%, greater than equal to 95%, or greater than or equal to 99% of the maximum amount of sulfonate and sulfonic acid groups in the coating. In some embodiments, the amount of sulfonate and sulfonic acid groups is distributed within the silica-based ceramic such that any given point within a cross-section of thickness of the coating is less than or equal to 100%, less than or equal to 99%, less than or equal to 95%, less than or equal to 90%, less than or equal to 75%, less than or equal to 70%, less than or equal to 60%, or less of the maximum amount of sulfonate and sulfonic acid groups within the coating. Combinations of these ranges are possible. For example, in some embodiments, the amount of sulfonate and sulfonic acid groups is distributed within the silica-based ceramic such that any given point within a cross-section of thickness of the coating is greater than or equal to 25% and less than or equal to 100% of the total maximum amount of sulfonate and sulfonic acid groups within the coating. As an exemplary calculation, if a silica-based ceramic were determined to have a maximum amount of sulfonate and sulfonic groups of 10 wt % (as determined by scanning electron microscopy/energy-dispersive X-ray techniques (SEM/EDX)), and all points within at least 5 cross-sections across the thickness of the silica-based ceramic (e.g., point A in FIG. 4A) are determined to have an amount of sulfonate and sulfonic acid groups of greater than or equal to 2.5 wt %, then that silica-based ceramic would be considered to have sulfonate and/or sulfonic acid groups substantially homogeneously distributed across a thickness of the coating based on the maximum amount of sulfonate and/or sulfonic acid groups measured. It should be understood that it is the relative amounts of sulfonate and sulfonic acid groups that is important in the above calculation, and the units used to express the amounts measured from the SEM/EDX technique are not particularly important. While weight percent is used in the above exemplary calculation, other units for expressing the amount of sulfonic acid and sulfonate groups are readily obtainable from the SEM/EDX technique or can be derived from the weight percentage as well.

In contrast, in some cases in which the sulfonate and/or sulfonic acid groups are not substantially homogeneously distributed within the silica-based ceramic across a thickness of the coating, the amount of sulfonate and sulfonic acid groups at a point are less than 25% of the maximum amount of sulfonate and sulfonic acid groups within the coating (in other words, the amount of sulfonate and sulfonic acid groups varies by more than 75% at any given point within a cross-section of thickness of the coating compared to a maximum total amount of the sulfonate and sulfonic acid groups in the silica-based ceramic). For example, referring again to FIG. 4B, the amount of sulfonate and sulfonic acid groups at an arbitrary point C, or at an arbitrary point D, of cross-section 243 of coating 240 varies by more than 75% compared to the maximum amount of sulfonate and sulfonic acid groups in coating 240. As an exemplary calculation, if a silica-based ceramic were determined to have a maximum amount of sulfonate and sulfonic groups of 10 wt %, and any point within a cross-section across the thickness of the silica-based ceramic (e.g., point D in FIG. 4B) were determined to have an amount of sulfonate and sulfonic acid groups of less than 2.5 wt %, then that silica-based ceramic would not be considered to have sulfonate and/or sulfonic acid groups substantially homogeneously distributed across a thickness of the coating based on the maximum amount of sulfonate and sulfonic acid groups measured.

The amount of sulfonate and sulfonic acid groups within the coating and within an arbitrary cross-section of the coating may be determined using a combination of scanning electron microscopy (SEM) and energy-dispersive X-ray (EDX) techniques. For example, the following procedure can be performed. The cation exchange membrane is dried and a cross sectional sample is mounted on to an SEM stub. The sample is first imaged using secondary electron and/or backscatter detection, followed by imaging via EDX. The EDX data can be acquired as a line profile across the cross sectional sample or as a map of the whole sample. The EDX data can then be interpreted to determine the average amount or maximum amount (e.g., in wt %) of sulfonate and sulfonic acid groups are present in the coating, as well as amounts of sulfonate and sulfonic acid groups at points along arbitrary cross-sections using the line profiles from the SEM/EDX data. Three or more line profiles can be acquired to determine a statistically representative set of data.

In some embodiments, sulfonate and/or sulfonic acid groups are directly adjacent to a surface of the porous support membrane. For example, referring again to FIG. 4A, coating 140 comprising silica-based ceramic 150 comprises sulfonate and sulfonic acid groups, and the sulfonate and sulfonic acid groups are directly adjacent to porous support membrane component 135, thereby making it directly adjacent to the porous support membrane to which porous support membrane component 135 belongs, according to some embodiments. In some embodiments, no intervening layer is present between the silica-based ceramic comprising sulfonate and/or sulfonic acid groups in the porous support membrane. For example, in some embodiments, there is no intervening layer between silica-based ceramic 150 and porous support membrane component 135 in FIG. 4A.

In some embodiments, the sulfonate and/or sulfonic acid groups are relatively close to a surface of the porous support membrane (e.g., the surface of the support components that make up the porous support membrane). For example, in some embodiments, at least some of the sulfonate and/or sulfonic acid groups are within 1 µm, within 500 nm, within 100 nm, within 50 nm, within 10 nm, within 5 nm, within 1 nm, or less of a surface of the porous support membrane. In some embodiments, at least some of the sulfonate and/or sulfonic acid groups are within 1-10 µm of a surface of the porous support membrane. In some embodiments, the sulfonate and/or sulfonic acid groups are in contact (e.g., direct contact) with the surface of the porous support membrane. The distance between the porous support membrane and a sulfonate and/or sulfonic acid group can be determined, for example, using an analytical electron microscope equipped with a transmission electron microscope (TEM) and an X-ray spectrometer.

As mentioned above, in some embodiments, the cation exchange membrane or material has a relatively high loading of functional groups. For example, in some embodiments, the cation exchange membrane or material has a relatively high loading of sulfonate and/or sulfonic acid groups. Having a relatively high loading of functional group such as sulfonate and/or sulfonic acid groups may at least in part to lead to beneficial performance characteristics of the cation exchange membrane or material. For example, a high loading of sulfonate and/or sulfonic acid groups may contribute to a relatively high cation exchange capacity, cation permselectivity, and/or cation conductivity (e.g., sodium ion conductivity, proton conductivity). Certain methods described herein, such as certain sol-gel techniques involving co-condensation of functionalized and non-functionalized silanes, may provide loadings of sulfonate and/or sulfonic acid groups that are otherwise challenging to achieve using certain existing techniques.

In some embodiments, sulfonate and/or sulfonic acid groups are present in the cation exchange membrane or material in an amount of greater than or equal to 0.01 mmol, greater than or equal to 0.05 mmol, greater than or equal 0.1 mmol, greater than or equal to 0.3 mmol, greater than or equal to 0.5 mmol, greater than or equal to 0.7 mmol, greater than or equal to 1 mmol, greater than or equal to 2 mmol, greater than or equal to 3 mmol or more per gram of the cation exchange membrane or material. In some embodiments, sulfonate and/or sulfonic acid groups are present in the cation exchange membrane or material in an amount of less than or equal to 10 mmol, less than or equal to 5 mmol, or less per gram of the cation exchange membrane or material. Combinations of these ranges are possible. For example, in some embodiments, sulfonate and/or sulfonic acid groups are present in the cation exchange membrane or material in an amount of greater than or equal to 0.01 mmol in less than or equal to 10 mmol, or greater than or equal to 0.1 mmol and less than or equal to 10 mmol per gram of the cation exchange membrane or material. It should be understood that the loadings described herein refer to the total sum of sulfonate and sulfonic acid groups. For example, if the cation exchange membrane or material contained 0.1 mmol of sulfonate groups and 0.3 mmol of sulfonic acid groups per gram of the cation exchange membrane or material, the cation exchange membrane or material, sulfonate and/or sulfonic acid groups would be present in the cation exchange membrane or material in an amount of 0.4 mmol per gram of the cation exchange membrane or material. The loading of sulfonate and/or sulfonic acid groups within the cation exchange membrane or material can be determined by performing the measurement of the cation exchange capacity of the cation exchange membrane as described below, and taking the number of sodium ions measured in solution (as determined by the titration) as being equal to the number of sulfonate and sulfonic acid groups in the cation exchange membrane. The loading can then be determined using that number of sulfonate and sulfonic groups (in mmol) and dividing by the weight of the dried cation exchange membrane (in g). It should be understood that the above quantities and measurements for the loading of sulfonate and sulfonic acid groups refers to accessible sulfonate and/or sulfonic acid groups, and not to sulfonate and/or sulfonic acid groups that are inaccessible to solvent and ions (e.g., sulfonate or sulfonic acid groups trapped in enclosed pores that cannot be contacted by solvent or cations).

As described above, the silica-based ceramic (e.g., the silica-based ceramic 150), may be a ceramic comprising predominantly a network of silica ($SiO_2$), though the silica-based ceramic can include groups (e.g., terminal moieties) not described by the $SiO_2$ formula. For example, in some embodiments, the silica-based ceramic comprises a network a silica comprising terminal hydroxy groups, terminal organic groups, and/or terminal functional groups (e.g., sulfonate and/or sulfonic acid groups). In some embodiments, a relatively high percentage of the Si atoms in the silica-based ceramic are in a tetrahedral environment and are bound to either an oxygen, a hydroxy group, or a functional group (e.g., sulfonate and/or sulfonic acid group. For example, in some embodiments, a relative high percentage of the silica-based ceramic can be described using the following structure (I):

(I)

wherein each R group can independently be hydroxy, —$OSiR_3$, or a moiety containing a functional group such as a sulfonate or sulfonic acid group. For example, in some cases, R can be an alkylsulfonic acid group such as 1-propanylsulfonic acid. As can be seen from this structure, the silica-based ceramic can contain an extended (though not necessarily single-crystalline) ceramic structure comprising functional groups such as sulfonate and/or sulfonic acid groups covalently bound to the silica-based ceramic. For example, in some embodiments, the silica-based ceramic can contain an extended ceramic structure that can be described using the following structure (II):

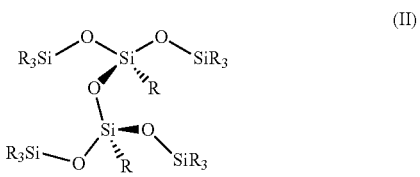

(II)

wherein each R group can independently be hydroxy, —$OSiR_3$, or a moiety containing a functional group such as a sulfonate or sulfonic acid group.

In some embodiments, the silica-based ceramic can contain a structure that can be described using the following structure (III):

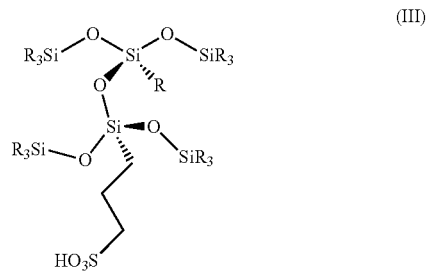

(III)

wherein each R group can independently be hydroxy, —$OSiR_3$, or a moiety containing a functional group such as a sulfonate or sulfonic acid group.

The silica-based ceramic of the cation exchange membrane may have one or more properties of ceramics known in the art. For example, the silica-based ceramic may be relatively brittle, have a relatively high density, have a relatively high hardness, and/or have a relatively high melting point. In some embodiments, the silica-based ceramic is polycrystalline. The silica-based ceramic described herein stands in contrast to cation exchange membranes comprising particles (e.g., nanoparticles) of silica (e.g., functionalized silica nanoparticles) suspended in a non-silica-based matrix (e.g., a polymer matrix such as a carbon-based polymer matrix).

In some embodiments, Si is present in a relatively high amount in the silica-based ceramic. Si may be present in a relatively high amount in the silica-based ceramic due to the silica-based ceramic being predominantly silica-based, rather than having a relatively high percentage of other components, such as a polymer matrix. In some embodiments, the silica-based ceramic comprises Si in an amount of greater than or equal to 6 weight percent (wt %), greater than or equal to 10 wt %, greater than equal to 12 wt %, greater than or equal to 15 wt %, greater than or equal to 17 wt %, greater than or equal to 20 wt %, greater than or equal to 24 wt %, greater than or equal to 30 wt %, greater than or equal to 40 wt %, or more in the silica-based ceramic. In some embodiments, the silica-based ceramic comprises Si in an amount less than or equal to 60 wt %, less than or equal to 50 wt %, less than or equal to 47 wt %, less than or equal to 40 wt %, less than or equal to 30 wt %, less than or equal to 28 wt %, less than or equal to 26 wt %, less than or equal to 24 wt %, less than or equal to 22 wt %, less than or equal to 20 wt %, less than or equal to 17 wt %, or less in the silica-based ceramic. Combinations of these ranges are possible. For example, in some embodiments, the silica-based ceramic comprises Si in an amount greater than or equal to 6 wt % and less than or equal to 60 wt %, or greater than or equal to 11 wt % and less than or equal to 26 wt % in the silica-based ceramic.

In some embodiments, the silica-based ceramic comprises Si in an amount of greater than or equal to 1.5 mole percent (mol %), greater than or equal to 3 mol %, greater than or equal to 5 mol %, greater than or equal to 8 mol %, greater than or equal to 10 mol %, greater than or equal to 12 mol %, greater than or equal to 15 mol %, greater than or equal to 18 mol %, greater than or equal to 20 mol %, or more in the silica-based ceramic. In some embodiments, the silica-based ceramic comprises Si in an amount less than or equal to 33.4 mol %, to 30 mol %, less than or equal to 28 mol %, less than or equal to 26 mol %, less than or equal to 24 mol %, less than or equal to 22 mol %, less than or equal to 20 mol %, less than or equal to 18 mol %, or less in the silica-based ceramic. Combinations of these ranges are possible. For example, in some embodiments, the silica-based ceramic comprises Si in an amount greater than or equal to 1.5 mol % and less than or equal to 33.4 mol %, greater than or equal to 8 mol % and less than or equal to 20 mol %, greater than or equal to 2.8 mol % and less than or equal to 18 mol %, or greater than or equal to 12 mol % and less than or equal to 18 mol % in the silica-based ceramic.

In some embodiments in which the silica-based ceramic comprises a sulfur-containing functional group such as a sulfonate and/or sulfonic acid group, the molar ratio of Si to sulfur in the silica-based ceramic depends on the loading of the sulfur-containing functional groups in the silica-based ceramic. In some embodiments, the silica-based ceramic has a silicon-to-sulfur molar ratio of greater than or equal to 1:1, greater than or equal to 1.5:1, greater than or equal to 2:1, greater than or equal to 3:1, greater than or equal to 4:1, greater than or equal to 5:1, greater than or equal to 10:1, greater than or equal to 25:1, or more. In some embodiments, the silica-based ceramic has a silicon-to-sulfur molar ratio of less than or equal to 120:1, less than or equal to 75:1, less than or equal to 50:1, less than or equal to 25:1, less than or equal to 10:1, less than or equal to 4:1, or less. Combinations of these ranges are possible. For example, in some embodiments, the silica-based ceramic has a silicon-to-sulfur molar ratio of greater than or equal to 1:1 and less than or equal to 120:1, greater than or equal to 1:1 and less than or equal to 10:1, or greater than or equal to 1:1 and less than or equal to 4:1.

In some embodiments, the molar ratio of Si to carbon in the silica-based ceramic depends on the loading of carbon containing groups within the silica-based ceramic, such as organic moieties (e.g., organic functional groups). In some embodiments, the silica-based ceramic has a silicon-to-carbon (Si:C) molar ratio of greater than or equal to 1:100, greater than or equal to 1:75, greater than or equal to 1:50, greater than or equal to 1:40, greater than or equal to 1:25, greater than or equal to 1:16, greater than or equal to 1:10, greater than or equal to 1:5, or greater than or equal to 1:3, greater than or equal to 1:1, or greater. In some embodiments, the silica-based ceramic has a silicon-to-carbon molar ratio of less than or equal to 3,000:1, less than or equal to 2,000:1, less than or equal to 1,000:1, less than or equal to 500:1, less than or equal to 200:1, less than or equal to 100:1, less than or equal to 75:1, less than or equal to 50:1, less than or equal to 25:1, less than or equal to 10:1, less than or equal to 2:1, less than or equal to 1:1, or less. Combinations of these ranges are possible. For example, in some embodiments, the silica-based ceramic has silicon-to-carbon molar ratio of greater than or equal to 1:100 and less than or equal to 3.00:1, greater than or equal to 1:100 and less than or equal to 100:1, greater than or equal to 1:40 and less than or equal to 10:1, or greater than or equal to 1:3 and less than or equal to 2:1.

The weight percentage and mole percentage and molar ratios in the silica-based ceramic described above can be determined by removing the silica-based ceramic from the rest of the cation exchange membrane or material (e.g., porous support membrane, compressible edging material etc.) and performing an elemental analysis, such as inductively coupled plasma mass spectrometry (ICP-MS) or nuclear magnetic resonance (NMR).

As mentioned above, in some embodiments, sol-gel techniques can be used to form the silica-based ceramic. As such, in some cases, the silica-based ceramic is sol-gel derived. In some embodiments, the sol used in the sol-gel techniques is a silicon-containing precursor sol (i.e., the silica-based ceramic is derived from a silicon-containing precursor sol). During fabrication of the cation exchange membrane, for example, one or more components of the cation exchange membrane, such as a porous support membrane described herein, may be coated with the silicon-containing precursor sol during at least one step of the fabrication process. The silicon-containing precursor sol may comprise any of a variety of suitable silicon-containing precursor components, such as silica colloidal particles, siloxanes, silicate esters, silanols, silanes, alkoxysilanes, tetraalkyl orthosilicates, halosilanes, or combinations thereof. In some embodiments, the silica-based ceramic is derived from a silicon-containing precursor sol containing two or more different silicon-containing precursor components. In some such cases, the silica-based ceramic is formed via a co-condensation of two or more silicon-containing precursor components (e.g., two or more different silanes or substituted silanes).

In some embodiments, the silicon-containing precursor sol from which the silica-based ceramic is derived comprises a silicon-containing precursor comprising a sulfonate group, sulfonic acid group, or functional group capable of being oxidized to a sulfonate or sulfonic acid group (e.g., a thiol, an aryl group). In some embodiments, the silica-based ceramic is derived from a mixture (e.g., a silicon-containing precursor sol) comprising a silane (e.g., a substituted alkoxysilane) containing sulfur (e.g., a thiol). In some embodiments, the silica-based ceramic is derived from a mixture (e.g., a silicon-containing precursor sol) comprising a compound having structure (IV):

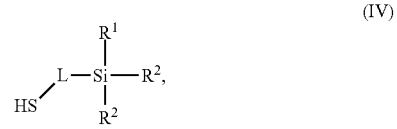

(IV)

wherein each of $R^1$, $R^2$, and $R^3$ is independently chosen from optionally-substituted $C_{1-18}$ alkoxy and halo, and L is chosen from optionally-substituted $C_{1-18}$ alkylene and arylene. In some embodiments, each of $R^1$, $R^2$, and $R^3$ is independently chosen from optionally-substituted $C_{1-8}$ alkoxy and halo, and L is chosen from optionally-substituted $C_{1-8}$ alkylene and arylene. In some embodiments, each of $R^1$, $R^2$, and $R^3$ is independently chosen from optionally-substituted $C_{1-4}$ alkoxy and halo, and L is chosen from optionally-substituted $C_{1-4}$ alkylene and arylene.

In some embodiments, the silica-based ceramic is derived from a mixture (e.g., a silicon-containing precursor sol) containing a compound having structure (V):

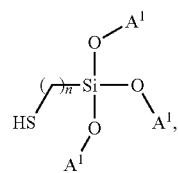

(V)

wherein each $A^1$ is independently chosen from hydrogen, methyl, ethyl, propyl, or butyl, and n is greater than or equal to 1 and less than or equal to 18.

As one example, in some embodiments, the silica-based ceramic is derived from a mixture (e.g., a silicon-containing precursor sol) containing (3-mercaptopropyl)triethoxysilane. The resulting silica-based ceramic derived from the above-mentioned thiol-containing compounds may, in some cases, be further oxidized to form a sulfonate and/or sulfonic acid group, as described in more detail below.

In some embodiments, the silica-based ceramic is derived from a mixture (e.g., a silicon-containing precursor sol) comprising a compound having structure (VI) and/or the conjugate base thereof:

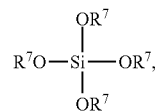

(VI)

wherein each of $R^4$, $R^5$, and $R^6$ is independently chosen from optionally-substituted $C_{1-18}$ alkoxy and halo, and L is chosen from optionally-substituted $C_{1-18}$ alkylene and arylene. In some embodiments, each of $R^4$, $R^5$, and $R^6$ is independently chosen from optionally-substituted $C_{1-8}$ alkoxy and halo, and L is chosen from optionally-substituted $C_{1-8}$ alkylene and arylene. In some embodiments, each of $R^4$, $R^5$, and $R^6$ is independently chosen from optionally-substituted $C_{1-4}$ alkoxy and halo, and L is chosen from optionally-substituted $C_{1-4}$ alkylene and arylene.

In some embodiments, the silica-based ceramic is derived from a mixture (e.g., a silicon-containing precursor sol) containing a compound having structure (VII) and/or the conjugate base thereof:

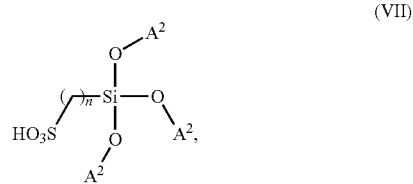

(VII)

wherein each $A^2$ is independently chosen from hydrogen, methyl, ethyl, propyl, or butyl, and n is greater than or equal to 1 and less than or equal to 18.

As one example, in some embodiments, the silica-based ceramic is derived from a mixture (e.g., a silicon-containing precursor sol) comprising 3-(trihydroxysilyl)-1-alkanesulfonic acid.

In some embodiments, the silica-based ceramic is derived from a mixture (e.g., a silicon-containing precursor sol) comprising a compound having structure (VIII):

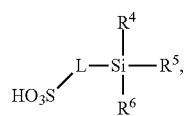

(VIII)

wherein each $R^7$ is independently chosen from hydrogen or optionally-substituted $C_{1-18}$ alkyl. In some embodiments, $R^7$ is independently chosen from hydrogen or optionally-substituted $C_{1-8}$ alkyl. In some embodiments, $R^7$ is independently chosen from hydrogen or optionally-substituted $C_{1-4}$ alkyl. In some embodiments, $R^7$ is independently chosen from methyl, ethyl, propyl and butyl.

In some embodiments, the silica-based ceramic is derived from a mixture (e.g., a silicon-containing precursor sol) comprising tetraethyl orthosilicate (TEOS) and/or tetraethyl orthosiloxane. In some embodiments, the silica-based ceramic is derived from a single-phase mixture (e.g., a single-phase silicon-containing precursor sol) comprising both a compound having structure (VIII) (e.g., TEOS) and a compound having structure (IV) (e.g., (3-mercaptopropyl) triethoxysilane). In some embodiments, the silica-based ceramic is derived from a mixture (e.g., a silicon-containing precursor sol) comprising a compound having structure (VIII), a compound having structure (IV), and water in a structure (VIII):structure(IV):water molar ratio of 1:0.01-20:1-30, a molar ratio of 1:0.1-10:16, or a molar ratio of 1:0.25-1:2-4. In some embodiments, the silica-based ceramic is derived from a single-phase mixture (e.g., a single-phase silicon-containing precursor sol) comprising both a compound having structure (VIII) (e.g., TEOS) and a compound having structure (VI) (e.g., 3-(trihydroxysilyl)-1-propanesulfonic acid). In some embodiments, the silica-based ceramic is derived from a mixture (e.g., a silicon-containing precursor sol) comprising a compound having structure (VIII), a compound having structure (VI), and water in a structure (VIII):structure(VI):water molar ratio of 1:0.01-20:1-30, a molar ratio of 1:0.1-10:2-26, or a molar ratio of 1:0.25-1:16-26.

In some embodiments, the silica-based ceramic is derived from a mixture (e.g., a silicon-containing precursor sol) comprising two or more precursors. For instance, in some embodiments, the silica-based ceramic is derived from a mixture comprising a compound having structure (VIII)

(e.g., TEOS) and a compound having structure (IV) (e.g., 3-mercaptopropyl)triethoxysilane) in a structure (VIII): structure(IV) mass ratio of less than or equal to 99:1, less than or equal to 95:5, less than or equal to 90:10, less than or equal to 85:15, less than or equal to 80:20, less than or equal to 75:25, less than or equal to 70:30, less than or equal to 65:35, less than or equal to 60:40, or less. In some embodiments, the silica-based ceramic is derived from a mixture (e.g., a silicon-containing precursor sol) comprising a compound having structure (VIII) (e.g., TEOS) and a compound having structure (IV) (e.g., 3-mercaptopropyl) triethoxysilane) in a structure (VIII):structure(IV) mass ratio of greater than or equal to 50:50, greater than or equal to 55:45, greater than or equal to 60:40, greater than or equal to 65:35, greater than or equal to 70:30, or greater. Combinations of these ranges are possible (e.g., greater than or equal to 50:50 and less than or equal to 99:1, greater than or equal to 60:40 and less than or equal to 90:10, or greater than or equal to 70:30 and less than or equal to 80:20).

In some embodiments, the silica-based ceramic is derived from a mixture (e.g., a silicon-containing precursor sol) comprising a compound having structure (VIII) (e.g., TEOS) and a compound having structure (VI) (e.g., 3-(trihydroxysilyl)-1-propanesulfonic acid) in a structure (VIII): structure(VI) mass ratio of less than or equal to 99:1, less than or equal to 95:5, less than or equal to 90:10, less than or equal to 85:15, less than or equal to 80:20, less than or equal to 75:25, less than or equal to 70:30, less than or equal to 65:35, less than or equal to 60:40, or less. In some embodiments, the silica-based ceramic is derived from a mixture (e.g., a silicon-containing precursor sol) comprising a compound having structure (VIII) (e.g., TEOS) and a compound having structure (VI) (e.g., 3-(trihydroxysilyl)-1-propanesulfonic acid) in a structure (VIII):structure(VI) mass ratio of greater than or equal to 40:60, greater than or equal to 45:55, greater than or equal to 50:50, greater than or equal to 55:45, greater than or equal to 60:40, greater than or equal to 65:35, greater than or equal to 70:30, or greater. Combinations of these ranges are possible (e.g., greater than or equal to 40:60 and less than or equal to 99:1, greater than or equal to 60:40 and less than or equal to 90:10, or greater than or equal to 70:30 and less than or equal to 80:20).

In some embodiments, the silica-based ceramic is derived from a mixture (e.g., a silicon-containing precursor sol) comprising an aqueous solution having a certain pH, depending on the desired chemistry to be used. In some embodiments, the aqueous solution may have a pH of greater than or equal to −1, greater than or equal to 0, greater than or equal to 1, greater than or equal to 2, greater than or equal to 3, greater than or equal to 4, greater than or equal to 5, greater than the 6, greater than or equal to 7, greater than or equal to 8, greater than or equal to 9, or higher. In some embodiments, the aqueous solution may have a pH of less than or equal to 14, less than or equal to 13, less than or equal to 12, less than or equal to 11, less than or equal to 10, less than or equal to 9, less than or equal to 8, less than or equal to 7, less than or equal to 6, less than or equal to 5, less than or equal to 4, less than or equal to 3, or less. Combinations of these ranges are possible. For example, in some embodiments, the aqueous solution has a pH of greater than or equal to −1 and less than or equal to 14, greater than or equal to 0 and less than or equal to 7, or greater than or equal to 1 and less than or equal to 3. In some cases, having a relatively acidic pH (e.g., a pH of between 1-3) may allow for certain condensation and hydrolysis reactions to occur during fabrication of the cation exchange membrane involving the conversion of a sol-gel into a silica-based ceramic.

In some embodiments, the silica-based ceramic is derived from a mixture described above (e.g. a silicon-containing precursor sol) containing one or more acids such as, but not limited to, HCl, $H_3PO_4$, $H_2SO_4$, or $HNO_3$.

In some, but not necessarily all embodiments, the silica-based ceramic is derived from a mixture (e.g., a silicon-containing precursor sol) comprising one or more other solvents in addition to water. For example, in some embodiments, the silica-based ceramic is derived from a mixture (e.g., a silicon-containing precursor sol) comprising an alcohol. In some such cases, the presence of an alcohol in the mixture can enhance the miscibility of the components of the mixture. Exemplary alcohols that can be present include, but are not limited to, methanol, ethanol, isopropanol, butanol, or combinations thereof. In some embodiments, the silica-based ceramic is derived from a mixture (e.g., a silicon-containing precursor sol) comprising one or more solvents that may be able to mitigate problems (e.g., cracking) that can occur during, for example, drying of a coating comprising the mixture to form the silica-based ceramic. Exemplary solvents that, in some embodiments, may mitigate such problems include, but are not limiting to, formamide and aromatics (e.g., toluene, xylene).

As mentioned above, in some embodiments, the silica-based ceramic is porous. In some such embodiments, the silica-based ceramic is nanoporous (having pores with an average (mean) diameter of less than or equal to 10 nm). The presence of relatively small pores in the silica-based ceramic may, in some cases, be advantageous in a number of applications such as electrochemical applications and separation applications. In some embodiments, the presence of relatively small pores in the silica-based membrane ceramic can contribute to a relatively high selectivity of the cation exchange membrane (e.g., due to size exclusion). Relatively small pores may also contribute relatively high permselectivity and a useful balance between cation conductivity (e.g., sodium ion conductivity) and water transport. In some embodiments, the silica-based ceramic has an average pore diameter of less than or equal to 1 μm (e.g., less than or equal to 500 nm, less than or equal to 100 nm, or less than or equal to 50 nm). In some cases, the silica-based ceramic has an average pore diameter of less than or equal to 10 nm, less than or equal to 8 nm, less than or equal to 6 nm, less than or equal to 5 nm, less than or equal to 3 nm, less than or equal to 2 nm, or less. In some embodiments, the silica-based ceramic has an average pore diameter of greater than or equal to 0.25 nm, greater than or equal to 0.4 nm, greater than or equal to 0.6 nm, or greater than or equal to 1 nm. Combinations of these ranges are possible. For example, in some embodiments, the silica-based ceramic has an average pore diameter of greater than or equal to 0.25 nm and less than or equal to 1 μm, greater than or equal to 0.25 nm and less than or equal to 10 nm, greater than or equal to 0.4 nanometers and less than or equal to 10 nm, greater than or equal to 0.6 nm and less than or equal to 5 nm, or greater than or equal to 0.6 nm and less than or equal to 2.5 nm.

The average pore diameter of the silica-based ceramic may be determined using a small angle X-ray scattering (SAXS) technique. In a suitable SAXS technique, a collimated X-ray beam is focused onto a membrane comprising the silica-based ceramic for at least 15 minutes, and the scattering intensity as a function of scattering angle is collected on an image plate. The scattering intensity is integrated to generate a 1-dimensional scattering profile that plots the scattering intensity as a function of the q-vector. Scattering of the membrane can be fit with a sphere-based form factor (e.g., solid or core-shell). In some cases, the sphere-based form factor can include a structure factor (e.g., fractal or hard-sphere interactions). Fitting can be performed in the freely available SASView software. A log-normal distribution on pore size polydispersity is assumed. A 1-D SAXS profile is assumed to be well-fit if the residual between the model and data set (Chi$^2$) is less than or equal to 10, less than or equal to 1, less than or equal 0.5, or less. Certain parameters are held constant during fitting, including $SLD_{solvent}=18.8\times10^{-6}$ Å$^{-2}$ and $SLD_{sphere}=0$ Å$^{-2}$, where SLD is the scattering length density. SAXS fitting can be used to determine the volume fraction of porosity, pore size (e.g., average pore diameter), and polydispersity index of the pore size distribution. Suitable SAXS procedures are described in more detail, for example, in Pedersen, J. S., Analysis of small-angle scattering data from colloids and polymer solutions: modeling and least-squares fitting. Advances in Colloid and Interface Science 1997, 70, 171-210, and in Zemb., T.; Lindner, P., Neutron, X-Rays and Light. Scattering Methods Applies to Soft Condensed Matter. North Holland: 2002, which are incorporated herein by reference in their entirety. The average pore diameter may also be determined using other small angle scattering techniques, such as small angle neutron scattering (SANS).

In some embodiments, the cation exchange membrane or material has a relatively large volumetric porosity. The volumetric porosity may depend on the porosity of the silica-based ceramic. Having a relatively high volumetric porosity may contribute to certain beneficial performance characteristics of the cation exchange membrane, such as a cation exchange capacity and water uptake. In some embodiments, the cation exchange membrane or material has a volumetric porosity of greater than or equal to 1%, greater than or equal to 3%, greater than or equal to 5%, greater than or equal to 10%, greater than or equal to 20%, greater than or equal to 30%, greater than or equal to 40%, or more. In some embodiments, the cation exchange membrane or material has a volumetric porosity of less than or equal to 70%, less than or equal to 60%, less than or equal to 50%, less than or equal to 45%, less than or equal to 40%, less than or equal to 35%, less than or equal to 30%, less than or equal to 25%, less than or equal to 15%, or less. Combinations of these ranges are possible. For example, in some embodiments, the cation exchange membrane or material has a volumetric porosity of greater than or equal to 1% and less than or equal to 70%, greater than or equal to 5% and less than or equal to 50%, greater than or equal to 10% and less than or equal to 50%, or greater than or equal to 30% and less than or equal to 50%. As mentioned above, these volumetric porosities of the cation exchange membrane or material are determined via fitting of SAXS data of the cation exchange membrane or material.

In some embodiments, the pores of the silica-based ceramic have a relatively small aspect ratio (length:width). Aspect ratio of the pores of the silica-based membrane can be determined by fitting SAXS data to an ellipsoid model to determine an average first radius and an average second radius of the pores of the silica-based membrane, and taking the ratio of the average first and the average second radius. In some embodiments, the pores of the silica-based membrane have an aspect ratio of less than or equal to 40:1, less than or equal to 20:1, less than or equal to 10:1, less than or equal to 5:1, or less.

In some embodiments, the pores of the silica-based ceramic have an ordered structure. Such an ordered structure may, in some cases, contrast with the pores of certain existing cation exchange membrane such as those made from hydrocarbon- or perfluorocarbon-based polymers, which can have worm-like, disordered pores (e.g., with a high polydispersity). Having a silica-based ceramic with regular, ordered pores over a relatively large size scale can, in some cases, correspond to improved performance characteristics in cation exchange applications. The pores of the silica-based ceramic have an ordered structure if the scattering data from a SAXS experiment on a membrane or material containing the silica-based ceramic can be fit to a mathematical model, such as a fractal aggregate model, with a Chi$^2$/N value of less than or equal to 10, less than or equal to 5, less than or equal to 1, less or equal to 0.5, or less, where Chi$^2$ is a squared sum of an intensity difference between the mathematical model and the small angle scattering spectra data, and N is the number of points small-angle scattering data points over a model fitting range. An exemplary fractal aggregate model using SAXS data of intensity (I) as a function of a scattering vector, q, is as follows:

$$I(q) = P(q)S(q) + bck$$

S(q) is a network or fractal structure that defines an organization or configuration of building blocks of the network of pores of the silica-based ceramic. In other words, in some embodiments, the building blocks are the pores of the silica-based ceramic. Bck defines background scattering, such as from a scattering particle source and/or inelastic scattering of scattering particles off of the silica-based ceramic. In some embodiments, S(q) is defined by the following equation:

$$S(q) = 1 + \frac{D_f \Gamma(D_f - 1)}{\left[1 + 1/q\xi)^2\right]^{(D_f-1)/2}} \frac{\sin\left[(D_f - 1)\tan^{-1}(q\xi)\right]}{(qR_0)^{D_f}}$$

where
$R_o$ is a radius of the building blocks (pores), $\rho_{solvent}$ is a scattering length density of a solvent (the silica-based ceramic), $\rho_{block}$ is a scattering length density of the building blocks (assumed to be the scattering length density of air at ambient conditions if the membrane is dry), $D_f$ is a fractal dimension, is a correlation length, and $\Gamma$ is the standard mathematical gamma function.

P(q) is a form factor that defines a structure of the building blocks of the network of pores of the silica-based ceramic as a function of q. Such form factors may take on a variety of shapes, such as simple geometric shapes like spheres, ellipsoids, cubes, ovals, and the like.

In some embodiments, the building blocks (pores) are defined as homogeneous building blocks, such as homogeneous spheres. In that regard, in some embodiments, P(q) is defined by the following equation:

$$P(q) = \text{scale} \times V(\rho_{block} - \rho_{solvent})^2 F(qR_0)^2,$$

where $$F(x) = \frac{3[\sin(x) - x\cos(x)]}{x^3},$$

$$V = \frac{4}{3}\pi R_0^3,$$

and scale is a volume fraction of building blocks of the measured silica-based ceramic.

In some embodiments, the form factor defines a spherical core-shell building block (pore). In some such embodiments, regard, P(q) is defined by the following formula:

$$P(q) = \frac{scale}{V_s}\left[3V_c(\rho_c - \rho_s)\frac{[\sin(qr_c) - qr_c \cos(qr_c)]}{(qr_c)^3} + 3V_s(\rho_s - \rho_{block})\frac{[\sin(qr_s) - qr \cos(qr_s)]}{(qr_s)^3}\right]^2 + bkg$$

where
scale is a volume fraction of building blocks of the measured silica-based ceramic, $V_c$ is a volume of the core, $V_s$ is a volume of the shell, $\rho_c$ is a scattering length density of the core, $\rho_s$ is a scattering length density of the shell (e.g., shell of functional groups), $\rho_{block}$ is a scattering length density of the building blocks (pores), re is a radius of the core, $r_s$ is a radius of the shell, and bck is background scattering.

In some embodiments, one or more surfaces of the silica-based ceramic are coated with an additional coating. A core-shell model, such as the core-shell fractal aggregate model may be suitable to characterize core-shell particle building blocks. In some cases, a core-shell model is suitable even in the absence of an additional coating process. For example, in some embodiments, the method used to form the silica-based ceramic (e.g., a sol-gel based method) produces phase segregated regions that can be modeled using a core-shell model.

As above, various embodiments of the form factors, P(q), of the fractal aggregate models used to characterize small-angle scattering spectra can include a factor that accounts for differences between scattering length densities.

In some embodiments, scattering length densities in the above equations are defined by the materials that make up the components of the silica-based ceramic membranes. Generally, larger differences between scattering length densities of scattering sources, such as pores, and surrounding ceramic materials provide larger scattering contrast. Accordingly, in some embodiments, small-angle scattering data is generated from silica-based ceramics that have been dried to remove solvent or other liquid from the pores, thus providing a greater difference in scattering length densities compared to a silica-based ceramic with pores filled with a liquid solvent.

In some embodiments, the scattering length densities are defined in units of $Å^{-2}$ (inverse angstroms squared). The scattering length density is defined as the sum of the bound coherent scattering length of each atom normalized by the molecular volume. For example, the X-ray scattering length density of air is roughly 0 $Å^{-2}$ while x-ray scattering length density of amorphous silica is roughly $18.8\times10^{-6}$ $Å^{-2}$.

In some embodiments, small-angle scattering data is generated from silica-based ceramic that have been rinsed to remove residual ions, chemical reactants, and the like.

In some embodiments, fitting small-angle scattering spectra to a fractal aggregate model includes fitting the small-angle scattering spectra over a range of q values that exceeds an order of magnitude, such as over an order of magnitude where q is in units of $Å^{-1}$. Such a relatively wide fitting range may ensure that the data is fit to the fractal aggregate model over a range of sizes commensurate in scope with, for example, a size scale of pores of the silica-based ceramic, in addition to providing data sufficient to fit with the fractal aggregate model. In some embodiments, fitting small-angle scattering spectra to a fractal aggregate model includes fitting the small-angle scattering spectra over a range of q values in a range of about 0.01 $Å^{-1}$ to about 1 $Å^{-1}$. In some embodiments, fitting small-angle scattering spectra to a fractal aggregate model includes fitting the small-angle scattering spectra over a range of q values in a range of about 0.02 $Å^{-1}$ to about 0.8 $Å^{-1}$.

As above, scale corresponds to a volume fraction of pores in the silica-based ceramic. In some embodiments, scale corresponds to membrane porosity when the small-angle scattering spectra are in intensity units of 1/cm and the scale is less than 0.7. In this regard, the scale corresponds to a number of pores, normalized by a size of the sample. In some embodiments, the silica-based ceramic has a porosity volume fraction in a range of about 0.01 to about 0.7. In some embodiments, the silica-based ceramic has a porosity volume fraction in a range of about 0.15 to about 0.35. It should be understood that the above-mentioned ranges correspond to cases in which the scattering length density refers to that of air at ambient conditions for the pores and amorphous silica for the silica-based ceramic, respectively.

In some embodiments, $D_f$ is a fractal dimension of the fractal aggregate models described herein. In some embodiments, $D_f$ corresponds to a shape and/or configuration of pores within the silica-based ceramic. Generally, $D_f$ is in a range of about 1 to about 3. Where $D_f$ is close to or at 1, the pores may be generally characterized as 1-dimensional tunnels. Where $D_f$ is close to or at 3, the pores may be generally characterized as open spheres.

In some embodiments, it is advantageous to have a silica-based ceramic defining pores having a tortuous or indirect route through the silica-based ceramic. For an ion or other particle in fluid communication with a tortuous pore, it is less likely that the ion or other particle will traverse the membrane as a size of the ion or other particle approaches that of the tortuous pore than compared to a less tortuous pore. In that regard, such silica-based ceramics defining tortuous pores may, in some cases, be suitable to provide, for example, more selective cation exchange than, for example, silica-based ceramics defining pores of the same size, but that provide a more direct path through the silica-based ceramic. In this regard, in some, but not necessarily all embodiments $D_f$ is in a range of 2.0-4.0. Such $D_f$ ranges describe or characterize silica-based ceramics having relatively tortuous pores having a form factor somewhere between a straight line and an open sphere.

In some embodiments, the fractal aggregate model is constrained to have pore sizes within a particular range. As above, the porous support defines pores with an average pore diameter within the ranges described above. Likewise, the methods described in the present disclosure are suitable to make such silica-based ceramics defining pores in such a size range. Accordingly, by constraining fractal aggregate models used to fit small-angle scattering data, a good fit between the fractal silica-based ceramic and the fractal aggregate model can be obtained.

As above, the correlation length, $\xi$, is a length over which the fractal pattern of the silica-based ceramic repeats itself. In some cases, silica-based ceramics will repeat the fractal pattern over a relatively large size scale. In this regard, such silica-based ceramics define regular, ordered pores over a relatively large size scale, which may, in some cases, correspond to improved functional properties, such as filtration, ion exchange, and the like. Analogously, a fractal pattern generally cannot extend to size scales smaller than a size scale of building blocks of the silica-based ceramic, such as smaller than molecules or atoms. Accordingly, in some embodiments, the correlation length, $\xi$, is constrained to a value of greater than 1 nm. In some embodiments, the correlation length, $\xi$, is constrained to a value of greater than 50 nm. In some embodiments, the correlation length, $\xi$, is constrained to a value of greater than 100 nm. In some embodiments, the correlation length, $\xi$, is constrained to a value of about a thickness of the silica-based ceramic. In some embodiments, the silica-based ceramics have a correlation length, $\xi$, greater than 1 nm, such as greater than 50 nm or greater than 100 nm.

The fractal aggregate models used to characterize the silica-based ceramic may include terms to account for variability in sizes of scattering sources, such as the pores of the silica-based ceramic. In that regard, in some embodiments, the fractal aggregate model includes a polydispersity index in a radius parameter. Accordingly, in some embodiments a radius of a building block, $R_o$, is a weighted average rather than a constant. The weighted average may be according to a number of mathematical functions, such a Gaussian function, a log-normal function, a rectangular distribution, and the like. In some embodiments, the polydispersity index is Gaussian and according to the equation:

$$f(x) = \frac{1}{Norm} \exp\left(-\frac{(x - x_{mean})^2}{2\sigma^2}\right)$$

where $x_{mean}$ is a mean value of the distribution (average radius), Norm is a normalization factor determined during numerical calculation, and the polydispersity index is the ratio of $\sigma/x_{mean}$.

In some embodiments, the polydispersity ratio is log-normal and according to the equation:

$$f(x) = \frac{1}{Norm} \frac{1}{xp} \exp\left(-\frac{(\ln(x) - \mu)^2}{2p^2}\right)$$

where p is the polydispersity index, $\mu = \ln(x_{med})$, $x_{med}$ is a median value of the distribution, and Norm is a normalization factor determined during numerical calculation.

In some embodiments, log-normal distributions are advantageous as they are generally not symmetric about $x_{med}$. In this regard, as the polydispersity ratio increases, the lower tail may not fall into ranges that are aphysical, such as those which would define a pore size smaller than, for example, atoms, etc. that physically define the pores.

In some embodiments, the pores of the silica-based ceramic have a relatively low log-normal polydispersity index of pore radius. Having a relatively low log-normal polydispersity index of pore radius generally corresponds to the pores having relatively similar radii, which may be indicative of a regular, ordered structure to the pores of the silica-based ceramic. In some embodiments, the pores of the silica-based ceramic have a log-normal polydispersity index of pore radius of less than or equal to 0.8, less than or equal to 0.7, less than or equal to 0.5, less than or equal to 0.3, or less. In some embodiments, the pores of the silica-based ceramic have a log-normal polydispersity index of greater than or equal to 0 and less than or equal to 0.8, greater than or equal to 0 and less than or equal to 0.7, greater than or equal to 0 and less than or equal to 0.5, in greater than or equal to 0 and less than or equal to 0.3.

In some embodiments, the pores of the silica-based ceramic fit a Teubner-Strey model. The Teubner-Strey model was originally developed to describe the scattering patterns and microstucture of microemulsions (e.g., mixtures of water, oil, and amphiphiles). Small angle scattering experiments such as small angle neutron scattering (SANS) experiments have revealed herein that, unexpectedly, in some embodiments, cation exchange membranes or materials have a silica-based ceramic pore structure that fits such a Teubner-Strey model. A Teubner-Strey ordering is more commonly associated with packed micellar structures where the micelles enforce well-defined pore structures and pore-pore distances, rather than in ceramic-based structures observed herein.

When the pores of the silica-based ceramic fit a Teubner-Strey model of small angle scattering spectra, the intensity (I) as a function of a scattering vector, q, fits the following equation:

$$I(q) = \frac{1}{a + c_1 q^2 + c_2 q^4} + bck$$

where a, $c_1$, and $c_2$ are adjustable parameters and bck is background scattering. The pores of the silica-based ceramic may fit a Teubner-Strey model if the scattering data from a small angle scattering experiment (e.g., small angle neutron scattering, SANS) on a membrane or material containing the silica-based ceramic can be fit to a Teubner-Strey model with a $Chi^2/N$ value of less than or equal to 10, less than or equal to 5, less than or equal to 1, less or equal to 0.5, or less, where $Chi^2$ is a squared sum of an intensity difference between the mathematical model and the small angle scattering spectra data, and N is the number of points small-angle scattering data points over a model fitting range. N may be, for example, at least 30, at least 50, at least 100, at least 200, at least 500, and/or up to 1,000, up to 2,000 or more points over a model fitting range. In some embodiments, the model fitting range for q is from 0.01 Å$^{-1}$ to 1 Å$^{-1}$, or from 0.07 Å$^{-1}$ to 0.7 Å$^{-1}$.

A Teubner-Strey fitting of small angle scattering of pores of the silica-based ceramic may also afford measurements of the domain size, d, (periodicity) and correlation length, $\xi$, according to the following equations:

$$I(q) = \frac{(8\pi/\xi)\langle\eta^2\rangle c_2}{a + c_1 q^2 + c_2 q^4}$$

$$\gamma(r) = \frac{\sin kr}{kr} e^{-r/\xi}$$

$$\xi = \left[\frac{1}{2}\left(\frac{a}{c_1}\right)^{\frac{1}{2}} + \left(\frac{c_1}{4c_2}\right)\right]^{-\frac{1}{2}}$$

$$\frac{d}{2\pi} = \left[\frac{1}{2}\left(\frac{a}{c_1}\right)^{\frac{1}{2}} - \left(\frac{c_1}{4c_2}\right)\right]^{-\frac{1}{2}}$$

where $\langle\eta^2\rangle$ is the mean square to the fluctuation in scattering density of the media, $\gamma(r)$ is the real-space correlation function corresponding to I(q), and $k = 2\pi/d$. In the context of the cation exchange membranes or materials, is equivalent to the radius of the pores of the silica-based ceramic, and d is equivalent to the pore-pore distance measured from the center of two separate nearest-neighbor pores of the silica-based ceramic. Further description of the Teubner-Strey model and its application to small angle scattering measurements can be found in Schubert, K. V., Strey, R., Kline, S. R., & Kaler, E. W. (1994). Small angle neutron scattering near Lifshitz lines: Transition from weakly structured mixtures to microemulsions. *The Journal of Chemical Physics*, 101(6), 5343-5355., and Teubner, M., & Strey, R. (1987). Origin of the scattering peak in microemulsions. *The Journal of Chemical Physics*, 87(5), 3195-3200, each of which is incorporated herein by reference in its entirety for all purposes.

In some, but not necessarily all embodiments, the structure of the pores of the silica-based ceramic depends on a state of the cation exchange membrane or material. For example, it has been unexpectedly observed in the context of the present disclosure that whether the cation exchange is in a dry state or a hydrated state can in some instances affect the pore structure of the silica-based ceramic. The pores of a silica-based ceramic may fit a first mathematical model of small angle scattering spectra when the cation exchange membrane or material is in a first state (e.g., a dry state), and the pores of a silica-based ceramic may fit a second, different mathematical model of small angle scattering spectra when the cation exchange membrane or material is in a second, different state (e.g., a hydrated state). In this context, a cation exchange membrane or material is considered to be in a dry state when it has been heated in an oven at 100° C. and 0% relative humidity for 2 hours, and a cation exchange membrane or material is considered to be in a hydrated state when it is submerged in $H_2O$ or $D_2O$ at room temperature for 24 hours in a vacuum environment having a reduced pressure to pull air out of the pores but that is not low so low as to cause the $H_2O$ or $D_2O$ to boil.

As another example, in some but not necessarily all embodiments, the average pore diameter of the silica-based ceramic is larger when the cation exchange membrane or material is in a hydrated state as compared to when the cation exchange membrane or material is in a dry state. It has been observed that having an average pore diameter in a hydrated state that is greater than an average pore diameter in a dry state can result in a percolation of hydrated domains in the silica-based ceramic. Such percolation can result in improved cation transport properties (e.g., sodium ion conductivity). In some embodiments, the silica-based ceramic has an average pore diameter that is larger when the cation exchange membrane is in a hydrated state than when the cation exchange membrane is in a dry state by a factor of greater than or equal to 1.1, greater than or equal to 1.2, greater than or equal to 1.3, greater than or equal to 1.4, greater than or equal to 1.5, greater than or equal to 1.6, greater than or equal to 1.8, greater than or equal to 2, or greater. In some embodiments, the silica-based ceramic has an average pore diameter that is larger when the cation exchange membrane is in a hydrated state than when the cation exchange membrane is in a dry state by a factor of less than or equal to 5, less than or equal to 4.5, less than or equal to 4, less than or equal to 3.5, less than or equal to 3, less than or equal to 2.8, less than or equal to 2.6, less than or equal to 2.5, less than or equal to 2.4, less than or equal to 2.3, less than or equal to 2.2, less than or equal to 2.1, less than or equal to 2, or less, Combinations of these ranges are possible. For example, in some embodiments, the silica-based ceramic has an average pore diameter that is larger when the cation exchange membrane is in a hydrated state than when the cation exchange membrane is in a dry state by a factor of greater than or equal to 1.1 and less than or equal to 5, or greater than or equal to 1.3 and less than or equal to 3.

As another example, in some but not necessarily all embodiments, the pores of a silica-based ceramic fit a Teubner-Strey model of small angle scattering spectra as described above when the cation exchange membrane or material is in a dry state, and the pores of a silica-based ceramic fit a core-shell model of small angle scattering spectra as described above when the cation exchange membrane or material is in a hydrated state. It has been observed that in some embodiments, having a Teubner-Strey ordering in a dry state and a core-shell structure in a hydrated state is associated with structural changes upon water-intake that impart beneficial performance properties (e.g., cation exchange capacity, cation conductivity, permselectivity, etc.).

It has been unexpectedly observed in the context of this disclosure that whether the pore structure of a silica-based membrane depends on a state of the cation exchange membrane or material can depend on the composition of the silica-based membrane or material and/or the conditions under which the cation exchange membrane or material was made. For example, the dependence of the pore structure on a state of the cation exchange membrane or material (e.g., when dry vs. when hydrated) may depend on an amount of functional groups (e.g., sulfonic acid and/or sulfonate groups) present in the silica-based ceramic. The amount of functional groups present may in turn depend on ratios of silicon-containing precursors in, for example, a silicon-containing precursor sol during fabrication of the cation exchange membrane or material. It has unexpectedly been observed herein that in some embodiments, cation exchange membranes derived from silicon-containing precursor sols having relatively low amounts (e.g., less than or equal to 10 mol %, less than or equal to 8 mol %, less than or equal to 5 mol %, less than or equal to 1 mol %, or less) of silicon-containing precursors comprising functional groups (e.g., having structure IV or VI) have a pore structure (e.g., average pore diameter, small angle scattering model fit) that is relatively similar whether the cation exchange membrane or material is in a dry state or in a hydrated state. For example, in some such instances the average pore diameter in a hydrated state is within 10%, within 5%, or within 2% of the average pore diameter in the dry state. However, it has been observed that in some embodiments, cation exchange membranes derived from silicon-containing precursor sols having relatively high amounts (e.g., greater than or equal to 15 mol %, greater than or equal to 20 mol %, greater than or equal to 25 mol %, greater than or equal to 30 mol %, greater than or equal to 35 mol %, greater than or equal to 40 mol %, or greater) of silicon-containing precursors comprising functional groups (e.g., having structure IV or VI) have a pore structure (e.g., average pore diameter, small angle scattering model fit) that is substantially different (e.g., pore diameters in a hydrated state greater than pore diameters in a dry state by a factor of greater than or equal to 1.1, greater than or equal to 1.2, greater than or equal to 1.3, greater than or equal to 1.4, greater than or equal to 2, or greater) when the cation exchange membrane or material is in a dry state versus when it is in a hydrated state.

As mentioned above, in some embodiments, the cation exchange membrane comprises a porous support membrane. The porous membrane (e.g., porous support membrane 130) may comprise any of a variety of suitable materials and may be in any of a variety of forms.

In some embodiments, the porous support membrane comprises relatively large pores in the absence of the silica-based ceramic, such as prior to being coated with the silica-based ceramic. For example, referring back to FIG. 2A, porous support membrane 130 comprises pores that include pore 132, which is relatively large. Having relatively large pores may, in some embodiments, allow for sufficient overall permeability across the membrane as well as sufficient space for the silica-based ceramic to be present in cases in which a coating formed by the silica-based ceramic is located at least partially within the porous membrane support. In some embodiments, the porous support membrane comprises pores having an average (mean) pore diameter, in the absence of the silica-based ceramic, such as prior to being coated with the silica-based ceramic, of greater than or equal to 50 nm, greater than or equal to 75 nm, greater than or equal to 100 nm, greater than or equal to 200 nm, greater than or equal to 500 nm, greater than or equal to 1 µm, greater than or equal to 2 µm, greater than or equal to 5 µm, greater than or equal to 10 µm, greater than or equal to 15 µm, greater than or equal to 20 µm, greater than or equal to 30 µm, greater than or equal to 40 µm, or more. However, in some embodiments, the porous support membrane does not comprise pores that are so large as to cause deleterious effects on the performance or properties of the cation exchange membrane (e.g., poor mechanical burst strength, low retention of coating, etc.). In some embodiments, the porous support membrane comprises pores having an average pore diameter, in the absence of the silica-based ceramic, such as prior to being coated with the silica-based ceramic, of less than or equal to 50 µm, less than or equal to 25 µm, less than or equal to 10 µm, less than or equal to 5 µm, less than or equal to 2 µm, less than or equal to 1 µm, less than or equal to 500 nm or less. Combinations of these ranges are possible. For example, in some embodiments, the porous support membrane comprises pores having an average diameter, in the absence of the silica-based ceramic, such as prior to being coated with the silica-based ceramic, of greater than or equal to 50 nm and less than or equal to 50 µm, greater than or equal to 500 nm and less than or equal to 10 µm, or greater than or equal to 1 µm and less than or equal to 5 µm. The average pore diameter of the porous support membrane in the cation exchange membrane can be determined by Brunauer-Emmett-Teller (BET) gas sorption techniques or mercury intrusion porosimetry.

It should be understood that in some embodiments, the silica-based ceramic, when present, fills at least a portion (or all) of the pores of the porous support membrane. In such cases, the average pore diameter of the porous support membrane in the final cation exchange membrane will be smaller than the average pore diameter of the porous support membrane prior to being coated by the silica-based ceramic. Additionally and as mentioned above, in some embodiments, the silica-based ceramic itself is porous (e.g., nanoporous). As such, in some embodiments, the cation exchange membrane has a bimodal distribution of pores. For example, in some embodiments the cation exchange membrane has a bimodal distribution of pores comprising relatively small pores that correspond to the pores of the silica-based ceramic and relatively large pores that correspond to the partially-filled (e.g., 70%-filled) pores of the porous support membrane. In these embodiments, the bimodal distribution can be determined by measuring the relatively small pores using the SAXS techniques described above (e.g., to measure the pores that correspond to the silica-based ceramic), and measuring the relatively large pores using the BET gas sorption or mercury intrusion porisimetry techniques described above (e.g., to measure the pores that correspond to partially-filled pores of the porous support membrane).

In some embodiments, the relatively small pores of the bimodal distribution (e.g., that correspond to the pores silica-based ceramic) have an average pore diameter of less than or equal to 1 µm (e.g., less than or equal to 500 nm, less than or equal to 100 nm, or less than or equal to 50 nm). In some cases, the relatively small pores of the bimodal distribution (e.g., that correspond to the pores silica-based ceramic) have an average pore diameter of less than or equal to 10 nm, less than or equal to 8 nm, less than or equal to 6 nm, less than or equal to 5 nm, less than or equal to 3 nm, less than or equal to 2 nm, or less. In some embodiments, the relatively small pores of the bimodal distribution (e.g., that correspond to the pores silica-based ceramic) have an average pore diameter of greater than or equal to 0.25 nm, greater than or equal to 0.4 nm, greater than or equal to 0.6 nm, or greater than or equal to 1 nm. Combinations of these ranges are possible. For example, in some embodiments, the relatively small pores of the bimodal distribution (e.g., that correspond to the pores silica-based ceramic) have an average pore diameter of greater than or equal to 0.25 nm and less than or equal to 1 µm, greater than or equal to 0.25 nm and less than or equal to 10 nm, greater than or equal to 0.4 nanometers and less than or equal to 10 nm, greater than or equal to 0.6 nm and less than or equal to 5 nm, or greater than or equal to 0.6 nm and less than or equal to 2.5 nm.

In some embodiments, the relatively large pores of the bimodal distribution (e.g., that correspond to the partially-filled pores of the porous support membrane) have an average pore diameter of greater than or equal to 50 nm, greater than or equal to 75 nm, greater than or equal to 100 nm, greater than or equal to 200 nm, greater than or equal to 500 nm, greater than or equal to 1 µm, greater than or equal to 2 µm, greater than or equal to 5 µm, greater than or equal to 10 µm, greater than or equal to 15 µm, greater than or equal to 20 µm, greater than or equal to 30 µm, greater than or equal to 40 µm, or more. In some embodiments, the relatively large pores of the bimodal distribution (e.g., that correspond to the partially-filled pores of the porous support membrane) have an average pore diameter of less than or equal to 50 µm, less than or equal to 25 µm, less than or equal to 10 µm, less than or equal to 5 µm, less than or equal to 2 µm, less than or equal to 1 µm, less than or equal to 500 nm or less. Combinations of these ranges are possible. For example, in some embodiments, the relatively large pores of the bimodal distribution (e.g., that correspond to the partially-filled pores of the porous support membrane) have an average pore diameter of greater than or equal to 50 nm and less than or equal to 50 µm, greater than or equal to 500 nm and less than or equal to 10 µm, or greater than or equal to 1 µm and less than or equal to 5 µm.

In some embodiments, the porous support membrane has a relatively high volumetric porosity in the absence of the silica-based ceramic, such as prior to being coated with the silica-based ceramic. Having a relatively high volumetric porosity may, in some cases, allow for sufficient overall permeability as well as sufficient space for the silica-based ceramic to be present in cases in which a coating formed by the silica-based ceramic is located at least partially within the porous membrane support. In some embodiments, the porous support membrane, in the absence of the silica-based ceramic, such as prior to being coated with the silica-based ceramic, has a volumetric porosity of greater than or equal to 10%, greater than or equal to 15%, greater than or equal to 20%, greater than or equal to 30%, greater than or equal to 40, greater than or equal to 50%, greater than or equal to 60%, greater than or equal to 70%, greater than or equal to 80%, greater than or equal to 90%, or higher. In some embodiments, the porous support membrane has a volumetric porosity, in the absence of the silica-based ceramic, such as prior to being coated with the silica-based ceramic, of less than or equal to 99%, less than or equal to 95%, less than or equal to 90%, less than or equal to 80%, less than or equal to 70%, less than or equal to 60%, less than or equal to 50%, less than or equal to 40%, less than or equal to 30%, or less. Combinations of these ranges are possible. For example, in some embodiments, the porous support membrane, in the absence of the silica-based ceramic, such as prior to being coated with the silica-based ceramic, has a volumetric porosity of greater than or equal to 10% and less than or equal to 99%, greater than or equal to 50% and less than or equal to 99%, greater than or equal to 80% and less than or equal to 99%, or greater than or equal to 60% and less than or equal to 80%. It should be understood that in some embodiments, the silica-based ceramic fills at least a portion of the pores of the porous support membrane. Therefore, in some embodiments, the overall cation exchange membrane may have a volumetric porosity that is different than the volumetric porosity of the porous support membrane in the absence of the silica-based ceramic. The volumetric porosity of the porous support membrane in the cation exchange membrane can be determined by BET gas sorption techniques or mercury intrusion porosimetry.

The porous support membrane may have any suitable cross-sectional thickness. Having a suitable cross-sectional thickness can, in some cases, allow for the porous support membrane and ultimately the cation exchange membrane to have suitable mechanical properties (e.g., mechanical burst strength) and performance characteristics (e.g., by having an appropriate permeability and ion transport rate). In some embodiments, the porous support membrane has a cross-sectional thickness of greater than or equal to 3 µm, greater than or equal to 5 µm, greater than or equal to 10 µm, greater than or equal to 25 µm, greater than or equal to 50 µm, greater than or equal to 75 µm, greater than or equal to 100 µm, greater than or equal to 150 µm, greater than or equal to 200 µm, greater than or equal to 300 µm, greater than or equal to 400 µm, greater than or equal to 500 µm, or more. In some embodiments, the porous support membrane has a cross-sectional thickness of less than or equal to 1,000 µm, less than or equal to 500 µm, less than or equal to 300 µm, less than or equal to 100 µm, or less. Combinations of these ranges are possible. For example, in some embodiments, the porous support membrane has a cross-sectional thickness of greater than or equal to 3 µm and less than or equal to 1,000 µm, or greater than or equal to 25 µm and less than or equal to 300 µm. The cross-sectional thickness of the porous support membrane in the cation exchange membrane can be determined using SEM/EDX techniques on the cation exchange membrane. In some embodiments, the EDX component of the technique can be used to distinguish between the porous support membrane and other components of the cation exchange membrane, such as the silica-based ceramic.

The porous support membrane can be in the any of a variety of suitable forms. It should therefore be understood that the depiction of porous support membrane 130 in FIG. 2A is non-limiting and exemplary, and that porous support membrane 130 can be in the form of any suitable structure. In some embodiments, the porous support membrane may be in the form of a macroporous structure. For example, in some embodiments, the porous support membrane is in the form of a non-woven fabric or a non-woven mesh. In some embodiments, the porous support membrane is in the form of a veil. In some embodiments, the porous support membrane is in the form of a knit fabric. In some cases, the porous support membrane is in the form of a woven fabric or mesh. In some embodiments, the porous support membrane is in the form of an open-cell structure, such as an open-cell foam. In some embodiments, the porous support membrane is in the form of a fibril and node structure. In some cases, the porous support membrane includes combinations of multiple types of microporous structures. For example, in some embodiments, the porous support membrane includes combinations of the exemplary structures described above (e.g., non-woven fabric, open-cell foam, etc.).

The porous support membrane may be formed by any suitable method. In some embodiments, the porous support membrane is a wet-laid structure or a non-wet-laid structure (e.g., an airlaid structure, a carded structure, a meltblown structure, a meltspun structure (e.g., spunbond), a centrifugal spun web, a solvent spun web, an electroblown web, a gel spun web).

As mentioned above, in some embodiments, the porous support membrane comprises support components. The support components of the porous support membrane generally refer to the components of the porous support membrane that contribute to the overall structure and mechanical properties of the porous support membrane. For example, in some embodiments in which the porous support membrane is in the form of a non-woven fabric, the support components of the non-woven fabric may include the fibers and/or filaments from which the non-woven fabric is formed. As another example, in some embodiments in which the porous support membrane is in the form of a mesh, the support components of the mesh may include the strands of which the mesh is formed. Examples of support components include, but are not limited to, fibers, strands, and wires. Referring again to FIG. 2A, porous support membrane 130 comprises an exemplary porous support component 135, according to some embodiments.

In some embodiments, the support components have a relatively large number average diameter. In some cases, having support components have a relatively large diameter can contribute to the porous support membrane having relatively beneficial mechanical properties (e.g., relatively high mechanical burst strength). In some embodiments, the porous support membrane has a number average support component diameter (e.g., fiber diameter, cell diameter) of greater than or equal to 10 nm, greater than or equal to 25 nm, greater than or equal to 50 nm, greater than or equal to 100 nm, greater than or equal to 200 nm, greater than or equal to 500 nm, greater than or equal to 1 µm, greater than or equal to 2 µm, greater than or equal to 5 µm, greater than or equal to 10 µm, greater than or equal to 20 µm, or more. In some embodiments, the support components of the porous support membrane are not so large as to contribute to deleterious effects in the overall cation exchange membrane, such as insufficient porosity or permeability. In some embodiments, the porous support membrane has a number average support component diameter (e.g., fiber diameter, cell diameter) of less than or equal to 50 µm, less than or equal to 20 µm, less than or equal to 10 µm, less than or equal to 5 µm, less than or equal to 2 µm, less than or equal to 1 µm, less than or equal to 500 nm, less than or equal to 100 nm, or less. Combinations of these ranges are possible. For example, in some embodiments, the porous support membrane has a number average support component diameter of greater than or equal to 10 nm and less than or equal to 50 µm, greater than or equal to 10 nm and less than or equal to 20 µm, greater than or equal to 100 nm and less than or equal to 1 µm, or greater than or equal to 100 nm and less than or equal to 500 nm.

The porous support membrane may comprise any of a variety of suitable materials (e.g., organic materials, inorganic materials, or combinations thereof). In some embodiments, the porous support membrane comprises a polymeric material. In some such cases, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 75 wt %, greater than or equal to 80 wt %, greater than or equal to 90 wt %, greater than equal to 95 wt %, or more by weight of the porous support membrane is composed of one or more polymers. In some embodiments, less than or equal to 100 wt %, less than or equal to 99 wt %, less than or equal to 95 wt %, less than or equal to 90 wt %, less than or equal to 80 wt %, less than or equal to 50 wt %, less than or equal to 30 wt %, or less by weight of the porous support membrane is composed of one or more polymers. Combinations of these ranges are possible. For example, in some embodiments, greater than or equal to 20 wt % and less than or equal to 100 wt %, or greater than or equal to 50 wt % and less than or equal to 99 wt % by weight of the porous support membrane is composed of one or more polymers. Exemplary polymers that the porous support membrane can comprise include, but are not limited to, polyethylene, polyvinyl chloride, polypropylene, polystyrene, polyamide, polyimide, polyacetonitrile, polyvinylacetate, polyethylene glycol, poly ether ether ketone, polysulfone, polyacrylamide, polydimethylsiloxane, polyvinylidene fluoride, polyacrylic acid, polyvinyl alcohol, polyphenylene sulfide, polytetrafluoroethylene, cellulose, microfibrillated cellulose, nanofibrillated cellulose, or combinations or derivatives thereof.

In some embodiments, the porous support membrane comprises a ceramic or glass material. In some such cases, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 75 wt %, greater than or equal to 80 wt %, greater than or equal to 90 wt %, greater than equal to 95 wt %, or more by weight of the porous support membrane is composed of one or more ceramic or glass materials. In some embodiments, less than or equal to 100 wt %, less than or equal to 99 wt %, less than or equal to 95 wt %, less than or equal to 90 wt %, less than or equal to 80 wt %, less than or equal to 50 wt %, less than or equal to 30 wt %, or less by weight of the porous support membrane is composed of one or more one or more ceramic or glass materials. Combinations of these ranges are possible. For example, in some embodiments, greater than or equal to 20 wt % and less than or equal to 100 wt %, or greater than or equal to 50 wt % and less than or equal to 99 wt % by weight of the porous support membrane is composed of one or more one or more ceramic or glass materials. Exemplary ceramics that the porous support membrane can comprise include, but are not limited to, borosilicate glass, silica, titania, zirconia, alumina, silicon carbide, silicon nitride, boron nitride, lithium silicate, potassium silicate, tin oxide, iron oxide, or combinations thereof.

In some embodiments, the porous support membrane comprises a metal and/or metal alloy. In some such cases, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 75 wt %, greater than or equal to 80 wt %, greater than or equal to 90 wt %, greater than equal to 95 wt %, or more by weight of the porous support membrane is composed of one or more metals and/or metal alloys. In some embodiments, less than or equal to 100 wt %, less than or equal to 99 wt %, less than or equal to 95 wt %, less than or equal to 90 wt %, less than or equal to 80 wt %, less than or equal to 50 wt %, less than or equal to 30 wt %, or less by weight of the porous support membrane is composed of one or more metals and/or metal alloys. Combinations of these ranges are possible. For example, in some embodiments, greater than or equal to 20 wt % and less than or equal to 100 wt %, or greater than or equal to 50 wt % and less than or equal to 99 wt % by weight of the porous support membrane is composed of one or more metals and/or metal alloys. Exemplary metals that the porous support membrane can comprise include, but are not limited to, iron, nickel, copper, titanium, aluminum, or combinations thereof. One non-limiting example of a metal alloys that the porous support membrane can comprise is steel.

In some embodiments, the porous support membrane comprises a combination of the material described above. For example, in some embodiments, the porous support membrane comprises a combination of a polymeric material and a ceramic or glass material (or a polymeric material and a metal and/or metal alloy, or a ceramic material and a metal and/or metal alloy). One non-limiting example is an embodiment in which the porous support membrane comprises a glass material (e.g. borosilicate glass) containing one or more polymeric materials (e.g., one or more polymeric binders that may enhance mechanical properties of the porous support membrane).

In some, but not necessarily all embodiments, the porous support membrane comprises one or more amphiphilic molecules on a surface of the porous support membrane. Inclusion of one or more amphiphilic molecules on a surface of the porous support membrane may, in some cases, promote enhanced wetting of solutions used during fabrication of the cation exchange membrane. For example, in some cases, the cation exchange membrane is fabricated via application of a sol-gel solution to the porous support membrane. In some cases, such enhanced wetting may contribute to a reduction in cracking during certain fabrication steps, such in cases where drying steps are performed. In some such cases, having one or more amphiphilic molecules present on a surface of the porous support membrane may promote wetting of the sol-gel ceramic material on the porous support membrane. In some cases, in amphiphilic molecule is covalently bound to at least a portion of the porous support membrane (e.g., as a surface functional group). In some embodiments, the amphiphilic molecule is coated on or within the porous support membrane (e.g., prior to coating the porous support membrane with the sol-gel). Exemplary amphiphilic molecules include, but are not limited to, sodium alkyl sulfates (e.g., sodium dodecyl sulfate), dialkyl sulfosuccinate, and alkyltrimethylammonium bromide.

In some embodiments, the porous support membrane has a relatively high surface area (e.g., prior to being coated with a silica-based ceramic). Having a relatively high surface area of the porous support membrane can, in some cases, promote adhesion between the porous support membrane and the silica-based ceramic. One exemplary way in which a relatively high surface area of the porous support membrane may be achieved is by etching the porous support membrane prior to coating the porous support membrane with the silica-based ceramic. The porous support membrane can be etched, in some cases, with an appropriate solvent, acid, caustic, or oxidizer. In some embodiments, the porous support membrane has a specific surface area of greater than or equal to 0.0001 m$^2$/g, greater than or equal to 0.0002 m$^2$/g, greater than or equal to 0.0005 m$^2$/g, greater than or equal to 0.001 m$^2$/g, greater than or equal to 0.002 m$^2$/g, greater than or equal to 0.005 m$^2$/g, greater than or equal to 0.01 m$^2$/g, greater than or equal to 0.02 m$^2$/g, greater than or equal to 0.05 m$^2$/g, greater than or equal to 0.1 m$^2$/g, greater than or equal to 0.2 m$^2$/g, greater than or equal to 0.5 m$^2$/g, or greater prior to being coated with a silica-based ceramic. In some embodiments, the porous support membrane has a specific surface area of less than or equal to 100 m$^2$/g, less than or equal to 50 m$^2$/g, less than or equal to 20 m$^2$/g, less than or equal to 10 m$^2$/g, less than or equal to 5 m$^2$/g, less than or equal to 2 m$^2$/g, less than or equal to 1 m$^2$/g, or less prior to being coated with a silica-based ceramic. Combinations of these ranges are possible. For example, in some embodiments, the porous support membrane has a specific surface area of greater than or equal to 0.0001 m$^2$/g and less than or equal to 100 m$^2$/g, greater than or equal to 0.001 m$^2$/g and less than or equal to 10 m$^2$/g, or greater than or equal to 0.01 m$^2$/g and less than or equal to 1 m$^2$/g prior to being coated with a silica-based ceramic. The specific surface area of the porous support membrane prior to being coated with the silica-based ceramic can be determined using BET gas sorption techniques (either before the silica-based ceramic coating is formed, or by removing the silica-based ceramic from the cation exchange membrane).

In some embodiments, a relatively high percentage of the pore volume of the porous support membrane is filled by the silica-based ceramic that coats at least a portion of the porous support membrane. The percentage of the pore volume of the porous support membrane filled by the silica-based ceramic can be determined, for example, using SEM. Generally, several images are taken of both the top and cross-section of the cation exchange membrane at various magnifications from 200× for the top up to 2000× for the cross-section. These images can be compared to images of the porous support membrane at the same magnifications. To determine the extent to which the pore volume of the porous support membrane is filled with the silica-based ceramic, the cross-section of the cation exchange membrane is inspected. A cation exchange membrane in which the pore volume of the porous support membrane is well-filled with the silica-based ceramic will look dense with little to no obvious macropores or open areas. In some cases, if there are places that are less dense (e.g., cracks, smaller pores, etc.), it can be beneficial if they are not structured in such a way as to create a clear pathway for liquid to travel from one side of the cation exchange membrane to the other. Likewise, in some embodiments, it can be beneficial if the cation exchange membrane is such that images of the top of the membrane look smooth and uniform. In some embodiments, it is beneficial if the membranes have relatively little surface excess of silica-based ceramic. Surface excess of silica-based ceramic in the cation exchange membrane can be determined by inspecting the SEM for regions of the silica-based ceramic on the top or bottom surface of the porous support membrane. In some embodiments, the surface excess of silica-based ceramic on top of the porous support membrane is less than or equal to 200 μm, less than or equal to 20 μm, less than or equal to 2 μm, or less, as determined by SEM.

In some embodiments, greater than or equal to 50%, greater than or equal to 60%, greater than or equal to 70%, greater than or equal to 75%, greater than or equal to 80%, greater than or equal to 90%, greater than or equal to 95%, greater than or equal to 96%, greater than or equal to 97%, greater than or equal to 98%, greater than or equal to 99%, greater than or equal to 99.9%, and/or up to 100% of the pore volume of the porous support membrane is filled by the silica-based ceramic. In some embodiments, less than or equal to 100%, less than or equal to 99.9%, less than or equal to 99%, less than or equal to 98%, less than or equal to 97%, less than or equal to 96%, less than or equal to 95%, less than or equal to 90%, less than or equal to 80%, less than or equal to 75%, less than or equal to 70%, or less than or equal to 60% of the pore volume of the porous support membrane is filled by the silica-based ceramic. Combinations of these ranges are possible. For example, in some embodiments, greater than or equal to 50% and less than or equal to 100%, greater than or equal to 75% and less than or equal to 100%, greater than or equal to 90% and less than or equal to 100%, or greater than or equal to 97% and less than or equal to 100% of the pore volume of the porous support membrane is filled by the silica-based ceramic, as determined by SEM. For example, SEM images can be acquired for a representative number of cross-sections (e.g., at least three cross section) of different regions of the membrane sample. Image processing software (e.g., ImageJ) can then be used to highlight the contrast between the void regions (which typically appear black in the images) and filled regions (which typically appear gray in the images) and divide the area of the void region by the total area probed. So long as you provide a sufficiently large sample size (~0.5 cm$^2$ in images) you could determine the total "void area" relative to the total area of the cross-section. It would be important to pull cross-sections from multiple regions of the membrane to try to get a somewhat representative sample.

The cation exchange membrane may have any suitable thickness. For example, referring to FIG. 1A, cation exchange membrane 100 has a thickness 154. The thickness of the cation exchange membrane may be selected based on, for example, the application for which the cation exchange membrane is intended or the geometry of a device into which the cation exchange membrane is to be incorporated (e.g., an electrochemical device, a filtration device, etc.). In some embodiments, the cation exchange membrane has a thickness of greater than or equal to 1 μm, greater than or equal to 3 μm, greater than or equal to 5 μm, greater than or equal to 10 μm, greater than or equal to 25 μm, greater than or equal to 50 μm, greater than or equal to 100 μm, greater than or equal to 200 μm, greater than or equal to 300 μm, greater than or equal to 400 μm, greater than or equal to 500 μm, greater than or equal to 700 μm, greater than or equal to 1,000 μm, greater than or equal to 1,200 μm, or more. In some embodiments, the cation exchange membrane has a thickness of less than or equal to 1,500 μm, less than or equal to 1,000 μm, less than or equal to 500 μm, less than or equal to 300 μm, less than or equal to 100 μm, less than or equal to 75 μm, less than or equal to 50 μm, or less. Combinations of these ranges are possible. For example, in some embodiments, the porous support membrane has a cross-sectional thickness of greater than or equal to 1 μm and less than or equal to 1,500 μm, or greater than or equal to 25 μm and less than or equal to 300 μm. The thickness of the porous support membrane in the cation exchange membrane can be determined by taking an SEM cross-section of the cation exchange membrane or by using calipers.

In some embodiments, the weight ratio of the silica-based ceramic to the porous support membrane in the cation exchange membrane is greater than or equal to 1:10, greater than or equal to 1:5, greater than or equal to 1:2, greater than or equal to 1:1, greater than or equal to 2:1, greater than or equal to 5:1, greater than or equal to 10:1, greater than or equal to 20:1, greater than or equal to 35:1, greater than or equal to 50:1, greater than or equal to 75:1, greater than or equal to 100:1, or greater. In some embodiments, the weight ratio of the silica-based ceramic to the porous support membrane in the cation exchange membrane is less than or equal to 300:1, less than or equal to 250:1, less than or equal to 220:1, less than or equal to 200:1, less than or equal to 150:1, less than or equal to 120:1, less than or equal to 100:1, less than or equal to 75:1, less than or equal to 50:1, less than or equal to 35:1, less than or equal to 20:1, less than or equal to 10:1, less than or equal to 5:1, less than or equal to 2:1, less than or equal to 1:1, less than or equal to 1:2, less than or equal to 1:5, or less. Combinations of these ranges are possible. For example, in some embodiments, the weight ratio of the silica-based ceramic to the porous support membrane in the cation exchange membrane is greater than or equal to 1:10 and less than or equal to 300:1, or greater than or equal to 1:2 and less than or equal to 220:1.

In some embodiments, the cation exchange membrane has a density of greater than or equal 0.8 g/cm$^3$, greater than or equal 0.9 g/cm$^3$, greater than or equal 1.0 g/cm$^3$, greater than or equal 1.2 g/cm$^3$, greater than or equal 1.5 g/cm$^3$, greater than or equal 1.8 g/cm$^3$, or greater. In some embodiments, the cation exchange membrane has a density of less than or equal to 2.2 g/cm$^3$, less than or equal to 2.1 g/cm$^3$, less than or equal to 2.0 g/cm$^3$, less than or equal to 1.9 g/cm$^3$, less than or equal to 1.8 g/cm$^3$, less than or equal to 1.7 g/cm$^3$, less than or equal to 1.6 g/cm$^3$, less than or equal to 1.5 g/cm$^3$, less than or equal to 1.2 g/cm$^3$, or less. Combinations of these ranges are possible. For example, in some embodiments, the cation exchange membrane has a density of greater than or equal to 0.8 g/cm$^3$ and less than or equal to 2.2 g/cm$^3$, or greater than or equal to 1.0 and less than or equal to 2.0 g/cm$^3$.

In some embodiments, the cation exchange membrane has a basis weight of greater than or equal 320 g/m$^2$, greater than or equal 350 g/m$^2$, greater than or equal to 400 g/m$^2$, greater than or equal to 450 g/m$^2$, greater than or equal to 500 g/m$^2$, greater than or equal to 550 g/m$^2$, greater than or equal to 600 g/m$^2$ or greater. In some embodiments, the cation exchange membrane has a basis weight of less than or equal to 880 g/m$^2$, less than or equal to 850 g/m$^2$, less than or equal to 800 g/m$^2$, less than or equal to 750 g/m$^2$, less than or equal to 700 g/m$^2$, less than or equal to 650 g/m$^2$, less than or equal to 600 g/m$^2$, less than or equal to 550 g/m$^2$, less than or equal to 500 g/m$^2$, or less. Combinations of these ranges are possible. For example, in some embodiments, the cation exchange membrane has a basis weight of greater than or equal to 320 g/m$^2$ and less than or equal to 800 g/m$^2$. The basis weight can be measured, for example, by cutting a 0.1 m$^2$ portion of the cation exchange membrane into 10 samples and measuring the weight of each sample after drying at 80° C. in a 0% humidity chamber for 24 hours.

In some embodiments, the cation exchange membrane has a specific surface area of greater than or equal 50 m$^2$/g, greater than or equal 75 m$^2$/g, greater than or equal to 100 m$^2$/g, greater than or equal to 150 m$^2$/g, greater than or equal to 200 m$^2$/g, greater than or equal to 300 m$^2$/g, greater than or equal to 400 m$^2$/g, greater than or equal to 500 m$^2$/g, or greater. In some embodiments, the cation exchange membrane has a specific surface area of less than or equal to 1,000 m$^2$/g, less than or equal to 900 m$^2$/g, less than or equal to 800 m$^2$/g, less than or equal to 750 m$^2$/g, less than or equal to 700 m$^2$/g, less than or equal to 650 m$^2$/g, less than or equal to 600 m$^2$/g, less than or equal to 550 m$^2$/g, less than or equal 500 m$^2$/g, or less. Combinations of these ranges are possible. For example, in some embodiments, the cation exchange membrane has a specific surface area of greater than or equal to 500 g/m$^2$ and less than or equal to 1,000 g/m$^2$.

Figure 5:
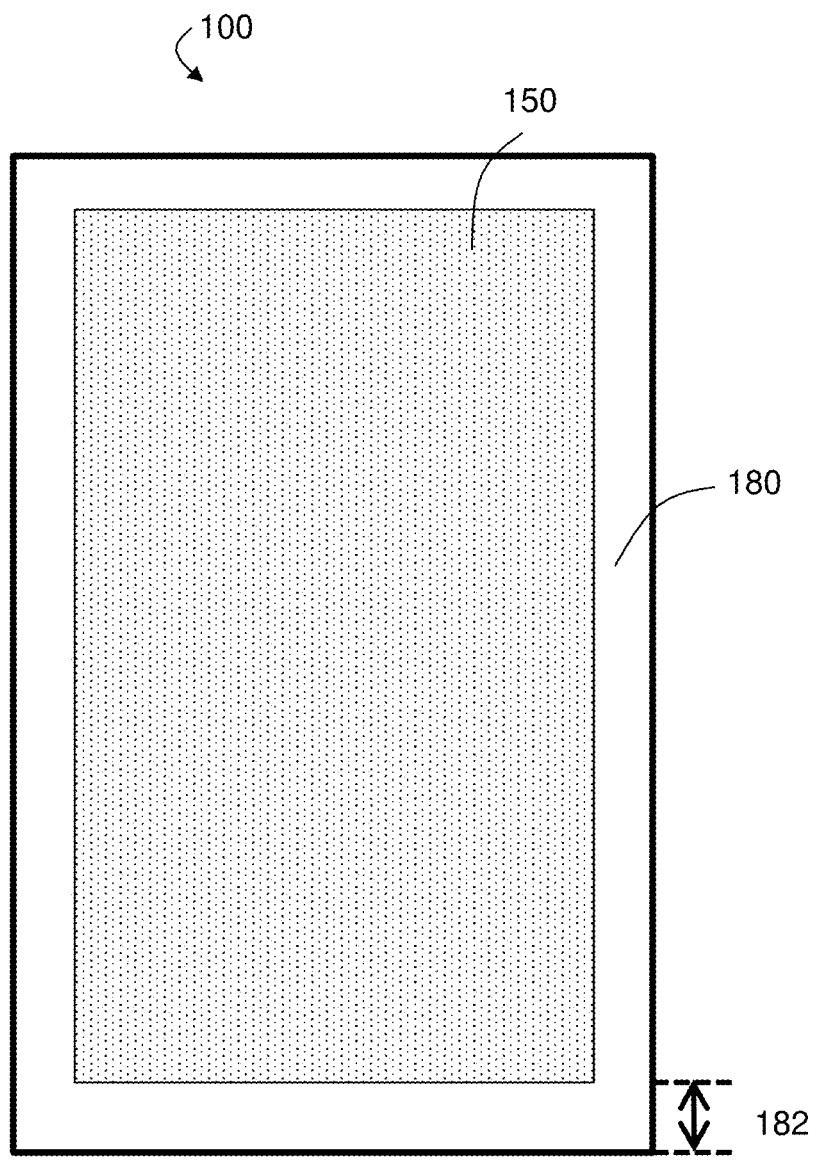
FIG. 5 is a schematic top-down illustration of an exemplary cation exchange membrane comprising a silica-based ceramic and a compressible edging material, according to some embodiments.

In some embodiments, the cation exchange membrane comprises a compressible edging material. Such a compressible edging may, in certain cases, serve as a gasket that can seal the membrane. Having a compressible edging material that can serve as a gasket may be useful in some cases in which the cation exchange membrane is incorporated into an electrochemical device (e.g., a battery, fuel cell, etc.). In some cases, the compressible edging material is mechanically compressible. In some embodiments, the compressible edging material is resistant to heat and/or harsh chemical environments. FIG. 5 depicts an exemplary illustration of a non-limiting embodiment in which a cation exchange membrane 100 comprises an optional compressible edging material 180.

In some embodiments, the cation exchange membrane comprises a compressible edging material along at least a portion of an edge of the cation exchange membrane. In some embodiments, the compressible edging material infiltrates the porous support membrane by at least 1 μm. For example, referring again to FIG. 5, in some embodiments cation exchange membrane 100 comprises a silica-containing ceramic 150, compressible edging material 180, and porous support membrane 130 hidden behind silica-based ceramic 130 and compressible edging material 180, according to some embodiments. In some such cases, compressible edging material 180 infiltrates porous support membrane 130 by at least 1 μm. In some embodiments, the compressible edging is located along all edges of the cation exchange membrane, defining a gasket (e.g., as shown in FIG. 5). In some embodiments, the compressible edging material covers about 50% or less, 25% or less, 10% or less, or 5% or less of a surface of the cation exchange membrane. In some embodiments, the percentage of the external geometrical surface area of the cation exchange membrane not covered by the compressible edging material is greater than or equal to 50%, greater than or equal to 90%, greater than or equal to 95%, or more. In some embodiments, the percentage of the external geometric surface area of the cation exchange membrane not covered by the compressible edging material is greater than or equal to 1 cm$^2$, greater than or equal to 10 cm$^2$, greater than or equal to 100 cm$^2$, greater than or equal to greater than or equal to 1,000 cm$^2$ and/or up to 1 m$^2$, up to 2 m$^2$, up to 5 m$^2$, up to 10 m$^2$, or more. The compressible edging material may have a width. For example, compressible edging material 180 in FIG. 5 has width 182. In some embodiments, the compressible edging material is 1 mm or greater in width. In some embodiments the compressible edging material is 5 mm or greater in width. In some embodiments, the edge portion is 1 cm or greater in width.

The compressible edging material can be formed on the cation exchange membrane using any suitable method. For example, in some embodiments, the compressible edging material is formed on the porous support membrane prior to forming the silica-based ceramic coating on and/or within the porous support membrane. In some cases, the compressible edging material is formed on the porous support membrane after forming the silica-based ceramic coating on and/or within the porous support membrane.

In some embodiments, forming the compressible edging material includes a step of impregnating an edge portion of the porous support membrane with a polymeric material, for example, impregnating regions at or near one or more or all edges of the porous support membrane with a compressible polymer, sufficient to form a gasket bordering the porous membrane support membrane (and ultimately the cation exchange membrane). In some embodiments, the compressible edging material is formed using ultrasonic welding, hot pressing, or UV curing. In some embodiments, impregnating the edge portion of the porous support membrane with the compressible polymer comprises one or more techniques chosen from melting, solution deposition, or in situ reaction.

In some embodiments, the compressible edging material comprises a polymeric material. In some embodiments, the polymeric material comprises an elastomeric polymer, such as a thermoplastic elastomeric polymer. Any suitable elastomeric polymer can be used to form the compressible edging material of the cation exchange membranes disclosed herein. Exemplary polymeric materials that the compressible edging material can comprise include, but are not limited to silicone, epoxy, polyurethane, acrylic, silicone rubber, poly(styrene-isoprene-styrene), poly(styrene-isobutylene-styrene), polypropylene, polyethylene, polyvinyl chloride, polystyrene, polyamide, polyimide, polyacetonitrile, polyvinylacetate, polyethylene glycol, poly ether ether ketone, polysulfone, polyacrylamide, polydimethylsiloxane, polyvinylidene fluoride, polyacrylic acid, polyvinyl alcohol, polyphenylene sulfide, polytetrafluoroethylene, cellulose, or combinations or derivatives thereof.

As mentioned above, in some cases, inventive features associated with the cation exchange membrane and materials described herein can contribute to any of a number of potentially advantageous performance characteristics.

In some embodiments, the cation exchange membrane or material (e.g., cation exchange membrane 100) has a relatively high cation exchange capacity. Having a relatively high cation exchange capacity is generally associated with good performance characteristics for a cation exchange material. The cation exchange capacity of a material such as membrane can be measured using the following procedure. A cation exchange membrane is soaked in sulfuric acid (1.0 M) for at least 20 minutes, with the sulfuric acid solution being exchanged twice with fresh sulfuric acid solution during this 20 minute time period. After soaking in the sulfuric acid solution, the membrane is soaked in deionized water for at least 15 minutes, with the deionized water being exchanged twice with fresh deionized water during this 15 minute time period. After soaking in the deionized water, the membrane is soaked in an aqueous solution containing 0.50 M sodium sulfate for at least 20 minutes, with the 0.50 M sodium sulfate solution being exchanged twice with fresh 0.50 M sodium sulfate solution (0.50 M sodium sulfate in otherwise deionized water) during this 20 minute period. The cation exchange membrane is removed from the sodium sulfate solution and rinsed with deionized water. All of the sodium sulfate solutions as well as the rinse solutions are then combined and titrated with an aqueous solution containing 0.010 M sodium hydroxide using phenolphthalein as an indicator. The titration ends when solution becomes purple in color. An autotitrator can be used to perform the titration. A set of "blank" sodium sulfate solutions that are not exposed to the cation exchange membrane are used and titrated to determine a baseline pH background for the aqueous solutions. The membrane is rinsed with deionized water and dried in an oven overnight. The weight and of the membrane is recorded following drying step. The cation exchange capacity (CEC) is measured using:

$$CEC = \frac{V_{titrant} C_{titrant}}{w_{dry}}$$

where $V_{titrant}$ is the volume of the sodium hydroxide titrant added during the titration, corrected for the baseline pH of the aqueous solutions ($V_{titrant} = V_{titrant,membrane} - V_{titrant,blanks}$), $C_{titrant}$ is the concentration of the titrant (0.010 M in this case), and $w_{dry}$ is the weight of the dried membrane in grams. In this disclosure, cation exchange capacity is reported in units of eq/g, which are equivalents (eq) per unit weight (g, grams). The number of equivalents in a solution refers to the numbers of moles of an ion (e.g., protons) in solution multiplied by the valence of the ions. The same procedure described above can be used for any cation exchange materials and is not limited to just membranes.

In some embodiments, it has been observed that cation exchange membranes described herein having a relatively high loading of certain functional groups (e.g., sulfonate and/or sulfonic acid groups, carboxylate and/or carboxylic acid groups, etc.) contributes at least in part to the relatively high cation exchange capacity as compared to certain existing cation exchange membranes. Additionally, it has been observed that the cation exchange capacity of cation exchange membranes and materials described herein may also depend at least in part on the composition of a silicon-containing precursor sol from which a silica-based ceramic of the cation exchange membrane is derived (e.g., water to silicon ratio, acid strength, ratio of silicon-containing precursors such as TEOS and MPTES).

In some embodiments, the cation exchange membrane or material has a cation exchange capacity of greater than or equal to 0.01 milliequivalents per gram (meq/g). In some embodiments, the cation exchange membrane or material has a cation exchange capacity of greater than or equal to 0.1 meq/g, greater than or equal to 0.2 meq/g, greater than or equal to 0.3 meq/g, greater than or equal to 0.5 meq/g, greater than or equal to 0.7 meq/g, greater than or equal to 1 meq/g, greater than or equal to 1.2 meq/g, greater than or equal to 1.5 meq/g, greater than or equal to 1.7 meq/g, or greater. In some embodiments, the cation exchange membrane or material has a cation exchange capacity of less than or equal to 2.5 meq/g, less than or equal to 2.2 meq/g, 2 meq/g, less than or equal to 1.8 meq/g, less than or equal to 1.5 meq/g, less than or equal to 1.2 meq/g, less than or equal to 1 meq/g, less than or equal to 0.7 meq/g, or less. Combinations of these ranges are possible. For example, in some embodiments, the cation exchange membrane or material has a cation exchange capacity of greater than or equal to 0.01 meq/g and less than or equal to 2.5 meq/g, greater than or equal to 0.1 meq/g and less than or equal to 2.5 meq/g, greater than or equal to 0.5 meq and less than or equal to 2.5 meq/g, or greater than or equal to 1 meq/g and less than or equal to 2.5 meq/g. In some embodiments, the cation exchange membrane or material has a relatively high cation exchange capacity while having a relatively high amount of Si present in the silica-based ceramic of the cation exchange membrane. For example, in some embodiments, the cation exchange membrane has a cation exchange capacity of greater than or equal to 0.01 meq/g, greater than or equal to 0.1 meq/g, greater than or equal to 0.2 meq/g, greater than or equal to 0.3 meq/g, greater than or equal to 0.5 meq/g, greater than or equal to 0.7 meq/g, greater than or equal to 1 meq/g and/or up to 1.2 meq/g, up to 1.5 meq/g, up to 1.8 meq/g, or up to 2 meq/g while having Si present in the silica-based ceramic in an amount of at least 6 wt %, at least 10 wt %, at least 12 wt %, at least 15 wt %, at least 17 wt %, at least 20 wt %, and/or up to 24 wt %, up to 26 wt %, up to 28 wt %, up to 30 wt %, up to 40 wt %, up to 47 wt %, up to 60 wt %, or more.

In some embodiments, the cation exchange membrane or material undergoes a relatively small amount of dimensional swelling (in the form of linear expansion), according to a dimensional swelling test described herein. As mentioned above, having a relatively small amount of dimensional swelling can, in some cases, be advantageous for a cation exchange membrane or material. It has been observed that cation exchange membranes and materials described herein, some of which comprise a silica-based ceramic, may undergo relatively less dimensional swelling (e.g., linear expansion) than certain existing cation exchange membrane or materials, such as those comprising predominantly polymeric components such as hydrocarbon or fluorocarbon polymers. Without wishing to be bound by any particular theory, it is believed that linear expansion can occur when a membrane's pore size or structure changes (e.g., swelling, de-swelling) based on the environment of the cation exchange membrane (e.g., temperature, humidity, salinity). When a cation exchange membrane is incorporated into devices where the edges of the membrane are fixed in place, for example, an electrochemical device (e.g., an electrochemical stack), the swelling/de-swelling can result in mechanical stresses that can cause membrane failure. Having a relatively low linear expansion can also make it easier to align membranes (e.g., via making alignment holes in the membrane) when positioning membranes in a device (e.g., a stack) during assembly. However, in some embodiments, it is beneficial to have some amount of linear expansion (e.g., via swelling) to allow for percolation of hydrated domains and beneficial performance characteristics (e.g., cation exchange capacity, sodium ion conductivity). The linear expansion of a cation exchange membrane can be measured using the following dimensional swelling test. The dimensional swelling test is conducted using a modified version of ASTM D756 and ASTM D570. The membrane sample is cut into a 50 mm×50 mm square and conditioned in a room maintained at 23° C. and 50% relative humidity for 48 hours. After conditioning, the length and width of the membrane sample is measured. The sample is then soaked in either 23° C. water or 100° C. water for one hour. After the soaking, the membrane is removed from the water and wiped with a dry cloth. Immediately after the membrane is wiped with the cloth, the length of each side is recorded. The linear expansion for a given dimension (e.g., length or width) is determined by dividing the measured length of that dimension following the step of wiping the membrane with a dry cloth by the original 50 mm length, and is reported as a percentage change relative to the original 50 mm length. For example, a membrane for which a length of 55 mm is measured following the soaking and wiping with the cloth has a linear expansion of 10%, while a membrane for which a length of 60 mm is measured following the soaking and wiping with the cloth has a linear expansion of 20%. The linear expansion of a cation exchange membrane is determined by performing the above-mentioned dimensional swelling test on three identical samples and determining the number average of the three tests.

In some embodiments, the cation exchange membrane has a relatively small linear expansion, as mentioned above. In some embodiments, the cation exchange membrane has a linear expansion along at least one dimension of less than or equal to 10%, less than or equal to 8%, less than or equal to 6%, less than or equal to 5%, less than or equal to 2%, less than or equal to 1%, less than or equal to 0.5%, or less. In some embodiments, the cation exchange membrane has a linear expansion of as low as 0% along at least one dimension. In some embodiments, the cation exchange membrane has a linear expansion of greater than or equal to 0%, greater than or equal to 0.01%, or greater than or equal to 0.1% along at least one dimension. Combinations of these ranges are possible. For example, in some embodiments, the cation exchange membrane has a linear expansion of greater than or equal to 0% and less than or equal to 5%, greater than or equal to 0% and less than or equal to 2%, greater than or equal to 0% and less than or equal to 1%, or greater than or equal to 0% and less than or equal to 0.5% along at least one dimension.

In some embodiments, the cation exchange membrane has a relatively small linear expansion while having a relatively large cation exchange capacity. For example, in some embodiments, the cation exchange membrane has a linear expansion of less than or equal to 20%, less than or equal to 15%, less than or equal to 10%, less than or equal to 8%, less than or equal to 6%, less than or equal to 5%, less than or equal to 2%, less or equal to 1%, less than or equal to 0.5%, or less along at least one dimension while having a cation exchange capacity of greater than or equal to 0.01 meq/g, greater than or equal to 0.01 meq/g, greater than or equal to 0.2 meq/g, greater than or equal to 0.3 meq/g, greater than or equal to 0.5 meq/g, greater than or equal to 0.7 meq/g, greater than or equal to 1 meq/g, and/or up to 1.2 meq/g, up to 1.5 meq/g, up to 1.8 meq/g, up to 2 meq/g, up to 2.5 meq/g or more. Obtaining such high cation exchange capacities while undergoing such a small amount of dimensional swelling (e.g., linear expansion) when exposed to water may not be possible with certain existing cation exchange membranes or materials.

In some embodiments, the cation exchange membrane or material has a relatively high cation permselectivity. Cation permselectivity generally refers to a metric quantifying an extent to which a membrane or material is more permeable to cations than anions. Selectivity toward cations relative to anions may, in certain applications, be an important characteristic of a cation exchange membrane. Herein, cation permselectivity is measured by comparing the permeability of the membrane or material to sodium cations as compared to chloride anions. The permselectivity is measured in this case using an open circuit voltage method. The open circuit voltage method is well known in literature, being described, for example, in Galama, A. H.; Hoog, N. A.; Yntema, D. R., Method for determining ion exchange membrane resistance for electrodialysis systems. Desalination 2016, 380, 1-11, and in Kingsbury, R. S.; Flotron, S.; Zhu, S.; Call, D. F.; Coronell, O., Junction Potentials Bias Measurements of Ion Exchange Membrane Permselectivity. Environmental Science & Technology 2018, 52 (8), 4929-4936, both of which are incorporated herein by reference in their entirety. In the performance of the open circuit voltage method tests, the membrane is equilibrated in a 0.5 M NaCl aqueous solution prior to testing. The membrane is then installed in a two-compartment cell. One compartment of the cell is filled with 100 mL of 0.5 M NaCl aqueous solution, while the other compartment is filled with 100 mL of 0.1 M NaCl aqueous solution. Each compartment of the two-compartment cell is stirred, and fresh solution is pumped through each compartment at a rate of approximately 5 mL/min. AgCl wire electrodes and a multimeter (e.g., Fluke 116 True RMS) is used to make the voltage measurements. The AgCl wire electrodes are immersed in the respective compartments, and the multimeter is set to the dc voltage setting. The multimeter probes are connected to the respective AgCl wires, and a voltage reading is taken from the multimeter. The wires are allowed to equilibrate for 30 minutes before the final membrane potential is recorded. The cation permselectivity is then calculated using the Nernst equation. The offset potential of the AgCl wires is measured in the 0.5 M NaCl and 0.1 M NaCl solutions, and averaged to account for the reference potential in the final calculations.

In some embodiments, the cation exchange membrane or material has a cation permselectivity of greater than or equal 65%. In some embodiments, the cation exchange membrane has a cation permselectivity of greater than or equal to 70%, greater than or equal to 75%, greater than or equal to 80%, greater than or equal to 85%, greater than or equal to 90%, greater than or equal to 95%, greater than or equal to 97%, greater than or equal to 98%, or higher. In some embodiments, the cation exchange membrane has a cation permselectivity of less than or equal to 100%, less than or equal to 99%, less than or equal to 98%, less than or equal to 97%, less than or equal to 95%, less than or equal to 90%, less than or equal to 85%, less than or equal to 80%, or less. Combinations of these ranges are possible. For example, in some embodiments, the cation exchange membrane has a cation permselectivity of greater than or equal to 65% and less than or equal to 100%, greater than or equal to 85% and less than or equal to 100%, greater than or equal to 90% and less than or equal to 100% percent, greater than or equal to 95% and less than or equal to 100%, or greater than or equal to 98% and less than or equal to 100%.

In some embodiments, the cation exchange membrane has a relatively high sodium ion (Na$^+$) conductivity ($C_{Na}$). Sodium ion conductivity can be a useful metric in evaluating the conductivity of the cation exchange membrane with respect to cations such as sodium ions. Having a relatively high sodium ion conductivity may be important in certain applications, such as certain electrochemical applications (e.g., electrodialysis applications). For example, a relatively high sodium ion conductivity can, in some embodiments, promote energy efficiency in electrochemical systems. It has been observed that the cation exchange membranes described herein may have a relatively high sodium ion conductivity at least in part due to inventive characteristics of the cation exchange membranes, such as relatively high loadings of functional groups (e.g., sulfonate and/or sulfonic acid groups, carboxylate and/or carboxylic acid groups, etc.). The sodium ion conductivity may also be affected by the pore structure of the silica-based ceramic (e.g., pore diameter, pore-pore distance, pore ordering such as fractal aggregate vs. otherwise). It has been observed herein that sodium ion conductivity is not necessarily correlated with other properties of a cation exchange membrane or material (e.g., cation exchange capacity), and that structural and compositional factors leading to relatively high sodium conductivity may differ from those affecting other properties. For example, if a cation exchange membrane comprises functional groups (e.g., sulfonic acid and/or sulfonate groups) localized near exterior surfaces of the cation exchange membrane, the membrane could have a relatively high cation exchange capacity but a poor sodium ion conductivity because the functional groups would not be distributed through a thickness of the membrane. In contrast, a cation exchange membrane with an effective distribution (e.g., a substantially homogeneous distribution) of functional groups may have both a relatively high cation exchange capacity and a relatively high sodium ion conductivity. Factors affecting such a distribution can include choice of precursor materials (e.g., silicon-containing precursor materials), ratios of precursor materials (e.g., in a silicon-containing precursor sol), and choice of porous support membrane (if present).

As another example, certain existing cation exchange compositions having higher amounts of functional groups (e.g., sulfonic acid and/or sulfonate groups) generally tend to experience greater linear expansion because the functional groups tend to adsorb water, leading to swelling. It has been realized herein that it is possible to achieve cation exchange membranes having relatively high sodium ion conductivity and relatively low linear expansion. One way to achieve such a result is by designing a pore structure of a silica-based ceramic such that the membrane swells enough upon hydration to achieve percolated pores, but not so much that the pores become too large and lack permselectivity while causing significant linear expansion. In some embodiments, percolated pores resulting from some swelling of the membrane can promote both relatively high sodium ion conductivity and relatively high cation exchange capacity.

The sodium ion conductivity of the cation exchange membrane can be measured using the following four-electrode electrical impedance spectroscopy (EIS) procedure. A four-electrode electrical impedance spectroscopy procedure is described in more detail in Galama, A. H.; Hoog, N. A.; Yntema, D. R., Method for determining ion exchange membrane resistance for electrodialysis systems. Desalination 2016, 380, 1-11, which is incorporated herein by reference in its entirety. The membrane is equilibrated in a solution of 0.5 M NaCl prior to testing. The membrane is then incorporated into a two-compartment cell. Prior to incorporating the membrane into the two compartment cell, the two-compartment cell is first assembled and filled with the 0.5 M NaCl solution in order to measure a background resistance of the cell. The cell is then emptied, reassembled with the membrane and filled with the 0.5 NaCl solution, at which point another resistance measurement is acquired. A galvanostatic EIS measurement is used. A constant current of 5 mA is applied to working platinum electrodes and is swept from 10,000 Hz to 10 Hz with 15 points measured per decade. Ag/AgCl reference electrodes are used to measure the resulting voltage across membrane. The resistances for the blank cell and cell with the membrane incorporated are taken from the x-axis intercept of the resulting Nyquist plot, indicating the real component of the impedance, and the difference corresponds to the resistance of the membrane. The conductance is determined by taking the reciprocal of the resistance, and is normalized to the membrane surface area and thickness to determine the sodium ion conductivity.

In some embodiments, the cation exchange membrane or material has a sodium ion conductivity of greater than or equal to 0.00001 S/cm. In some embodiments, the cation exchange membrane or material has a sodium ion conductivity of greater than or equal to 0.00005 S/cm, greater than or equal to 0.0001 S/cm, greater than or equal to 0.0005 S/cm, greater than or equal to 0.001 S/cm, greater than or equal to 0.005 S/cm, greater than or equal to 0.01 S/cm, or greater. In some embodiments, the cation exchange membrane or material has a sodium ion conductivity of less than or equal to 0.3 S/cm, less than or equal to 0.2 S/cm, less than or equal to 0.1 S/cm, less than or equal to 0.05 S/cm, less than or equal to 0.02 S/cm, less than or equal to 0.01 S/cm, less than or equal to 0.005 S/cm, less than or equal to 0.001 S/cm, less than or equal to 0.0005 S/cm, or less. Combinations of these ranges are possible. For example, in some embodiments, the cation exchange membrane or material has a sodium ion conductivity of greater than or equal to 0.00001 S/cm and less than or equal to 0.3 S/cm, greater than or equal to 0.001 S/cm and less than or equal to 0.3 S/cm, or greater than or equal to 0.01 S/cm and less than or equal to 0.3 S/cm.

In some embodiments, the cation exchange membrane or material has a relatively high sodium ion conductivity and a relatively high cation exchange capacity. For example, in some embodiments, the cation exchange membrane has a sodium ion conductivity of greater than or equal to 0.00001 S/cm, greater than or equal to 0.00005 S/cm, greater than or equal to 0.0001 S/cm, greater than or equal to 0.0005 S/cm, greater than or equal to 0.001 S/cm, greater than or equal to 0.005 S/cm, greater than or equal to 0.01 S/cm, and/or up to 0.02 S/cm, up to 0.05 S/cm, up to 0.1 S/cm, up to 0.2 S/cm, or up to 0.3 S/cm, while having a cation exchange capacity of greater than or equal to 0.01 meq/g, greater than or equal to 0.1 meq/g, greater than or equal to 0.2 meq/g, greater than or equal to 0.3 meq/g, greater than or equal to 0.5 meq/g, greater than or equal to 0.7 meq/g, greater than or equal to 1 meq/g and/or up to 1.2 meq/g, up to 1.5 meq/g, up to 1.8 meq/g, or up to 2 meq/g. Combinations of the above-referenced ranges as well as other ranges of sodium ion conductivity and/or cation exchange capacity described elsewhere herein are also possible.

In some embodiments, the cation exchange membrane or material has a relatively high sodium ion conductivity and a relatively low linear expansion. For example, in some embodiments, the cation exchange membrane has a sodium ion conductivity of greater than or equal to 0.00001 S/cm, greater than or equal to 0.00005 S/cm, greater than or equal to 0.0001 S/cm, greater than or equal to 0.0005 S/cm, greater than or equal to 0.001 S/cm, greater than or equal to 0.005 S/cm, greater than or equal to 0.01 S/cm, and/or up to 0.02 S/cm, up to 0.05 S/cm, up to 0.1 S/cm, up to 0.2 S/cm, or up to 0.3 S/cm, while having a linear expansion of less than or equal to 10%, less than or equal to 8%, less than or equal to 6%, less than or equal to 5%, less than or equal to 2%, less than or equal to 1%, less than or equal to 0.5%, or less. Combinations of the above-referenced ranges as well as other ranges of sodium ion conductivity and/or linear expansion described elsewhere herein are also possible.

In some embodiments, the cation exchange membrane has a relatively low osmotic water permeance. The osmotic water permeance of a membrane generally refers to the flux of water across the membrane due to osmotic pressure. Having a relatively low osmotic water permeance may be beneficial in certain applications, such as applications where the cation exchange membrane is used in electrochemical applications such as electrodialysis applications. Details of an exemplary test for determining the osmotic water permeance of the membrane are described by Kingsbury, Ryan; Zhu, Shan; Flotron, Sophie; Coronell, Orlando (2018): Microstructure determines water and salt permeation in commercial ion exchange membranes. ChemRxiv. Preprint and in Kingsbury, R. S., Zhu, S., Flotron, S., & Coronell, O. (2018). Microstructure determines water and salt permeation in commercial ion-exchange membranes. ACS applied materials & interfaces, 10(46), 39745-39756, each of which is incorporated herein by reference in its entirety. The osmotic water permeance of the membranes described herein can be determined using the following procedure. The membrane is incorporated into a two-compartment cell and the volumetric flow rate of water across the membrane is measured to determine the flux of water across the membrane due to osmotic pressure. One compartment of the two-compartment cell is filled with a 2-4 M NaCl aqueous solution prior to testing. To begin the test, the membrane is assembled into the two-compartment cell and one compartment of the two-compartment cell is filled with a 2-4 M NaCl aqueous solution, and the other compartment of the two-compartment cell is filled with deionized water. Before recording any volume changes, the membrane is left exposed to the concentration gradient between the 4 M NaCl solution and the deionized water solution in their respective compartments for at least one hour to establish a pseudo-steady state of water transported membrane. The cell is then emptied, and fresh 2-4 M NaCl and deionized water are used to refill the cell completely. The cell is sealed with a lid that is fit with a volumetric syringe that has 0.01 mL increments and the levels of the solution in the cell are adjusted to be approximately equal at the start of the test. The two compartments of the two-compartment cell are agitated via stirring with stir bars for the duration the test. Once the levels are equal, a stopwatch is started and the volume changes over time are recorded until at least 0.05 mL of volume change is observed in each compartment.

Water permeance (A $[L \cdot m^{-2} \cdot h^{-1} \cdot bar^{-1}]$) relates to the hydraulic flux ($J_W$ $[L \cdot m^{-2} \cdot h^{-1}]$) of water across the membrane:

$$J_W = A(\Delta P - \Delta \pi) = \frac{P_W}{L}(\Delta P - \Delta \pi)$$

where $\Delta P$ and $\Delta \pi$ [bar] are the differences in hydraulic and osmotic pressure across the membrane, respectively. The flux, $J_W$, can be calculated from the flow rate of water across the membrane ($Q_W$ $[L \cdot h^{-1}]$) divided by the membrane area $[m^2]$:

$$J_W = \frac{Q_W}{A}$$

The flow rate can be determined by calculating the slope of the volume readings over time for each compartment and taking the average of the two sides (the slopes should be similar in magnitude and opposite in sign). Since there is no external hydraulic pressure being applied to the membranes during the test ($\Delta P=0$), the osmotic pressure is calculated from the composition of the solutions using the Gibbs equation to account for the non-ideality of the concentrated solution.

$$\Delta \pi = \pi_c - \pi_d = \pi_c = -\frac{RT}{V_W}\ln(a_W)$$

The water activity is calculated using the Pitzer activity model via the freely-available pyEQL software.

In some embodiments, the cation exchange membrane has an osmotic water permeance of less than or equal to 100 mL/(hr·bar·m$^2$), less than or equal to 50 mL/(hr·bar·m$^2$). In some embodiments, the cation exchange membrane has an osmotic water permeance of less than or equal to 45 mL/(hr·bar·m$^2$), less than or equal to 40 mL/(hr·bar·m$^2$), less than or equal to 35 mL/(hr·bar·m$^2$), less than or equal to 30 mL/(hr·bar·m$^2$), less than or equal to 20 mL/(hr·bar·m$^2$), less than or equal to 15 mL/(hr·bar·m$^2$), less than or equal to 10 mL/(hr·bar·m$^2$), less than or equal to 5, less than or equal to 4, less than or equal to 3, less than or equal to 2.5, less than or equal to 2 mL/(hr·bar·m$^2$), or less. In some embodiments, the cation exchange membrane has an osmotic water permeance of greater than or equal to 0 mL/(hr·bar·m$^2$), greater than or equal to 0.1 mL/(hr·bar·m$^2$), greater than or equal to 0.2 mL/(hr·bar·m$^2$), greater than or equal to 0.3 mL/(hr·bar·m$^2$), greater than or equal to 0.5 mL/(hr·bar·m$^2$), greater than or equal to 0.8 mL/(hr·bar·m$^2$), greater than or equal to 1 mL/(hr·bar·m$^2$), greater than or equal to 1.2 mL/(hr·bar·m$^2$), greater than or equal to 1.5 mL/(hr·bar·m$^2$), greater than or equal to 2 mL/(hr·bar·m$^2$), greater than or equal to 5 mL/(hr·bar·m$^2$), or more. Combinations of these ranges are possible. For example, in some embodiments, the cation exchange membrane has an osmotic water permeance of greater than or equal to 0 mL/(hr·bar·m$^2$) and less than or equal to 100 mL/(hr·bar·m$^2$), greater than or equal to 0 mL/(hr·bar·m$^2$) and less than or equal to 50 mL/(hr·bar·m$^2$), greater than or equal to 0 mL/(hr·bar·m$^2$) and less than or equal to 10 mL/(hr·bar·m$^2$), greater than or equal to 0 mL/(hr·bar·m$^2$) and less than or equal to 5 mL/(hr·bar·m$^2$), or greater than or equal to 0 mL/(hr·bar·m$^2$) and less than or equal to 2 mL/(hr·bar·m$^2$).

In some embodiments, the cation exchange membrane has a relatively large water uptake. As used herein, the water uptake of the membrane refers to the amount of water a membrane can absorb when soaked in water at 100° C. The water uptake of the membrane can be measured using the following procedure. The membrane is cut into a 50 mm×50 mm square and dried in an oven set to a temperature of greater than 105° C. for 24 hours. The weight of the membrane is measured after drying. The water uptake is then measured by immersing the membrane in boiling water at 100° C. for one hour. The membrane is then removed from the boiling water bath and the surface water is wiped off with a dry cloth. The membrane is then weighed immediately after the step of wiping the membrane with the cloth. This procedure is performed separately on three identical membranes, and the number average for the change in weight of the membrane following the immersion in the boiling water is used to determine the water uptake of the membrane. It has been unexpectedly observed that, in some embodiments, cation exchange membranes described herein (e.g., cation exchange membranes comprising a silica-based ceramic comprising covalently bound functional group such as sulfonate and/or sulfonic acid groups) are capable of relatively high water uptake while undergoing a relatively small amount of dimensional swelling (e.g., linear expansion) compared to certain existing cation exchange membranes. The water uptake can be represented as a percentage change in weight relative to the weight of the dried membrane.

In some embodiments, the cation exchange membrane has a water uptake greater than or equal to 1%, greater than or equal to 3%, of greater than or equal to 5%, greater than or equal to 8%, greater than or equal to 10%, greater than or equal to 15%, greater than or equal to 20%, greater than or equal to 25%, greater than or equal to 30%, greater than or equal to 35%, greater than or equal to 40%, greater than or equal to 45%, greater than or equal to 50%, greater than or equal to 60%, greater than or equal to 70%, or more. In some embodiments, the cation exchange membrane has water uptake of less than or equal to 100%, less than or equal to 90%, less than or equal to 85%, less than or equal to 80%, less than or equal to 75%, less than or equal to 70%, less than or equal to 65%, less than or equal to 60%, less than or equal to 50%, less than or equal to 40%, less than or equal to 35%, less than or equal to 25%, less than or equal to 15%, less than or equal to 10%, or less. Combinations of these ranges are possible. For example, in some embodiments, the cation exchange membrane has a water uptake of greater than or equal to 1% and less than or equal to 100%, greater than or equal to 5% and less than or equal to 50%, or greater than or equal to 10% and less than or equal to 25%.

In some embodiments, the cation exchange membrane has a relatively high water uptake and a relatively low linear expansion. In some embodiments, the cation exchange membrane has a water uptake of greater than or equal to 1%, greater than or equal to 3%, of greater than or equal to 5%, greater than or equal to 8%, greater than or equal to 10%, greater than or equal to 15%, greater than or equal to 20%, greater than or equal to 25%, greater than or equal to 30%, greater than or equal to 35%, greater than or equal to 40%, greater than or equal to 45%, greater than or equal to 50%, or greater than or equal to 60%, greater than or equal to 70%, while having a linear expansion of less than or equal to 10%, less than or equal to 8%, less than or equal to 6%, less than or equal to 5%, less than or equal to 2%, less than or equal to 1%, less than or equal to 0.5%, or less. Combinations of the above-referenced ranges as well as other ranges of water uptake and/or linear expansion described elsewhere herein are also possible.

In some embodiments, the cation exchange membrane has a relatively high mechanical burst pressure. Mechanical burst pressure of a membrane generally refers to the amount of force that can be applied to the membrane prior to the membrane undergoing mechanical failure and bursting. Having a relatively high mechanical burst pressure can, in some instances, be advantageous for a cation exchange membrane. For example, in certain applications involving flowing solutions in contact with the cation exchange membrane (e.g., redox flow batteries) or applying a hydrostatic or hydraulic pressure to the cation exchange membrane (e.g., reverse osmosis or nanofiltration), having a sufficient mechanical burst pressure can be important in avoiding failure of the membrane during operation. It has been observed that, in some embodiments, the cation exchange membranes described herein can possess good mechanical properties such as a high mechanical burst pressure while also possessing good performance characteristics (e.g., cation exchange capacity, cation permselectivity). In certain cases, such a combination of good mechanical properties and good performance characteristics can be achieved by combining the silica-based ceramic (which may impart good cation exchange performance characteristics) with the porous support membrane (which may impart good mechanical performance).

The mechanical burst pressure of the cation exchange membrane can be determined using the following procedure. The procedure can be used to determine a burst pressure in units of Newtons (N). The procedure is carried out based on a modified version of ASTM D6797. A membrane having a circular shape with a diameter of 70 mm is kept hydrated in water prior to testing. The membrane is removed from the water, and excess water on the surface of the membrane is wiped off with a dry cloth. After the step of wiping the membrane with a dry cloth, the membrane is clamped in a fixture with a ring clamp having an internal diameter of 40 mm in the center of the membrane. A polished steel ball having a diameter 25 mm is used to apply a force to the membrane. The polished steel ball is attached to the movable part of a tensile test machine of the constant rate of extension type. The tensile test machine is started by setting the moving rate to 305 mm/minute, and ball movement is maintained until the membrane bursts.

As mentioned above, in some embodiments, the cation exchange membrane has a relatively high mechanical burst pressure, as measured using the procedure described above. In some embodiments, the cation exchange membrane has a mechanical burst pressure of at least 1.5 N, at least 1.7 N, at least 2.0 N, at least 5 N, at least 10 N, at least 25 N, or more. In some embodiments, the cation exchange membrane has a mechanical burst pressure of less than or equal to 1,000 N, less than or equal to 900 N, less than or equal to 800 N, less than or equal to 700 N, less than or equal to 600 N, less than or equal to 500 N, less than or equal to 400 N, less than or equal to 250 N, less than or equal to 100 N, less than or equal to 75 N, less than or equal to 50 N, less than or equal to 25 N, or less. Combinations of these ranges are possible. For example, in some embodiments, the cation exchange membrane has a mechanical burst pressure of at least 1.5 N and less than or equal to 1,000 N, or greater than or equal to 1.7 N and less than or equal to 400 N.

The mechanical burst pressure of the cation exchange membrane can also be determined in units of pressure. Such units provide a measure that is independent of dimensional properties of the cation exchange membrane (e.g., membrane area). The mechanical burst pressure of the cation exchange membrane can be determined in units of pressure using the following procedure. The procedure is carried out based on a modified version of ASTM D3786 using a Cyeeyo 302AQT burst tester. A membrane having a circular shape with a diameter of 40 mm is kept hydrated in water prior to testing. The membrane is removed from the water, and excess water on the surface of the membrane is wiped off with a dry cloth. After the step of wiping the membrane with a dry cloth, the membrane is clamped in a fixture with a ring clamp having an internal diameter of 33 mm in the center of the membrane. During the test, the diaphragm of the burst tester below the sample is expanded upwards until the point of specimen rupture. The burst point, indicated as the peak pressure value, can be read from display of the burst test. The burst point corresponds to the mechanical burst pressure.

As mentioned above, in some embodiments, the cation exchange membrane has a relatively high mechanical burst pressure, as measured in units of pressure using the procedure described above. In some embodiments, the cation exchange membrane has a mechanical burst pressure of at least 2.0 pounds per square inch (PSI), at least 2.1 PSI, at least 2.5 PSI, at least 3.0 PSI, at least 3.5 PSI, at least 4.0 PSI, at least 5.0 PSI, at least 6.0 PSI, at least 8.0 PSI, at least 10.0 PSI, at least 12.0 PSI, at least 15.0 PSI, at least 20.0 PSI, at least 25.0 PSI, at least 30.0 PSI, at least 40.0 PSI, at least 50.0 PSI, at least 60.0 PSI, at least 75.0 PSI, at least 100.0 PSI, or more. In some embodiments, the cation exchange membrane has a mechanical burst pressure of less than or equal to 1,000 PSI, less than or equal to 900 PSI, less than or equal to 800 PSI, less than or equal to 700 PSI, less than or equal to 600 PSI, less than or equal to 500 PSI, less than or equal to 400 PSI, less than or equal to 250 PSI, less than or equal to 150 PSI, less than or equal to 100 PSI, less than or equal to 90 PSI, less than or equal to 80 PSI, less than or equal to 75 PSI, less than or equal to 70 PSI, less than or equal to 65 PSI, less than or equal to 60 PSI, less than or equal to 55 PSI, less than or equal to 50 PSI, less than or equal to 40 PSI, less than or equal to 30 PSI, less than or equal to 25 PS, less than or equal to 10 PSI or less. Combinations of these ranges are possible. For example, in some embodiments, the cation exchange membrane has a mechanical burst pressure of at least 2.0 PSI and less than or equal to 1,000 PSI, greater than or equal to 5.0 PSI and less than or equal to 400 PSI, or greater than or equal to 20 PSI and less than or equal to 60 PSI.

In some embodiments, the cation exchange membrane has a relatively high proton conductivity. Having a relatively high proton conductivity can be important in certain applications, such as electrochemical applications. The relatively high proton conductivity of the cation exchange membrane described herein may be due, at least in part, to the structure (e.g., nanoporosity) and/or the composition of the cation exchange membrane (e.g., a silica-based ceramic comprising a relatively high loading of functional groups such as sulfonate and/or sulfonic acid groups covalently bound to the silica-based ceramic). The proton conductivity of the membrane can be determined using the following procedure, which employs a corrected galvanodynamic measurement and resistor model, which has been described, for example, in Slade, S.; Campbell, S. A.; Ralph, T. R.; Walsh, F. C., Ionic Conductivity of an Extruded Nafion 1100 EW Series of Membranes. Journal of The Electrochemical Society 2002, 149 (12), A1556-A1564, which is incorporated herein by reference in its entirety. The procedure involves using a 4 M $H_2SO_4$ aqueous solution as an electrolyte for testing. The membrane is soaked in the 4 M $H_2SO_4$ aqueous solution for two hours prior to testing to equilibrate the membrane with the solution. The membrane to be tested is incorporated into an H-cell attached with Luggin capillaries is used for the test. Each compartment half-cell compartment of the H-cell contains 20 mL of 4 M $H_2SO_4$ aqueous solution. Glassy carbon and platinum electrodes are used as reference electrodes, and two platinum mesh electrodes are used as the working electrodes. A current range of 0.1-0.5 A with a ramp of 5 mA/s is implemented for each cycle, and five cycles are run for the membrane. The DC voltage is measured in response to the applied current, and a current-voltage curve slope is used to determine the membrane resistance. This procedure is performed on four different membranes as replicates to determine error bars for the resistance measurement. The conductance of the membrane is determined by taking the reciprocal of the measured resistance, and the resulting conductance is normalized to the membrane active area and thickness to arrive at the proton conductivity. The membrane active area is the active area is the area of the membrane available for ion transport. In other words, the membrane active area is the total membrane surface area minus the area which is consumed by non-active material (e.g., edging material or a gasket material in the cell).

In some embodiments, the cation exchange membrane has a proton conductivity of greater than or equal to 0.001 S/cm, greater than or equal to 0.005 S/cm, greater than or equal to 0.01 S/cm, greater than or equal to 0.05 S/cm, greater than or equal to 0.1 S/cm, or greater when measured in 4 M $H_2SO_4$. In some embodiments, the cation exchange membrane has a proton conductivity of less than or equal to 10 S/cm, less than or equal to 5 S/cm, less than or equal to 1 S/cm, less than or equal to 0.5 S/cm, less than or equal to 0.1 S/cm, less than or equal to 0.05 S/cm, less than or equal to 0.01 S/cm, or less when measured in 4 M $H_2SO_4$. Combinations of these ranges are possible. For example, in some embodiments, the cation exchange membrane has a proton conductivity of greater than or equal to 0.001 S/cm and less than or equal to 10 S/cm, greater than or equal to 0.01 S/cm and less than or equal to 10 S/cm, or greater than or equal to 0.001 S/cm and less than or equal to 10 S/cm when measured in 4 M $H_2SO_4$.

In some embodiments, the cation exchange membrane and has a relatively low permeability of multivalent cations versus monovalent cations. For example, in some embodiments, the cation exchange membrane has a relatively low vanadium(IV) ion permeability. Having a relatively low vanadium(IV) ion permeability may be useful in certain applications, such as certain redox flow battery applications.

The vanadium(IV) ion permeability of the membrane can be determined using the following procedure involving UV-visible absorption spectroscopy of vanadium ion diffusion across the cation exchange membrane over time. The membrane is incorporated into an H-cell having two 10 mL compartments. One half-cell compartment contains an aqueous solution containing 1 M $MgSO_4$ and 2.5 M $H_2SO_4$, and the other half-cell compartment contains an aqueous solution containing 1 M $VOSO_4$ and 2.5 M $H_2SO_4$. The permeability value can then be extracted using an exponential model such as the model described in Izquierdo-Gil, M. A.; Barragin, V. M.; Villaluenga, J. P. G.; Godino, M. P., Water uptake and salt transport through Nafion cation-exchange membranes with different thicknesses. Chemical Engineering Science 2012, 72, 1-9, which is incorporated herein by reference in its entirety. The exponential model involves tracking the concentration of $VOSO_4$ in the respective chambers as a function of timing and fitting the following equation:

$$c_1(t) = \frac{c_1^0 + c_2^0}{2} - a\frac{\Delta c^0}{2}\exp\left(-\frac{2AP_{ms}t}{V}\right)$$

where $c_1^0$ is the initial $VOSO_4$ concentration in the dilute compartment (0 M $VOSO_4$), and $c_2^0$ is the initial $VOSO_4$ concentration in the concentration compartment (2.5 M $VOSO_4$). The value of $c_1(t)$ is measured over time by taking aliquots (less than 100 μL in volume) from the dilute chamber as a function of time. The aliquots analyzed using a UV-vis spectrophotometer and the concentration of $VOSO_4$ is calculated using the extinction coefficient of 12.9 $M^{-1}$ $cm^{-1}$ at a wavelength of 765 nm. The concentration versus time data can be fit using the equation for $c1(t)$ above, where only a and the permeability constant $P_{ms}$ vary. In general, the value of a will be very close to unity.

In some embodiments, the cation exchange membrane has a vanadium (IV) ion permeability ($P_{ms}$) of greater than or equal to $10^{-9}$ $cm^2/min$, greater than or equal to $10^{-8}$ $cm^2/min$, greater than or equal to $10^{-7}$ $cm^2/min$, or greater, when measured using the vanadium(IV) ion permeability test described above. In some embodiments, the cation exchange membrane has a vanadium(IV) ion permeability of less than or equal to $10^{-4}$ $cm^2/min$, less than or equal to $10^{-5}$ $cm^2/min$, less than or equal to $10^{-6}$ $cm^2/min$, or less, when measured using the vanadium(IV) ion permeability test described above. Combinations of these ranges are possible. For example, in some embodiments, the cation exchange membrane has a vanadium (IV) ion permeability of greater than or equal to $10^{-9}$ $cm^2/min$ and less than or equal to $10^{-4}$ $cm^2/min$, greater than or equal to $10^{-9}$ $cm^2/min$ and less than or equal to $10^{-5}$ $cm^2/min$, or greater than or equal to $10^{-9}$ $cm^2/min$ and less than or equal to $10^{-6}$ $cm^2/min$, when measured using the vanadium(IV) ion permeability test described above.

In certain aspects, methods of fabricating the cation exchange membranes in materials described herein are provided. One exemplary method of fabricating the cation exchange membrane involves a sol-gel process.

Figure 6:
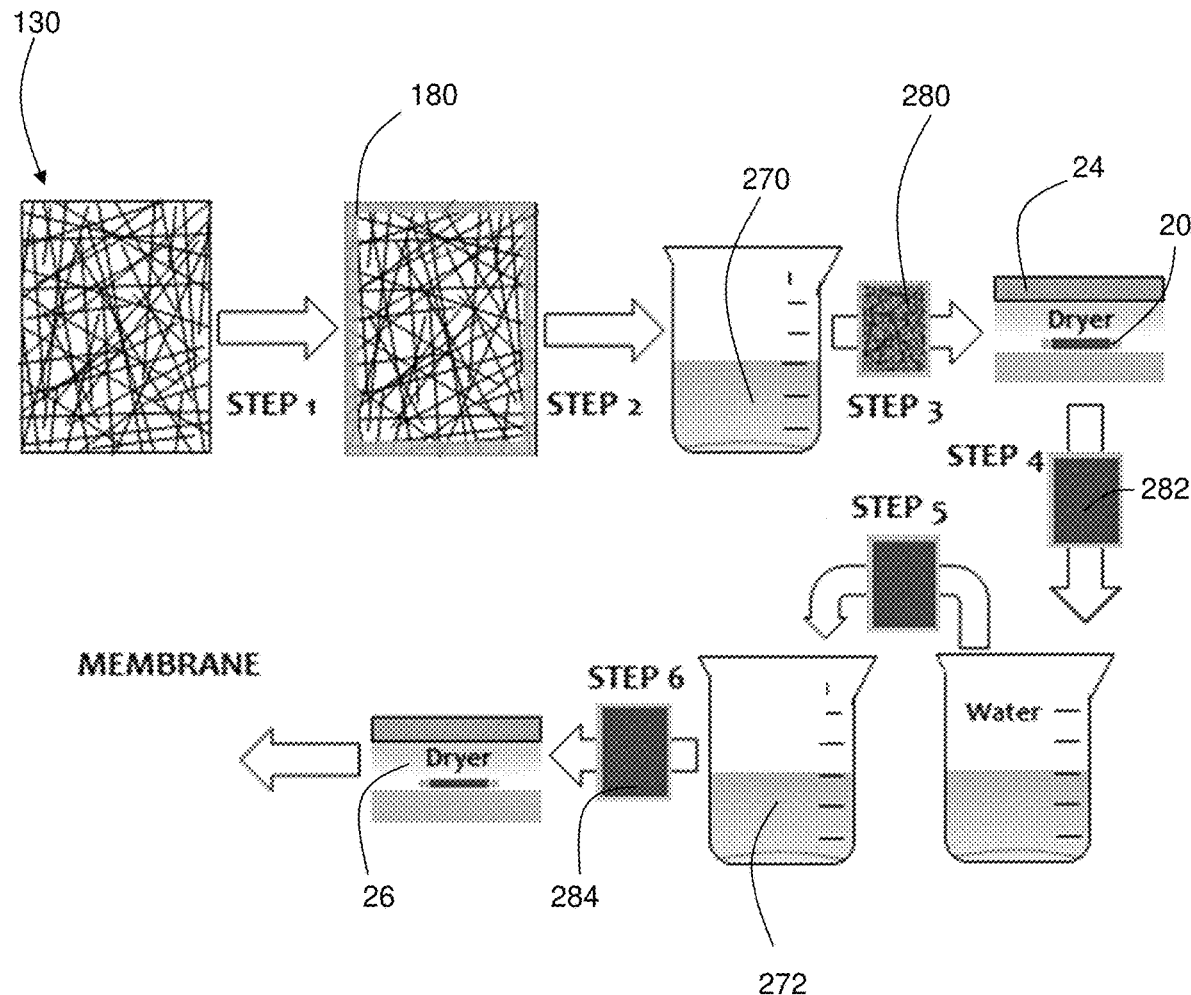
FIG. 6 is a flow diagram showing steps of an exemplary procedure for fabricating a ceramic cation exchange membrane, according to some embodiments.

FIG. 6 is a flow diagram illustrating one non-limiting method of fabricating a cation exchange membrane. In some embodiments, a porous support membrane, as described herein, is provided. For example, FIG. 6 shows a porous support membrane 130. In some cases, an optional step of applying a compressible edging material to the porous support membrane is performed. For example, as shown in step 1 in FIG. 6, a compressible edging material 180 is formed on porous support membrane 130.

In a non-limiting case, the optional compressible edging material is formed at least in part by adding a polymer to the top surface of the porous support membrane such that the polymer infiltrates the entire thickness of the porous support membrane and forms a border having a width of at least 1 μm around the edge region of the porous support membrane. Such a compressible edging material may, in some cases, act as a gasket capable of contributing to sealing the cation exchange membrane (e.g., in a cell). The method of forming the compressible edge material depends on the composition (e.g., polymeric material) used to form the compressible edging material. In some cases, the compressible edging material can be applied as a film and/or sheet using heating, solvent, or radiation. In some embodiments, the optional compressible edging material can be applied to the porous support membrane from a liquid phase as a solution or dispersion using any of a variety of known coating techniques (e.g., dip, spray, drop, blade, screen, etc.). In some embodiments, the method of forming the compressible edging material can include a step of performing an in situ reaction after deposition of the precursor material. For example, in some cases, an in situ reaction takes place in which deposited monomeric units react to form a polymer within the porous support membrane. In some embodiments, the percentage of the external geometrical surface area of the porous support membrane not covered by the compressible edging material is greater than or equal to 30%, greater than or equal to 40%, greater than or equal to 50%, greater than or equal to 70%, greater than or equal to 80%, greater than or equal to 90%, greater than or equal to 95%, greater than or equal to 99% or more. In some embodiments, the area of the external geometric surface area of the porous support membrane not covered by the compressible edging material is greater than or equal to 1 $cm^2$, greater than or equal to 10 $cm^2$, greater than or equal to 100 $cm^2$, greater than or equal to greater than or equal to 1,000 $cm^2$ and/or up to 1 $m^2$, up to 2 $m^2$, up to 5 $m^2$ 10 $m^2$, or more.

In some embodiments, a silicon-containing precursor sol is applied to the porous support membrane during the fabrication of the cation exchange membrane. For example, referring again to FIG. 6, in step 2, a silicon-containing precursor sol is applied to porous support membrane 130 (optionally comprising compressibility material 180) via solution 270. Exemplary compositions of the silicon-containing precursor sol are described herein. In some embodiments, the silicon-containing precursor sol is applied to the porous support membrane such that the silicon-containing precursor sol wicks into the porous support membrane and coats at least a portion of the porous support membrane. In some embodiments, the sol wicks into the interior of the porous support membrane and in some cases fills some or all of the porous volume of the porous support membrane. The silicon-containing precursor sol (e.g., solution 270) can be applied to the porous support membrane using one or more standard coating processes such as dip coating, spray coating, roll coating, blade coating, screen printing, or blowing with air (e.g., with an air knife) according to some embodiments. Excess silicon-containing precursor sol can be removed via any suitable method, such as scraping. The porous support membrane can be in any of a variety of orientations (e.g., vertical, horizontal) during the step of applying the silicon-containing precursor sol to the porous support membrane. In some embodiments, the silicon-containing precursor sol can be applied to the porous support membrane when the porous support membrane is flat and free standing. In some embodiments, the silicon-containing precursor sol can be applied to the porous support membrane when the porous support membrane is flat and contacting another surface. In some embodiments, the silicon-containing precursor sol can be applied to the porous support membrane when the porous support membrane is curved and free standing. In some embodiments, the silicon-containing precursor sol can be applied to the porous support membrane when the porous support membrane is curved and contacting another surface. As one example, in some cases, the porous support membrane can be arranged to be in a cylindrical or conical shape during the application of the silicon-containing precursor sol (e.g., solution 270 in FIG. 6). In some embodiments, the silicon-containing precursor sol can be applied to the porous support membrane when the membrane is held taut in at least one dimension.

In some embodiments, the silicon-containing precursor sol is a single phase sol prior to and/or during the step of applying the silicon-containing precursor sol to the porous support membrane. For example, in embodiments in which the silicon-containing precursor sol comprises two or more different types of silicon-based precursors (e.g., both a silane comprising a functional group such as a sulfonate or sulfonic acid group and a silane that does not comprise such a functional group), the silicon-containing precursor sol is a homogeneous mixture comprising the two or more different types of silicon-based precursors. Applying a single phase sol can, in some cases, allow for the formation of a coating of the silica-based ceramic on the porous support membrane having a number of desirable properties, such as relatively high loading and/or substantially homogeneous distribution of functional groups (e.g., sulfonate and/or sulfonic acid groups) in the coating.

In some embodiments, the silicon-containing precursor sol (e.g., solution 270 in FIG. 6) is aged prior to the step of applying the silicon-containing precursor sol to the porous support membrane. In some embodiments, the aging can occur for at least zero minutes, at least 30 minutes, at least two hours, or more, from the time the precursor materials are mixed together to form the sol. In some embodiments, the aging can occur for less than or equal to one week, less than or equal to 48 hours, less than or equal to 24 hours, or less. Combinations of these ranges are possible. For example, in some embodiments, the aging can occur for at least 0 minutes and less than or equal to one week, greater than or equal to 30 minutes and less than or equal to 48 hours, or greater than or equal to two hours and less than or equal to 24 hours. In some embodiments, the temperature of the silicon-containing precursor sol during the aging is at least 0° C., at least 20° C., at least 30° C., or more. In some embodiments, the temperature of the silicon-containing precursor sol during the aging is less than or equal to 80° C., less than or equal to 60° C., less than or equal to 50° C., or less. Combinations of these ranges are possible. For example, in some embodiments, the temperature of the silicon-containing precursor sol during aging is at least 0° C. and less than or equal to 80° C., at least 20° C. and less than or equal to 60° C., or at least 30° C. and less than or equal to 50° C. In some cases, silicon-containing precursor sol is aged in an open atmosphere (e.g., open to ambient air), while in some embodiments the converting step is performed in a sealed atmosphere (e.g., in atmosphere fluidically isolated from ambient air). Aging in an open atmosphere can allow for at least partial evaporation during aging, which may be desirable in some but not necessarily all embodiments. Aging in an sealed atmosphere may reduce or eliminate evaporation during aging, which may be desirable in some but not necessarily all embodiments.

In some embodiments, the porous support membrane, now comprising at least a portion of the silicon-containing precursor sol, is removed from the solution used to apply the silicon-containing precursor sol, and a step of converting the silicon-containing precursor sol to the silica-based ceramic is performed. For example, now referring to step 3 in FIG. 6, porous support membrane 130, at least a portion of which is now coated with at least a portion of the silicon-containing precursor sol of solution 270, is removed from solution 270. The silicon-containing precursor sol coated on and/or within at least a portion of the porous support membrane (e.g., coated membrane 280) is then converted to the silica-based ceramic, according to some embodiments. In some embodiments, converting the silicon-containing precursor sol to the silica-based ceramic comprises performing a hydrolysis and condensation reaction. It has been observed in the context of the present disclosure that, in some such embodiments, the hydrolysis and condensation reaction results in a self-assembly of components of the silicon-containing precursor sol to form the silica-based ceramic (e.g., as an interconnected network structure that, in some cases, is nanoporous).

In some embodiments, the step of converting the silicon-containing precursor sol coating at least a portion of the porous support membrane into the silica-based ceramic (e.g., via a hydrolysis and condensation reaction) proceeds for at least one second, at least 1 minute, at least 30 minutes, at least 1 hour, at least 2 hours, at least 4 hours, or more. In some embodiments, the step of converting the silicon-containing precursor sol coating at least a portion of the porous support membrane into the silica-based ceramic proceeds for less than or equal to 2 weeks, less than or equal to 1 week, less than or equal to 96 hours, less than or equal to 48 hours, less than or equal to 24 hours, or less. Combinations of these ranges are possible. For example, in some embodiments, the step of converting proceeds for at least 1 second and less than or equal to 2 weeks, at least 2 hours and less than or equal to 48 hours, or at least 4 hours and less than or equal to 24 hours. The step of converting the silicon-containing precursor sol coating at least a portion of the porous support membrane into the silica-based ceramic (e.g., via a hydrolysis and condensation reaction) can be performed in any of a variety of conditions. In some cases, the converting step is performed in an open atmosphere (e.g., open to ambient air), while in some embodiments the converting step is performed in a sealed atmosphere (e.g., in atmosphere fluidically isolated from ambient air). In some embodiments, the converting step is performed in an atmosphere having a humidity of at least 0% and up to 100% humidity.

The step of converting the silicon-containing precursor sol coating at least a portion of the porous support membrane into the silica-based ceramic (e.g., via a hydrolysis and condensation reaction) may be performed at any of a variety of temperatures, depending on the composition of the silicon-containing precursor sol and the desired properties of the cation exchange membrane. In some embodiments, the converting step occurs at room temperature or cooler, while in some embodiments, the converting step occurs at elevated temperatures. In some such cases, the coated porous support membrane is kept in a dryer (e.g., an oven) during the converting step. For example, FIG. 6 shows an exemplary coated porous support 20 optionally being kept in a dryer 24 during at least a portion of step 3, according to some embodiments. In some embodiments, the converting step is performed with the coated porous support membrane kept in an environment having a temperature of greater than or equal to 0° C., greater than or equal to 20° C., or higher. In some embodiments, the converting step is performed with the coated porous support membrane being kept in an environment having a temperature of less than or equal to 150° C., less than or equal to 80° C., less than or equal to 60° C., or less. Combinations of these ranges are possible. For example, in some embodiments, the converting step is performed with the coated porous support membrane kept in an environment having a temperature of greater than or equal to 0° C. and less than or equal to 150° C., greater than or equal to 0° C. and less than or equal to 80° C., or greater than or equal to 20° C. and less than or equal to 60° C. The temperature of the conditions under which the converting step (e.g., hydrolysis and condensation of the silicon-containing precursor sol to form the silica-based ceramic) occurs may be relatively low compared to certain existing techniques for forming ceramics, such as high-temperature sintering and calcination. In some cases, the use of relatively low temperatures to form the silica-based ceramic allows for the costs and resources needed to fabricate the cation exchange membrane to be reduced compared to certain existing techniques.

In some embodiments, the converting step can be performed while the coated porous support membrane is positioned on, or in contact with, a surface. For example, in some embodiments, the converting step can be performed while the coated porous support membrane is positioned on a relatively flat surface, or relatively flat and porous surface. However, it should be understood that the coated porous support membrane need not be positioned on or in contact with the surface during the converting step. In some embodiments, the coated porous support membrane is positioned with a horizontal orientation with respect to a surface (e.g., a horizontal orientation with respect to a surface of an oven), while in some embodiments, the coated porous support membrane is positioned with a vertical orientation with respect to a surface (e.g., a vertical orientation with respect to a surface of an oven).

In some embodiments, the converting step can optionally be terminated to conclude step 3. For example, in some embodiments, the reaction taking place during the converting step (e.g., the hydrolysis and condensation reaction) can be quenched by applying an aqueous solution. The aqueous solution can be applied using standard coating processes such as dip, spray, blade, screen printing. For example, in some embodiments, quenching the reaction comprises contacting the converted coated porous support membrane with an aqueous solution (e.g., via application of the aqueous solution to the converted coated porous support membrane, via submersion of the coated porous support membrane within the aqueous solution, etc.). In some embodiments, the aqueous solution used to quench the reaction has a pH of greater than or equal to −1, greater than or equal to zero, greater than or equal to 1, greater than or equal to 2, greater than or equal to 3, greater than or equal to 4, greater than or equal to 5, greater than equal to 6, greater than or equal to 7, greater than or equal to 8, greater than or equal to 9, greater than or equal to 10, or greater. In some embodiments, the aqueous solution used to quench the reaction has a pH of less than or equal to 14, less than or equal to 13, less than or equal to 12, less than or equal to 11, less than or equal to 10, less than or equal to nine, less than or equal to 8, less than or equal to 7, less than or equal to 6, less than or equal to 5, less than or equal to 4, less than or equal to 3, or less. Combinations of these ranges are possible. For example, in some embodiments, the aqueous solution used to quench the reaction has a pH of greater than or equal to −1 and less than or equal to 14, greater than or equal to −1 and less than or equal to 7, greater than or equal to 5 and less than or equal to 7.

In some instances, it is desirable to remove excess silica-based ceramic on the cation exchange membrane (e.g., to reduce or eliminate surface excess). Excess silica-based ceramic can be removed using any of a variety of suitable methods. Exemplary methods include, but are not limited to, removal via mechanical squeegee, removal via air knife, and/or removal via heating (e.g., to an elevated temperature).

In some embodiments, the method for fabricating the cation exchange membrane described herein is completed following step 3 described above. For example, in some embodiments, a membrane 282 produced following step 3 is a fully fabricated cation exchange membrane (e.g., cation exchange membrane 150 described herein). In some cases, steps of the method described above can be repeated. For example, in some embodiments, step 2 and step 3 of the fabrication method can be repeated. Repeating steps 2 and 3 can, in some cases, result in increased coating on and/or within the porous support membrane with the silica-based ceramic. For example, repeating steps 2 and 3 may allow for the silicon-containing precursor sol to infiltrate regions of the porous support membrane that were not infiltrated by the silicon-containing precursor sol during previous performances of step 2. Such repetitions of steps 2 and 3 may, in some cases, result in up to 100% filling of the porous support membrane by the silica-based ceramic. It should be understood, however, that repeating steps 2 and 3 above too many times may, in some cases, cause a buildup of surface excess of silica-based ceramic on the porous support membrane. In other words, in some cases, a layer of silica-based ceramic having too large a thickness may result on the exterior surface of the cation exchange membrane, which in some cases may be detrimental to the performance of the cation exchange membrane in certain applications. It has been observed that, in some cases, performing steps 2 and 3 described above a total of between 1-3 times may result in cation exchange membranes having beneficial performance characteristics. It has been observed that, in some cases, performing steps 2 and 3 described above a total of between 1-6 times (e.g., 4-6 times) may result in cation exchange membranes having beneficial performance characteristics.

As mentioned above, in some embodiments, a fully-fabricated cation exchange membrane can be prepared upon the completion of step 3 as described above and shown in FIG. 6. For example, in some embodiments in which the silicon-containing precursor sol includes a component comprising a functional group (e.g., a silane comprising a sulfonate and/or sulfonic acid group) that is desirable to be in the finished cation exchange membrane, that functional group may be present in the cation exchange membrane produced following step 3, thereby making the cation exchange membrane produced upon the completion of step 3 suitable for certain applications without further modification. As one non-limiting example, in some embodiments in which the silicon-containing precursor sol comprises a tetraalkylorthosilicate (e.g., TEOS) and a 3-(trihydroxysilyl)-1-alkanesulfonic acid ((e.g., 3-trihydroxysilyl)-1-propanesulfonic acid, THOPS) as precursors, no further modification of the cation exchange membrane following the completion of step three may be necessary, at least because the cation exchange membrane at this stage comprises sulfonic acid groups.

However, in some embodiments, one or more additional steps may be performed following step 3 of the methods described herein. For example, in some embodiments, the porous support membrane coated with the silica-based ceramic does not comprise functional groups (e.g., sulfonate and/or sulfonic acid groups) that are desired to be present in the completed cation exchange membrane following step 3. For example, in some embodiments, the silicon-containing precursor sol used to coat the porous support membrane does not comprise a component comprising the desired functional group. As one non-limiting example, in some embodiments the silicon-containing precursor sol comprises a tetraalkylorthosilicate (e.g., TEOS) and a silane comprising a thiol group as precursors. In some such cases, further chemical reactions may need to be performed to convert the thiol to a desired sulfonate or sulfonic acid group (e.g., via oxidation). As such, in some cases, further chemical reactions may be performed to form the desired functional groups.

In some embodiments, an optional step of exposing the coated porous support membrane following step 3 to water may be performed. For example, as shown in FIG. 6, an optional step 4 in which membrane 282 is contacted with water can be performed. Exposing the coated porous support membrane following step 3 to water may, in some embodiments, result in the removal of certain components that may be undesirable in follow-up steps of the fabrication process. For example, in some embodiments, exposing the coated porous support membrane to water may remove acid from the membrane structure. Water can be applied using one or more standard coating processes such as dip, spray, blade, and screen printing.

In some embodiments, a method for forming the cation exchange membrane comprises a step of exposing a porous support membrane, coated with the silica-based ceramic comprising an oxidizable functional group, to an oxidizing agent. As shown in FIG. 6, in some embodiments, membrane 282 comprises a porous support membrane coated with a silica-based ceramic comprising an oxidizable functional group, and membrane 282 is exposed to an oxidizing agent in solution 272 during optional step 5. In some embodiments, the method further comprises oxidizing the oxidizable functional group to form a sulfonate or sulfonic acid group. In some such cases, the steps of exposing the porous support membrane to the oxidizing agent and oxidizing the oxidizable functional group to form a sulfonate or sulfonic acid group results in the cation exchange membrane comprising a sulfonate and/or sulfonic acid group (e.g., covalently bound to the silica-based ceramic).

In some embodiments, the silica-based ceramic comprising the oxidizable functional group comprises a relatively high percentage of silicon. For example, in some embodiments, the silica-based ceramic comprises Si in an amount greater than or equal to 6 wt %, greater than or equal to 10 wt %, greater than equal to 12 wt %, greater than or equal to 15 wt %, greater than or equal to 17 wt %, greater than or equal to 20 wt %, greater than or equal to 24 wt %, greater than or equal to 30 wt %, greater than or equal to 40 wt %, greater than or equal to 60 wt %, or more in the silica-based ceramic. In some embodiments, the silica-based ceramic comprises Si in an amount less than or equal to 60 wt %, less than or equal to 50 wt %, less than or equal to 47 wt %, less than or equal to 40 wt %, less than or equal to 30 wt %, less than or equal to 28 wt %, less than or equal to 26 wt %, less than or equal to 24 wt %, less than or equal to 22 wt %, less than or equal to 20 wt %, less than or equal to 17 wt %, or less in the silica-based ceramic. Combinations of these ranges are possible. For example, in some embodiments, the silica-based ceramic comprises Si in an amount greater than or equal to 6 wt % and less than or equal to 60 wt %, or greater than or equal to 17 wt % and less than or equal to 26 wt % in the silica-based ceramic.

The oxidizable functional group may be any functional group that, upon one or more oxidation and/or hydrolysis steps, can be oxidized to form a sulfonate or sulfonic acid group. For example, in some embodiments, the oxidizable functional group is a thiol. In some embodiments, the oxidizable functional group is capable of undergoing electrophilic aromatic substitution reactions, such as aromatic sulfonation. For example, in some embodiments, the oxidizable functional group is an aryl group. The aryl group may be, for example, a benzyl group. In some embodiments, the aryl group is a substituted aryl group. One non-limiting example of a suitable substituted aryl group is an aniline group. In some embodiments, the oxidizable functional group is a sulfonyl halide.

The oxidizing agent may be any reagent or combination of reagents capable of oxidizing the oxidizable functional group to form a sulfonate or sulfonic acid group. In some embodiments, the oxidizing agent comprises a peroxide. The oxidizing agent comprising a peroxide may, in some cases, be hydrogen peroxide ($H_2O_2$). In some embodiments, the oxidizing agent comprising a peroxide is an organic compound comprising a peroxide. In some embodiments, the method comprises a step of oxidizing the thiol group with an oxidizing agent comprising a peroxide (e.g., hydrogen peroxide) to form a sulfonate or sulfonic acid group. In some embodiments, the oxidizing agent is a group capable of reacting with an aryl group via an aromatic sulfonation reaction. For example, in some embodiments, the oxidizing agent is sulfuric acid ($H_2SO_4$) or a combination of sulfuric acid and $SO_3$. In some embodiments, the oxidizing agent is a group capable of reacting with a sulfonyl halide to form a sulfonate or sulfonic acid group (e.g., via a hydrolysis reaction). For example, in some embodiments, the oxidizing agent is $H_2O$ (or, for example, hydroxide $OH^-$).

Exposing the porous support membrane, coated with the silica-based ceramic comprising an oxidizable functional group, to the oxidizing agent may comprise the step of applying the oxidizing agent to the coated membrane in any of a variety of suitable ways. For example, as mentioned above, in some embodiments, the exposing step comprises exposing the coated porous support membrane to a solution containing the oxidizing agent (e.g., solution 272 in FIG. 6). The oxidizing agent can be applied to the coated porous support membrane, in some cases, using standard coating processes, such as dip coating, spray coating, roll coating, blade coating, or screen printing. In some embodiments in which the oxidizing agent is a peroxide (e.g., hydrogen peroxide), the oxidizing agent may be applied to the coated porous support membrane by applying (e.g., via dipping) an aqueous solution comprising at least 1 vol %, at least 5 vol %, at least 10 vol %, at least 15 vol %, at least 20 vol %, or more peroxide (e.g., hydrogen peroxide). In some embodiments in which the oxidizing agent is a peroxide (e.g., hydrogen peroxide), the oxidizing agent may be applied to the coated porous support membrane by applying (e.g., via dipping) an aqueous solution comprising less than or equal to 30 vol %, less than or equal to 25 vol %, less than or equal to 20 vol %, less than or equal to 15 vol %, less than or equal to 10 vol %, or less, peroxide (e.g., hydrogen peroxide). Combinations of these ranges are possible. For example, in some embodiments, a peroxide may be applied to the coated porous support membrane by applying an aqueous solution comprising greater than or equal to 1 vol % and less than or equal to 30 vol %, greater than or equal to 10 vol % and less than or equal to 30 vol %, or greater than or equal to 20 vol % and less than or equal to 30 vol % of peroxide (e.g., hydrogen peroxide).

In some embodiments, the step of oxidizing the oxidizable functional group to a sulfonate or sulfonic acid group is performed using a solution comprising the oxidizing agent that is kept at a suitable temperature. For example, in some embodiments, a solution comprising the oxidizing agent used for the oxidation reaction has a temperature of greater than or equal to 0° C., greater than or equal to 20° C., or more. In some embodiments, the solution comprising the oxidizing agent used for the oxidation reaction has a temperature of less than or equal to 100° C., less than or equal to 60° C., less than or equal to 50° C., or less. Combinations of these ranges are possible. For example, in some embodiments, the solution comprising the oxidizing agent used for the oxidation reaction has a temperature of greater than or equal to 0° C. and less than or equal to 100° C., greater than or equal to 0° C. and less than or equal to 60° C., or greater than or equal to 20° C. and less than or equal to 50° C. The duration of the oxidation reaction that converts the oxidizable functional group to a sulfonate or sulfonic acid group may depend on the reaction kinetics as well as, for example, the concentration of oxidizable functional groups on or within the coated porous support comprising the silica-based ceramic. In some cases, the oxidation reaction may proceed for at least 1 minute, at least 30 minutes, at least 1 hour, or more. In some cases, the oxidation reaction may proceed for less than or equal to 1 week, less than or equal to 48 hours, less than or equal to 24 hours, or less. Combinations of these ranges are possible. For example, in some embodiments, the oxidation reaction may proceed for greater than or equal to 1 minute and less than or equal to 1 week, greater than or equal to 30 minutes in less than or equal to 48 hours, or greater than or equal to 1 hour and less than or equal to 24 hours. It has been observed that the length of time of the oxidation reaction can, in some instances, affect the extent of oxidation of the oxidizable functional groups (e.g., to sulfonate or sulfonic acid groups).

In some embodiments, an optional drying step can be performed on the cation exchange membrane following the oxidation of the oxidizable functional group (e.g., thiol, aryl group, sulfonyl halide, etc.) to a sulfonate or sulfonic acid group. FIG. 6 shows optional step 6, where an oxidized membrane 284 comprising sulfonate and/or sulfonic acid groups is dried by being kept in an optional dryer 26, according to some embodiments. It should be understood however, that in some embodiments, the drying step can be performed without keeping the oxidized cation exchange membrane in a dryer. In some embodiments, the step of drying the oxidized cation exchange membrane comprising a sulfonate and/or sulfonic acid group proceeds for at least 1 second, at least 1 minute, at least 30 minutes, at least 1 hour, at least 2 hours, at least 4 hours, or more. In some embodiments, the step of drying the oxidized cation exchange membrane comprising a sulfonate and/or sulfonic acid group proceeds for up to 24 hours, up to 2 days, up to one week, up to 2 weeks, or more. Combinations of these ranges are possible. For example, in some embodiments, the step of drying the oxidized cation exchange membrane comprising a sulfonate and/or sulfonic acid group proceeds for at least 1 second and up to 2 weeks, at least 2 hours and up to 2 days, or at least 4 hours and up to 24 hours. The step of drying the oxidized cation exchange membrane comprising a sulfonate and/or sulfonic acid group can be performing in any of a variety of conditions. In some cases, the drying step is performed in an open atmosphere (e.g., open to ambient air), while in some embodiments the drying step is performed in a sealed atmosphere (e.g., in atmosphere fluidically isolated from ambient air). In some embodiments, the drying step is performed in an atmosphere having a humidity of at least 0% and up to 100% humidity.

The step of drying the oxidized cation exchange membrane comprising a sulfonate and/or sulfonic acid group may be performed at any of a variety of temperatures. In some embodiments, the drying step occurs at room temperature or cooler, while in some embodiments, the drying step occurs at elevated temperatures. In some embodiments, the drying step is performed with the oxidized cation exchange membrane kept in an environment having a temperature of greater than or equal to 0° C., greater than or equal to 20° C., or higher. In some embodiments, the drying step is performed with the coated porous support membrane kept in an environment having a temperature of less than or equal to 150° C., less than or equal to 80° C., less than or equal to 60° C., or less. Combinations of these ranges are possible. For example, in some embodiments, the drying step is performed with the oxidized cation exchange membrane kept in an environment having a temperature of greater than or equal to 0° C. and less than or equal to 150° C., greater than or equal to 0° C. and less than or equal to 80° C., or greater than or equal to 20° C. and less than or equal to 60° C. In some cases, the resulting cation exchange membrane following the oxidizing step and/or the optional drying step may be suitable for using in any of a variety of applications.

Figure 7:
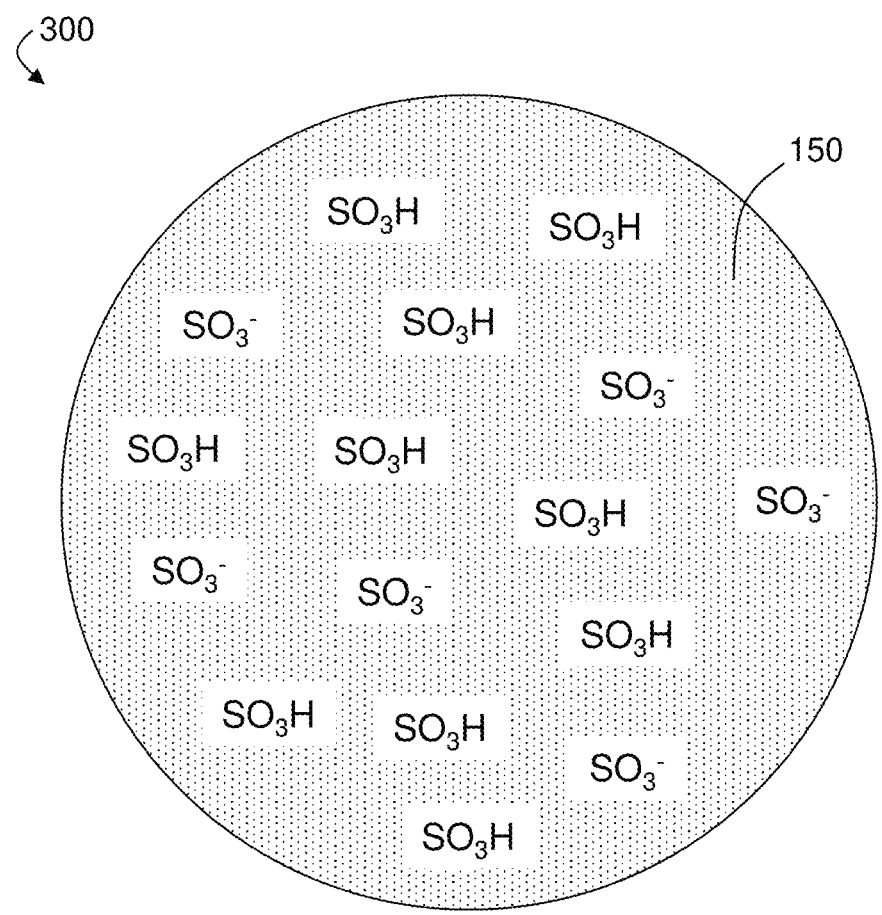
FIG. 7 is a schematic cross-sectional illustration of a cation exchange material comprising a silica-based ceramic, where the cation exchange material comprises sulfonate and sulfonic acid groups covalently bound to the silica-based ceramic, according to some embodiments.

In some embodiments, the cation exchange materials described herein is not in the form of a membrane. For example, in some embodiments, the cation exchange material may comprise a silica-based ceramic comprising sulfonate and/or sulfonic acid groups covalently bound to the silica-based ceramic as described herein, but without being in the form of a membrane. In some such cases, the cation exchange material comprises a silica-based ceramic as described herein, but does not necessarily comprise a porous support membrane (e.g., upon and/or in which the silica-based ceramic is coated). One non-limiting example of a cation exchange material that is not in the form of a membrane is an ion exchange resin. In some embodiments, the cation exchange material is in the form of a bead (e.g., as a cation exchange bead comprising the silica-based ceramic described herein), formed, for example, using an emulsion method. As a non-limiting example, FIG. 7 shows a schematic depiction of a cation exchange material 300 comprising a silica-based ceramic 150, with cation exchange material 300 being in the form of a bead, according to some embodiments. In some cases, silica-based ceramic 150 comprises sulfonate and/or sulfonic acid groups covalently bound to the silica-based ceramic, as shown in FIG. 7, according to some embodiments.

In some embodiments, the cation exchange material (e.g., resin) is in the form of a plurality of particles (e.g., a powder) comprising functional groups (e.g., silica-based ceramic comprising sulfonate and/or sulfonic acid groups). In some embodiments, the cation exchange material in the form of particles (e.g., a powder) is formed by mechanically breaking silica-based ceramic described herein (e.g., via any suitable technique known in the art, such as milling). The cation exchange material particles may be packed into an ion exchange column and used in any of a variety of applications. In some embodiments, the cation exchange material is in the form of a plurality of particles (e.g., a powder) having a mean maximum cross-sectional dimension of greater than or equal to 1 μm, greater than or equal to 2 μm, greater than or equal to 5 μm, greater than or equal to 8 μm, greater than or equal to 10 μm, greater than or equal to 15 μm, greater than or equal to 20 μm, greater than or equal to 30 μm, greater than or equal to 50 μm, greater than or equal to 75 μm, greater than or equal to 100 μm, greater than or equal to 200 μm, greater than or equal to 500 μm, greater than or equal to 1 mm, or greater. In some embodiments, the cation exchange material is in the form of a plurality of particles (e.g., a powder) having a mean maximum cross-sectional dimension of less than or equal to 10 mm, less than or equal to 5 mm, less than or equal to 2 mm, less than or equal to 1 mm, less than or equal to 500 μm, less than or equal to 200 μm, less than or equal to 100 μm, less than or equal to 80 μm, less than or equal to 60 μm, less than or equal to 50 μm, less than or equal to 40 μm, less than or equal to 25 μm, or less. Combinations of these ranges are possible. For example, in some embodiments, the cation exchange material is in the form of a plurality of particles (e.g., a powder) having a mean maximum cross-sectional dimension of greater than or equal to 1 μm and less than or equal to 10 mm.

In some embodiments, a cation exchange material (e.g., a bead, particles) comprising a silica-based ceramic that comprises sulfonate and/or sulfonic acid groups covalently bound to the silica-based ceramic is provided, where the silica-based ceramic comprises a relatively high amount of Si in the silica-based ceramic, as described above. In some embodiments, the silica-based ceramic of the cation exchange material (e.g., a bead) comprises relatively small pores (e.g., pores having a number average pore diameter of less than or equal to 10 nm or less), as described above. In some embodiments, the cation exchange material (e.g., in the form of a bead) has a relatively high cation exchange capacity (e.g., greater than 0.01 meq/g of cation exchange membrane).

In some embodiments, a cation exchange material that is not in the form of a membrane can be prepared by oxidizing a silica-based ceramic comprising an oxidizable functional group, where the silica-based ceramic is not a part of a membrane. For example, in some embodiments a cation exchange membrane comprising a silica-based ceramic that is in the form of a resin (e.g., comprising a plurality of particles or beads) and that comprises sulfonate and/or sulfonic acid groups can be fabricated using an oxidizing step similar to that described above with respect to the cation exchange membranes. For example, some embodiments comprise exposing a resin comprising a silica-based ceramic comprising an oxidizable functional group (e.g., a thiol) to an oxidizing agent, as described above (e.g., a peroxide). In some embodiments, the methods further comprise oxidizing the oxidizable functional group to form a sulfonate and/or sulfonic acid group.

In some embodiments, the silica-based ceramic of the resin that comprises the oxidizable functional group contains Si in an amount greater than or equal to 6 wt %, greater than or equal to 10 wt %, greater than equal to 12 wt %, greater than or equal to 15 wt %, greater than or equal to 17 wt %, greater than or equal to 20 wt %, greater than or equal to 24 wt %, greater than or equal to 30 wt %, greater than or equal to 40 wt %, greater than or equal to 60 wt %, or more in the silica-based ceramic. In some embodiments, the silica-based ceramic comprises Si in an amount less than or equal to 60 wt %, less than or equal to 50 wt %, less than or equal to 47 wt %, less than or equal to 40 wt %, less than or equal to 30 wt %, less than or equal to 28 wt %, less than or equal to 26 wt %, less than or equal to 24 wt %, less than or equal to 22 wt %, less than or equal to 20 wt %, less than or equal to 17 wt %, or less in the silica-based ceramic. Combinations of these ranges are possible. For example, in some embodiments, the silica-based ceramic comprises Si in an amount greater than or equal to 6 wt % and less than or equal to 60 wt %, or greater than or equal to 17 wt % and less than or equal to 26 wt % in the silica-based ceramic of the resin.

The cation exchange membranes and materials described herein may be used in any of a variety of applications. For example, in some embodiments, a cation exchange membrane described herein is used in an electrochemical application. In some cases, the electrochemical application involves applying a current or voltage in order to, for example, achieve separation of charged ionic species. Using a cation exchange membrane in an electrochemical application may comprise contacting the cation exchange membrane with an electrolyte. In some embodiments, using the cation exchange membrane in an electrochemical application may comprise passing current through an electrode in electrical communication with the electrolyte. For example, in some embodiments, the cation exchange membrane is incorporated into an electrochemical device (e.g., battery, fuel cell, electrolytic device, etc.). In some such embodiments, the electrochemical apparatus comprises an electrolyte (e.g., a fluid (liquid) electrolyte or a solid electrolyte) in contact with the cation exchange membrane and an electrode in electrical communication with the electrolyte. In some embodiments, the electrochemical apparatus comprises one or more gases (e.g., in contact with the cation exchange membrane) during at least a portion of a charging and/or discharging process (e.g., a fuel cell). Examples of such gas include, but are not limited to, oxygen gas ($O_2$), hydrogen gas ($H_2$), carbon dioxide ($CO_2$), methane ($CH_4$), and combinations thereof. In some cases, current is passed through the electrode (e.g., during an electrochemical reaction) during operation (e.g., a charge or discharge process) of the electrochemical apparatus. In some embodiments in which the cation exchange membrane is incorporated into an electrochemical device, the cation exchange membrane is paired with an anion exchange membrane. In some cases, the cation exchange membrane may be loaded into a cell, and multiple such cells may be loaded into a stack containing more than one cation exchange membrane. Non-limiting examples of electrochemical applications of the cation exchange membrane include electrodialysis, batteries (e.g., redox flow batteries), fuel cells, chemical commodity production (e.g., chloro-alkali production), electrolysis, demineralization, wastewater treatment, chromatography, electrodeionization, desalting (e.g., enhanced oil recovery (EOR) desalting, organic wastewater desalting), chemical contaminant removal from wastewater (e.g., ammonia removal from wastewater), water treatment (e.g., mine runoff and tailings treatment), food and beverage production, dairy/whey purification, wine stabilization, biological purifications, biochemical production, coating (e.g., electrodeposition coating), desalination processes, ultra-pure water production, recovery of plating solutions, recovery of amines, acid recovery processes, caustic recovery processes, and acid removal processes (e.g., removing tartaric acid, malic acid, citric acid). It should be understood that in some cases, the cation exchange membrane can be used in separations applications other than those involving the application of an electric field. For example, in some embodiments, the cation exchange membrane is used for dialysis techniques. One non-limiting example includes diffusion dialysis (DD). Diffusion dialysis can be used in acid recovery processes (e.g., using a concentration gradient to selectively transport cations).

In some embodiments, a cation exchange membrane described herein is used as an adsorbent material. For example, in some embodiments, the cation exchange membrane is incorporated into an adsorption apparatus. In some such embodiments, the cation exchange membrane is used as an adsorbent material to remove liquid from a gas stream. In some cases, the cation exchange membrane is used as an adsorbent material to remove dissolved ions from a liquid stream (e.g., in an ion exchange process). In some embodiments, using the cation exchange membrane as an adsorbent material comprises flowing a fluid through the cation exchange membrane. In some such embodiments, using the cation exchange membrane as an adsorbent material further comprises adsorbing a component (e.g., liquid when removing liquid from a gas stream, ions when removing ions from a liquid stream) of the fluid that is flowed through the cation exchange membrane. Non-limiting examples of uses of the cation exchange membrane described herein as an adsorbent material include using the cation exchange membrane in a pervaporator system, a dehumidifier system, and/or a desiccant or climate control system.

In some embodiments, a cation exchange membrane described herein is used in a separation application. In some such embodiments, the cation exchange membrane is used in a separation application that comprises applying a transmembrane pressure to the cation exchange membrane. Non-limiting examples of separation applications in which the cation exchange membrane is used by applying a transmembrane pressure to the cation exchange membrane include reverse osmosis, microfiltration (e.g., organic solvent microfiltration, aqueous solvent microfiltration), nanofiltration (e.g., organic solvent nanofiltration, aqueous solvent nanofiltration), and ultrafiltration applications. For example, in some embodiments, the cation exchange membrane is incorporated into a reverse osmosis apparatus, a filtration apparatus, or an ultrafiltration apparatus. Applying a transmembrane pressure to the cation exchange membrane may, in some cases, comprise contacting the cation exchange membrane with a liquid (e.g., a liquid solution) and applying a hydrostatic or hydraulic pressure to the liquid such that a transmembrane pressure is applied to the cation exchange membrane. In some such embodiments, at least a portion of the liquid passes through the cation exchange membrane (e.g., from a first side of the cation exchange membrane to a second side of the cation exchange membrane as a permeate).

As mentioned above, in some embodiments, cation exchange materials that are not in the form of a membrane are also described herein (e.g., in the form of a resin comprising a plurality of silica-based ceramic particles or beads). The cation exchange material, which may comprise silica-based ceramic comprising functional groups as described herein, can be used in any of a variety of applications. For example, in some embodiments, a resin comprising the cation exchange materials described herein is packed into an ion exchange column. In some such embodiments, the ion exchange column comprising the cation exchange material can be used for waste treatment (e.g., nuclear waste treatment), and purification processes such as ultrapure water production or protein & biologics purifications.

Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito: 1999, the entire contents of which are incorporated herein by reference.

As used herein, the term "aliphatic" refers to alkyl, alkenyl, alkynyl, and carbocyclic groups. Likewise, the term "heteroaliphatic" refers to heteroalkyl, heteroalkenyl, heteroalkynyl, and heterocyclic groups.

The term "alkyl" is given its ordinary meaning in the art and refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some cases, the alkyl group may be a lower alkyl group, i.e., an alkyl group having 1 to 10 carbon atoms (e.g., methyl, ethyl, propyl, butyl, pentyl, hexyl, heptyl, octyl, nonyl, or decyl). In some embodiments, a straight chain or branched chain alkyl may have 30 or fewer carbon atoms in its backbone, and, in some cases, 20 or fewer. In some embodiments, a straight chain or branched chain alkyl may have 12 or fewer carbon atoms in its backbone (e.g., $C_1$-$C_{12}$ for straight chain, $C_3$-$C_{12}$ for branched chain), 6 or fewer, or 4 or fewer. Likewise, cycloalkyls may have from 3-10 carbon atoms in their ring structure, or 5, 6, or 7 carbons in the ring structure. Examples of alkyl groups include, but are not limited to, methyl, ethyl, propyl, isopropyl, cyclopropyl, butyl, isobutyl, t-butyl, cyclobutyl, hexyl, and cyclohexyl.

The term "alkylene" as used herein refers to a bivalent alkyl group. An "alkylene" group is a polymethylene group, i.e., —$(CH_2)_z$—, wherein z is a positive integer, e.g., from 1 to 20, from 1 to 10, from 1 to 6, from 1 to 4, from 1 to 3, from 1 to 2, or from 2 to 3. A substituted alkylene chain is a polymethylene group in which one or more methylene hydrogen atoms are replaced with a substituent. Suitable substituents include those described herein for a substituted aliphatic group. Alkylene groups may be cyclic or acyclic, branched or unbranched, substituted or unsubstituted.

Generally, the suffix "-ene" is used to describe a bivalent group. Thus, any of the terms defined herein can be modified with the suffix "-ene" to describe a bivalent version of that moiety. For example, a bivalent carbocycle is "carbocyclylene", a bivalent aryl ring is "arylene", a bivalent benzene ring is "phenylene", a bivalent heterocycle is "heterocyclylene", a bivalent heteroaryl ring is "heteroarylene", a bivalent alkyl chain is "alkylene", a bivalent alkenyl chain is "alkenylene", a bivalent alkynyl chain is "alkynylene", a bivalent heteroalkyl chain is "heteroalkylene", a bivalent heteroalkenyl chain is "heteroalkenylene", a bivalent heteroalkynyl chain is "heteroalkynylene", and so forth.

The term "aryl" is given its ordinary meaning in the art and refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls, and/or heterocyclyls. The aryl group may be optionally substituted, as described herein. Substituents include, but are not limited to, any of the previously mentioned substituents, i.e., the substituents recited for aliphatic moieties, or for other moieties as disclosed herein, resulting in the formation of a stable compound. In some cases, an aryl group is a stable mono- or polycyclic unsaturated moiety having preferably 3-14 carbon atoms, each of which may be substituted or unsubstituted. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl groups.

The term "arylene," as used herein refers to an aryl biradical derived from an aryl group, as defined herein, by removal of two hydrogen atoms. Arylene groups may be substituted or unsubstituted. Arylene group substituents include, but are not limited to, any of the substituents described herein, that result in the formation of a stable moiety. Additionally, arylene groups may be incorporated as a linker group into an alkylene, alkenylene alkynylene, heteroalkylene, heteroalkenylene, or heteroalkynylene group, as defined herein. Arylene groups may be branched or unbranched.

The terms "halo" and "halogen" as used herein refer to an atom selected from the group consisting of fluorine, chlorine, bromine, and iodine.

The term "alkoxy" as used herein refers to an alkyl group, as previously defined, attached to the parent molecular moiety through an oxygen atom or through a sulfur atom. In certain embodiments, the alkyl group contains 1-20 aliphatic carbon atoms. In certain other embodiments, the alkyl group contains 1-10 aliphatic carbon atoms. In yet other embodiments, the alkyl, alkenyl, and alkynyl groups employed in the invention contain 1-8 aliphatic carbon atoms. In still other embodiments, the alkyl group contains 1-6 aliphatic carbon atoms. In yet other embodiments, the alkyl group contains 1-4 aliphatic carbon atoms. Examples of alkoxy, include but are not limited to, methoxy, ethoxy, propoxy, isopropoxy, n-butoxy, t-butoxy, neopentoxy, and n-hexoxy. Examples of thioalkyl include, but are not limited to, methylthio, ethylthio, propylthio, isopropylthio, n-butylthio, and the like. Alkoxy groups may be cyclic or acyclic, branched or unbranched, substituted or unsubstituted.

The term "heterocyclyl" or "heterocyclic" refers to a radical of a 3- to 14-membered non-aromatic ring system having ring carbon atoms and 1 to 4 ring heteroatoms, wherein each heteroatom is independently selected from nitrogen, oxygen, and sulfur ("3-14 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or polycyclic (e.g., a fused, bridged or spiro ring system such as a bicyclic system ("bicyclic heterocyclyl") or tricyclic system ("tricyclic heterocyclyl")), and can be saturated or can contain one or more carbon-carbon double or triple bonds. Heterocyclyl polycyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently unsubstituted (an "unsubstituted heterocyclyl") or substituted (a "substituted heterocyclyl") with one or more substituents. In certain embodiments, the heterocyclyl group is an unsubstituted 3-14 membered heterocyclyl. In certain embodiments, the heterocyclyl group is a substituted 3-14 membered heterocyclyl.

The term "heteroaryl" refers to a radical of a 5-14 membered monocyclic or polycyclic (e.g., bicyclic, tricyclic) 4n+2 aromatic ring system (e.g., having 6, 10, or 14π electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl"). In heteroaryl groups that contain one or more nitrogen atoms, the point of attachment can be a carbon or nitrogen atom, as valency permits. Heteroaryl polycyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused polycyclic (aryl/heteroaryl) ring system. Polycyclic heteroaryl groups wherein one ring does not contain a heteroatom (e.g., indolyl, quinolinyl, carbazolyl, and the like) the point of attachment can be on either ring, i.e., either the ring bearing a heteroatom (e.g., 2-indolyl) or the ring that does not contain a heteroatom (e.g., 5-indolyl).

As used herein, a "leaving group" (LG) is an art-understood term referring to a molecular fragment that departs with a pair of electrons in heterolytic bond cleavage, wherein the molecular fragment is an anion or neutral molecule. As used herein, a leaving group can be an atom or a group capable of being displaced by a nucleophile. See, for example, Smith, March Advanced Organic Chemistry 6th ed. (501-502).

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether proceeded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful for the formation of an imaging agent or an imaging agent precursor. The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, -carboxamido, acyloxy, aminoalkyl, alkylaminoaryl, alkylaryl, alkylaminoalkyl, alkoxyaryl, arylamino, aralkylamino, alkylsulfonyl, -carboxamidoalkylaryl, -carboxamidoaryl, hydroxyalkyl, haloalkyl, alkylaminoalkylcarboxy-, aminocarboxamidoalkyl-, cyano, alkoxyalkyl, perhaloalkyl, arylalkyloxyalkyl, and the like.

U.S. Provisional Application Ser. No. 62/857,224, filed Jun. 4, 2019, and entitled "CERAMIC CATION EXCHANGE MATERIALS," is incorporated herein by reference in its entirety for all purposes.

The following examples are intended to illustrate certain embodiments of the present invention, but do not exemplify the full scope of the invention.

Example 1

This example shows comparisons of the mechanical burst properties of various cation exchange membranes. The cation exchange membranes were fabricated by wicking a sol-gel mixture with porous support membranes and forming self-assembled silica-based ceramics comprising nanopores within the confines of the porous support membranes. Two potential porous support membranes tested were cellulose-based and non-woven glass fiber-based porous support membranes. To perform mechanical burst tests, uncoated porous support membranes were first cut to 70 mm diameter disks and were edged with UV/visible light-cure alkoxy silicone prior to the sol-gel process.

Figure 8A:
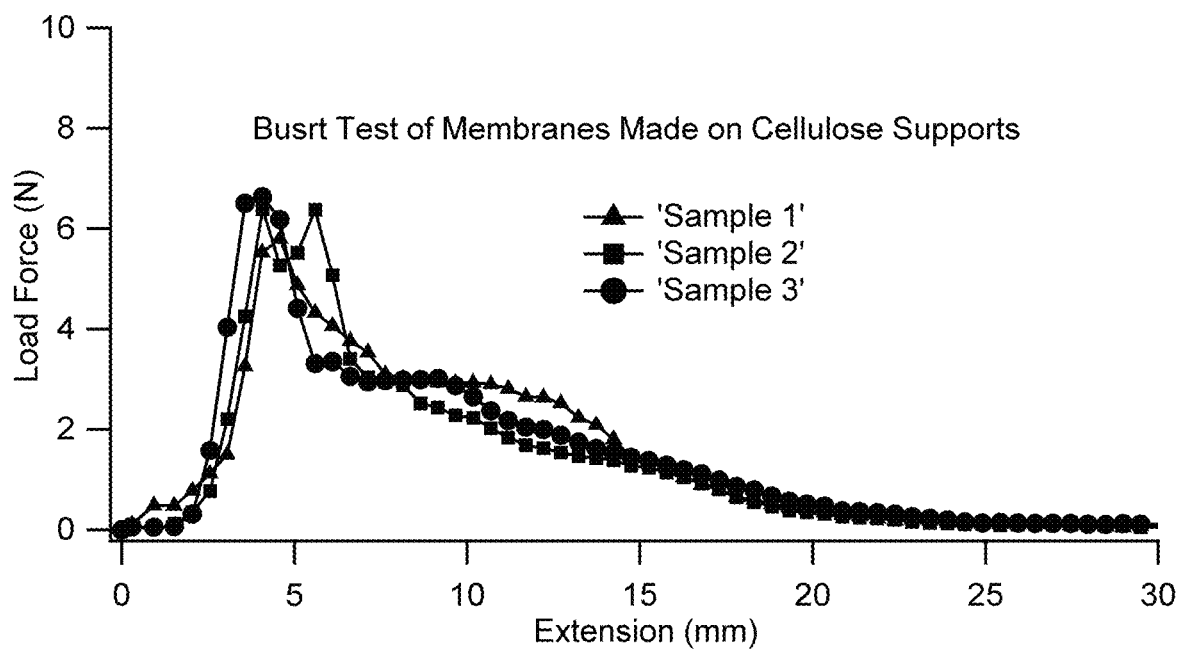
FIGS. 8A-8D show mechanical burst test results for exemplary cation exchange membranes, according to some embodiments.

The cellulose-supported cation exchange membranes were made on cellulose porous support membranes, with a nominal thickness of 180 µm and basis weight of 100 g/m². The uncoated porous support membranes were first soaked in fresh 50 mL of tetraethyl orthosilicate (TEOS): (3-mercaptopropyl)triethoxysilane (MPTES) solution (mass ratio 80:20, molar ratio of water:silicon-containing precursor equaled 2:1, pH=0.523) for 10 min. The coated porous support membranes were allowed to dry in a fume hood for 20 hours, and then a $2^{nd}$ coating was applied by soaking in freshly made TEOS:MPTES solution (same composition) for 10 min. The coated porous support membranes were then dried again in the fume hood for 20 hours. A 20% by volume $H_2O_2$ solution was used to oxidize the resulting membranes by soaking them for 24 hours. The resulting oxidized membranes were then rinsed and kept hydrated in deionized water. FIG. 8A shows force curves showing the results of a mechanical burst test for three identically-prepared cellulose-supported cation exchange membranes.

Figure 8B:
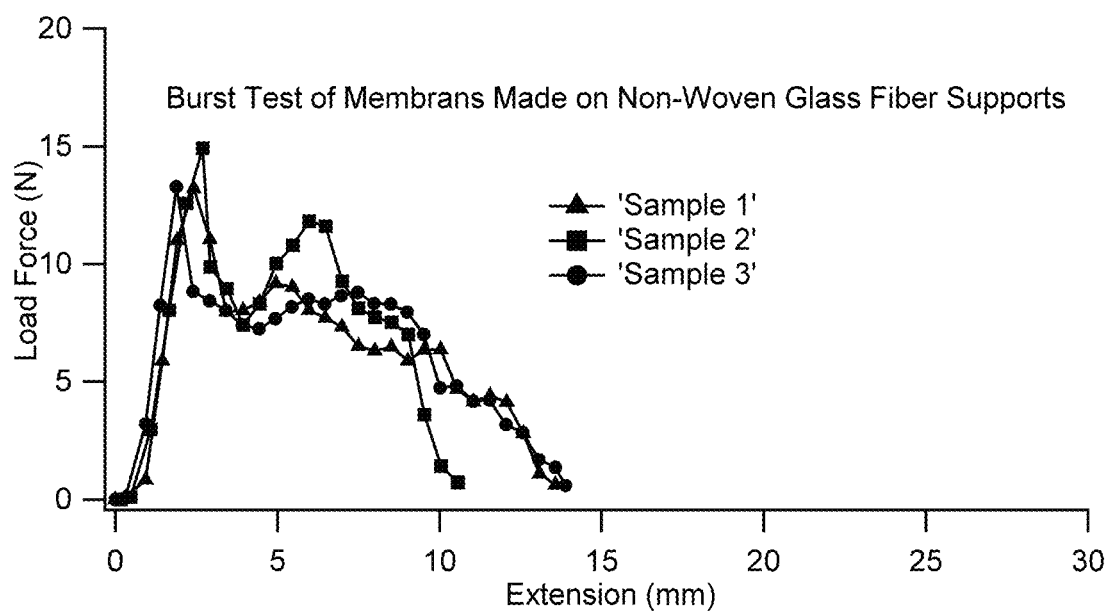

Non-woven glass fiber-based cation exchange membranes were made on non-woven glass fiber porous support membranes, with a typical thickness of 460 µm, porosity of around 60%, and density around 0.2 g/cm³. The uncoated porous support membranes were first soaked in fresh 50 mL of TEOS:MPTES solution (mass ratio 80:20, molar ratio of water to silica equals 2, pH=0.523) for 5 min. The coated membranes were allowed to dry in a fume hood for 20 hours, and then a second coating was applied by soaking the coated porous support membrane in freshly made TEOS:MPTES solution (same composition) for 10 min. The coated porous support membranes were then dried again in the fume hood for 20 hours. A 20% by volume $H_2O_2$ solution was used to oxidize the resulting membranes by soaking them for 24 hours. The resulting membranes were then rinsed and kept hydrated in deionized water. FIG. 8B shows force curves showing the results of a mechanical burst test for three identically-prepared non-woven glass fiber-supported cation exchange membranes.

Figure 8C:
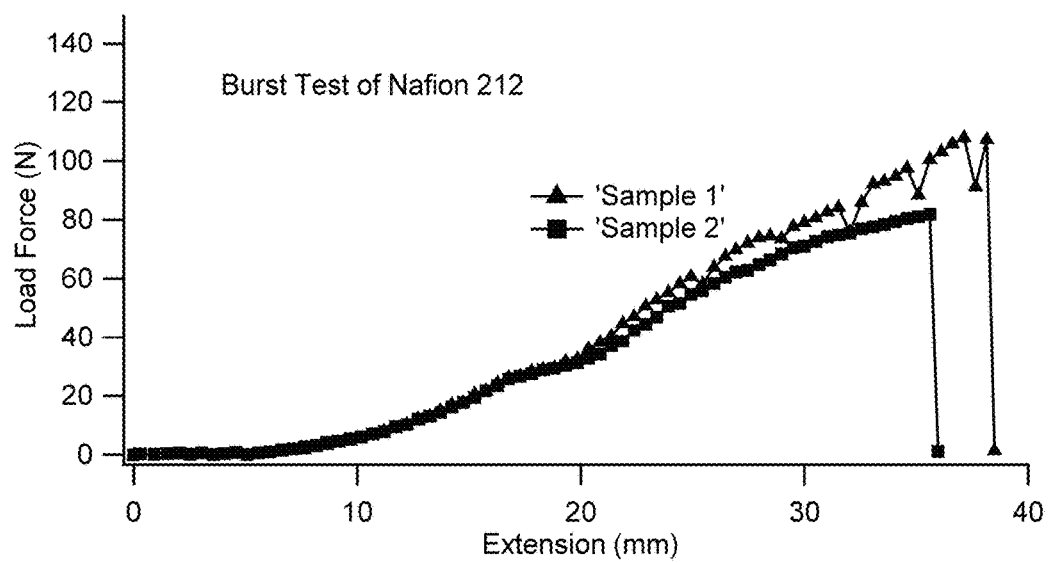
Figure 8D:
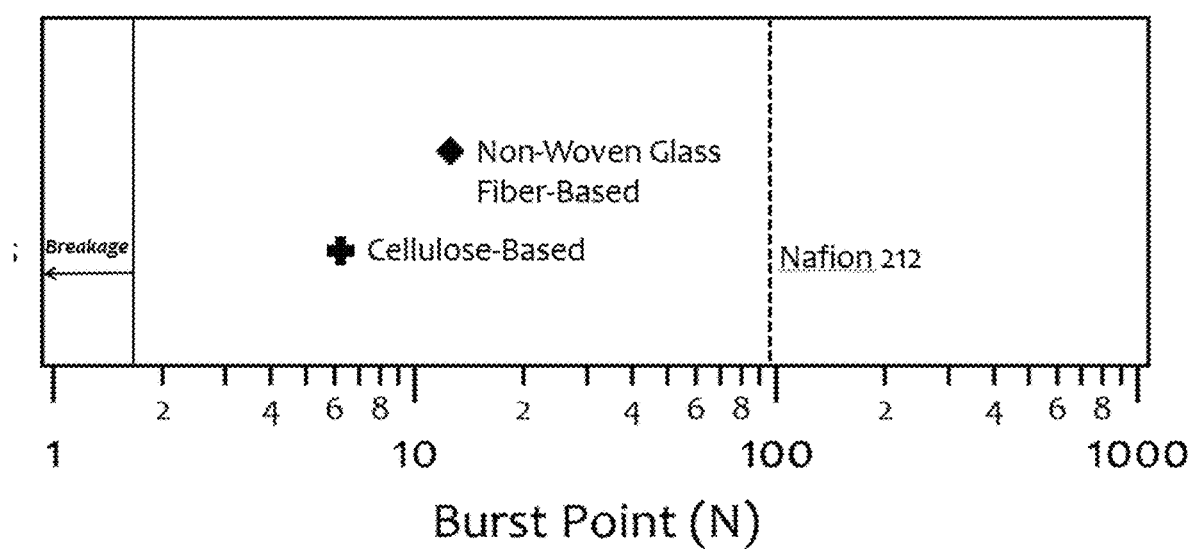

The average mechanical burst strength of cellulose-supported and non-woven glass fiber-supported membranes were tested to be 6.1±0.5 N (FIG. 8A) and 13.8±1.0 N (FIG. 8B), respectively. While these membranes had a lower mechanical burst strength than a commercially available polymer membrane (Nafion 212, shown in FIG. 8C), this result does not impede their operation in a stack environment. The mechanical burst strengths of the cellulose-supported and non-woven glass supported membranes, as well as a Nafion 212 comparison, are summarized in FIG. 8D, along with the standard breakage burst pressure point of 1.7 N. This example shows that cation exchange membrane mechanical properties are, in some cases, tied to the porous support membrane itself. A thicker and more robust non-woven glass porous support membrane showed better mechanical properties than thinner cellulose for the same TEOS:MPTES formulation. In addition to thickness, the presence of binder, material type and structure (e.g., cell or weave) can all substantially impact mechanical properties.

Example 2

Figure 9A:
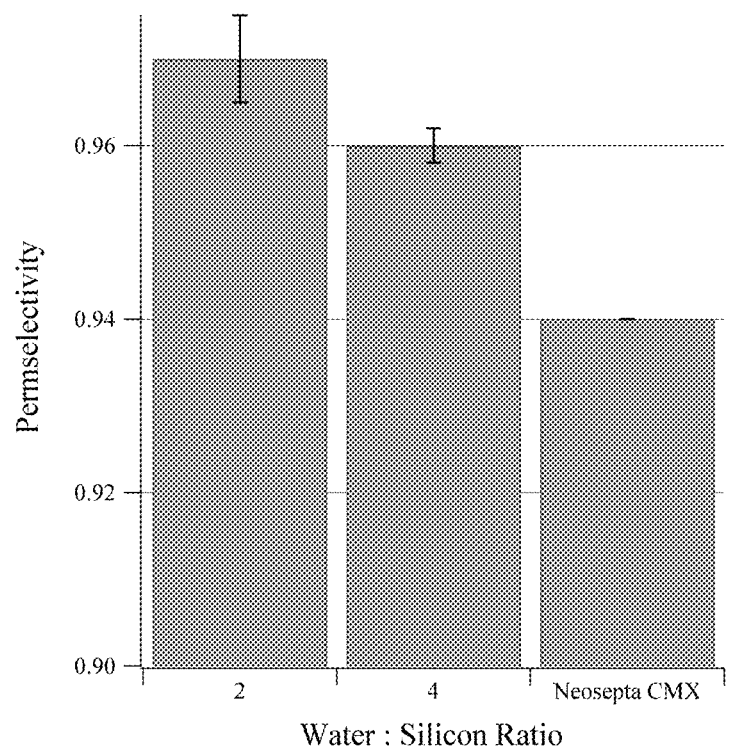
FIGS. 9A-9C show cation permselectivity, osmotic water permeance, and small angle X-ray scattering data and fitting results for exemplary cation exchange membranes, according to some embodiments.
Figure 9B:
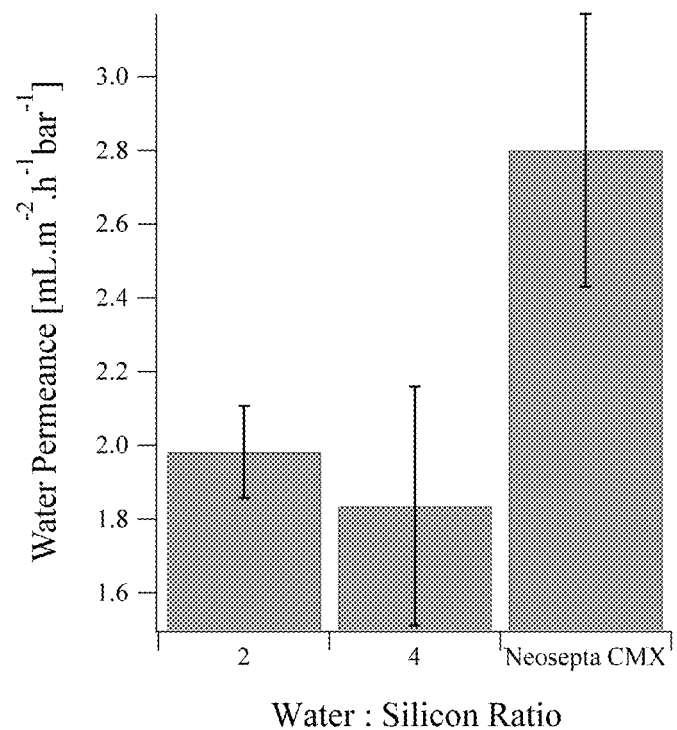
Figure 9C:
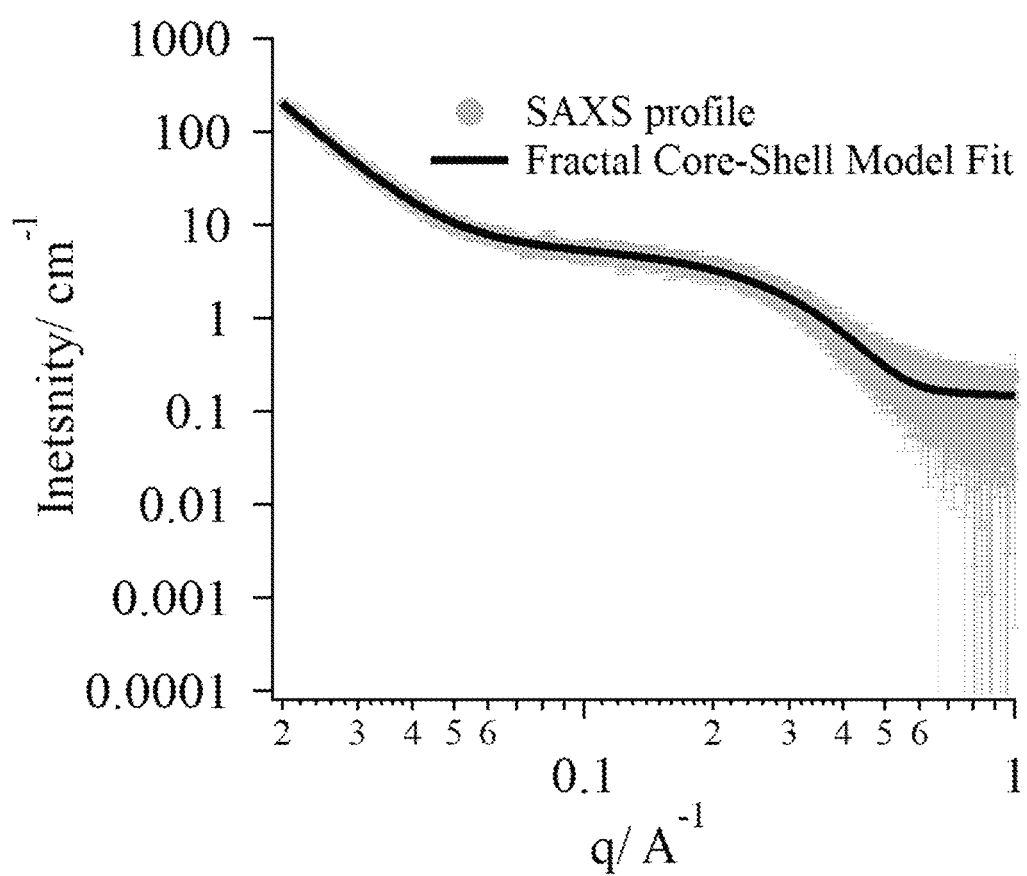

This example shows performance characteristics and structural properties of an exemplary cation exchange membrane. The cation exchange membranes of this example were fabricated on non-woven glass porous support membranes with polymer edging according to the following procedure. The porous support membranes were made from borosilicate glass fibers without a binder, with an average (mean) pore size of 1 micron. The porous support membranes were initially 254 microns thick prior to sol-gel impregnation. The porous support membranes were initially edged with a UV curable silicone to form a disk with an outer diameter of 35 mm and an inner active area diameter between 10 mm-15 mm. An initial mixture containing an 80:20 mass ratio of TEOS:MPTES was prepared and 0.3 M hydrochloric acid was added to achieve a final water:silicon molar ratio between 2:1 and 4:1. This mixture was agitated and heated to 40° C. for 4 hours before being applied to the porous support membranes. The coated porous support membranes were allowed to dry overnight, and then a second coat was applied following the same procedure. The resulting cation exchange membranes were oxidized in 20% hydrogen peroxide for 24 hours at ambient temperatures prior to testing. The cation exchange membranes of this example exhibited an ion exchange capacity of over 1.0 meq/g and had high cation permselectivity measurements as compared to the currently available commercial cation exchange membrane Neosepta CMX (as shown in FIG. 9A). The cation exchange membranes of this example also had a very low osmotic water permeance, as shown in FIG. 9B, which can be beneficial for electrodialysis applications. The sodium ion conductivity for the cation exchange membranes in 0.5 M NaCl solution were found to vary between 0.0010 S/cm-0.0013 S/cm, with the cation exchange membranes having the higher water-to-silicon ratios tracking lower conductivities. SAXS fitting of cation exchange membrane samples showed that they had a volumetric porosity between 8%-9%, pore radius between 2.7 Å-3.7 Å and a polydispersity index between 0.15-0.23 when fit with a spherical core-shell model, as shown in FIG. 9C.

Example 3

This example shows performance characteristics and structural properties of an exemplary cation exchange membrane. The cation exchange membranes of this example were fabricated on a non-woven glass substrate with polymer edging as follows. The porous support membrane contained borosilicate glass fibers without a binder with an average (mean) pore size of 1 micron. The porous support membrane was initially 254 microns thick prior to sol-gel impregnation. The substrate was initially edged with a UV curable silicone to form a disk with an outer diameter of 35 mm and an inner active area diameter between 10 mm-15 mm. A mixture containing a 55:45 mass ratio of TEOS and 3-(trihydroxysilyl)-1-propanesulfonic acid (THOPS) (30-35% in water) (pH=0.523) was prepared and immediately coated onto the porous support membrane. The substrate was allowed to dry overnight. The cation exchange membranes were found to have a cation exchange capacity of 0.68 meq/g±0.006 meq/g; a cation ($Na^+$) permselectivity of 82%±1%; a sodium ion conductivity of 0.0018 S/cm±0.0001 S/cm; and an osmotic water permeance of 8.6 mL·m-2·h-1·bar-1±0.3 mL·$m^{-2}$·$h^{-1}$·$bar^{-1}$.

Example 4

This example shows performance characteristics and structural properties of an exemplary cation exchange membrane. The cation exchange membranes of this example were fabricated on non-woven cellulosic porous support membranes without a UV polymer edging through a dip coating procedure. The uncoated porous support membranes had a nominal basis weight of 100 g/$m^2$, was 180 microns thick before coating, and had a nominal ash content of 0.15%. Composed of alpha cellulose, the porous support membranes retained particles larger than 3 microns in diameter prior to coating with the sol-gel mixture. A mixture of TEOS and MPTES was prepared at an 80:20 mass ratio, and 0.3M HCl was added to catalyze the reaction at a water to silicon molar ratio of 2. The mixture was agitated and heated to 40° C. for 4 hours before the porous support membrane was allowed to soak in the mixture for 1 hour. The coated porous support membrane was allowed to dry overnight and the process was repeated the next day. The resulting cation exchange membranes were then oxidized for 24 hours in 20% hydrogen peroxide at ambient temperatures. The resulting cation exchange membranes were found to have an ion exchange capacity of 0.89±0.01 meq/g; a cation permselectivity of 89%±0.2%; a sodium conductivity of 0.0612 S/cm±0.0003 S/cm in NaCl solutions of 2 M; and a water permeance of 5.1 mL·$m^{-2}$·$h^{-1}$·$bar^{-1}$±0.52 mL·$m^{-2}$·$h^{-1}$·$bar^{-1}$. SAXS fitting of cation exchange membranes of this example showed that they had a volumetric porosity of 10%, pore radius between 2.9-3.5 Å and a polydispersity index between 0.10-0.35 when fit with a solid sphere model.

Example 5

This example shows performance characteristics of an exemplary cation exchange membrane. Non-woven glass fiber porous support membranes were cut in a circular shape of 2.5 cm diameter and were edged with silicone UV-curing polymer such that the width of the edging was be 0.7 cm and the active area available for cation the membrane would be a circle of about 1 $cm^2$. The non-woven glass was binder free, had a thickness of 460 μm, a porosity of around 60% and density around 0.2 g/$cm^3$. For this experiment, the TEOS:MPTES and $H_2O$:silicon ratio of the precursor sol were varied while keeping acidic water (HCl) concentration constant at 0.3 M. A TEOS:MPTES mass ratio of 80/20, 70/30 and 60/40 and water/silicon molar ratio of 2, 3, 4 and 5 were used. For a given TEOS:MPTES and $H_2O$:Silicon ratio, four cation membranes were fabricated to introduce error bars. All the samples were fabricated with two dip-coats of 1 min each in TEOS/MPTES solution, each followed by an overnight drying step. After two coats, the cation exchange membranes were rinsed with deionized water (DI) for 30 min and soaked in 20 wt % $H_2O_2$ for 24 h for oxidation. The oxidation step was followed by another 30 min rinse step in DI water, and the resulting cation exchange membranes were soaked in 4 M $H_2SO_4$ solution for 2 h to be tested for area specific resistance (ASR) and then permeability.

Figure 10A:
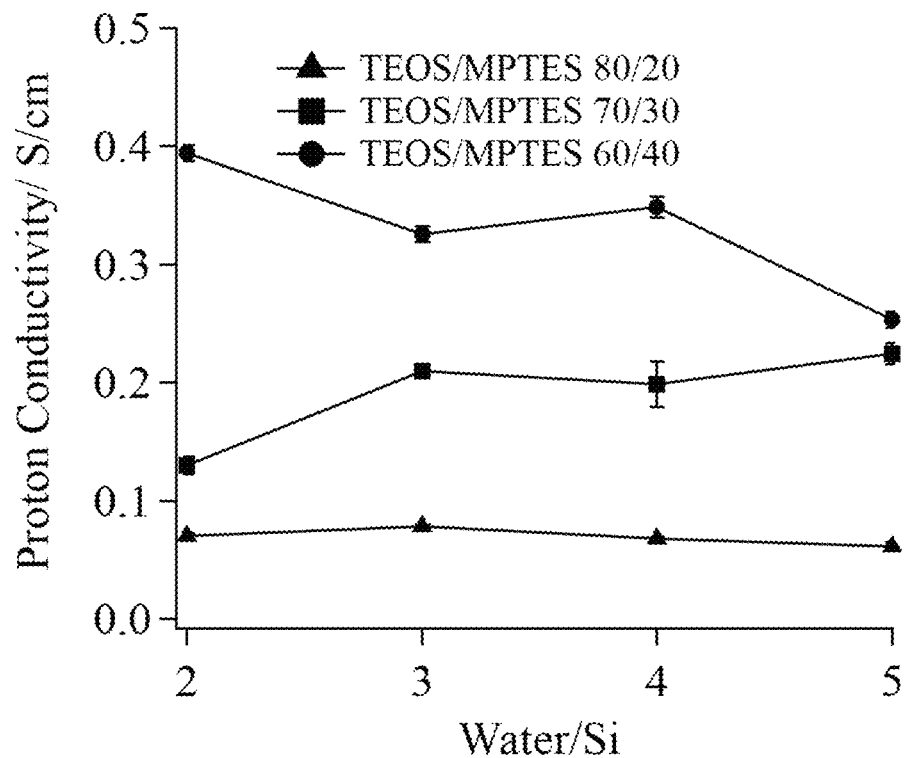
FIGS. 10A-10C show proton conductivity, intrinsic vanadium(IV) ion permeability, and proton:vanadium selectivity for exemplary cation exchange membranes, according to some embodiments.
Figure 10B:
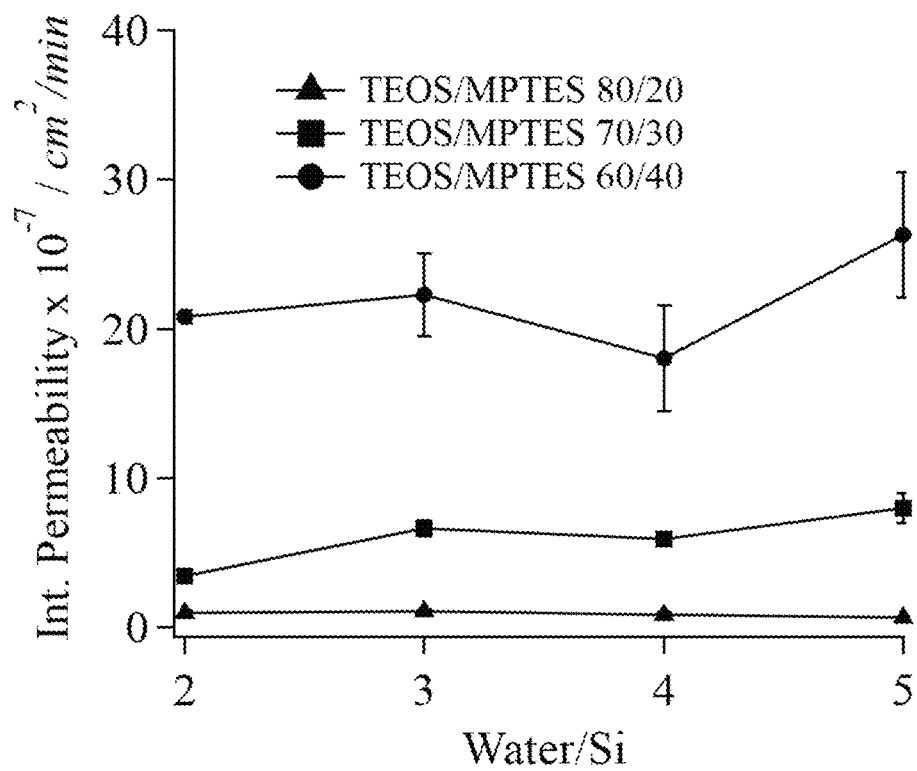
Figure 10C:
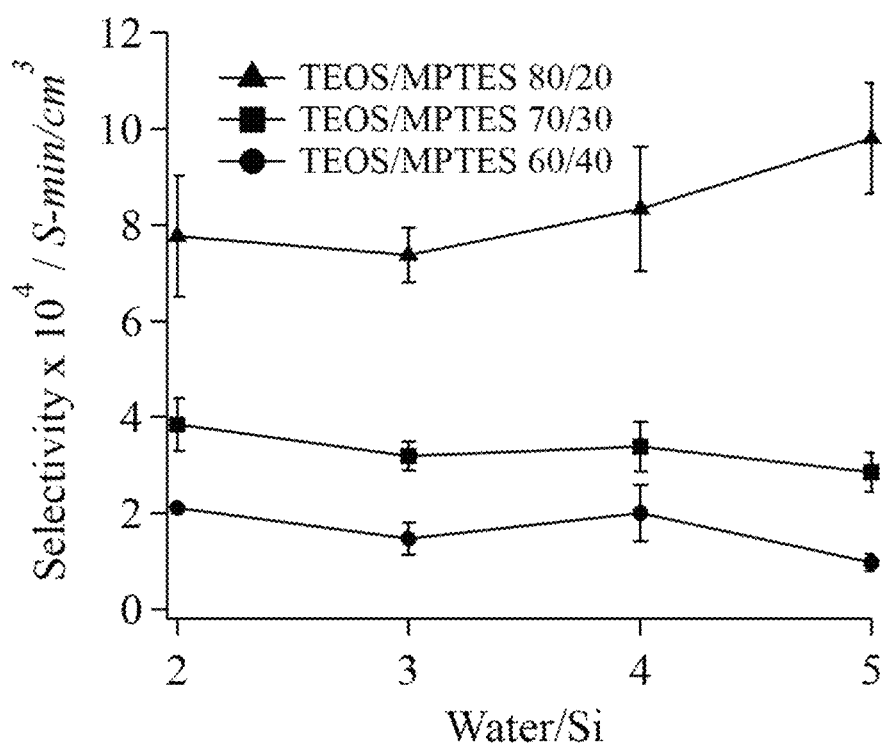

FIGS. 10A-10C show that significant improvements to proton:vanadium ion selectivity are achievable at lower MPTES loadings. However, in applications where proton conductivity is valued, it may be advantageous to choose a different ratio to improve proton conductivity and ion selectivity. No significant trend is seen with relationship to $H_2O$:silicon molar ratio in this range of conditions (FIG. 10C).

Example 6

This example shows performance characteristics of an exemplary cation exchange membrane. The cation exchange membranes were prepared on non-woven glass fiber porous support membranes (thickness=460 um prior to coating) by soaking each porous support membrane in a solution of TEOS:MPTES (80:20 mass ratio) for 1 minute, letting the coated porous support membrane dry, and soaking it in the TEOS:MPTES mixture again for 1 minute. In this experiment, the water:silicon ratio of the TEOS:MPTES precursor solution as well as the hydrochloric acid strength were altered. The resulting cation exchange membranes were dried flat, rinsed with deionized water, and oxidized in 20% hydrogen peroxide for 24 hours. After oxidation, the cation exchange capacity of these resulting cation exchange membranes were measured.

Figure 11A:
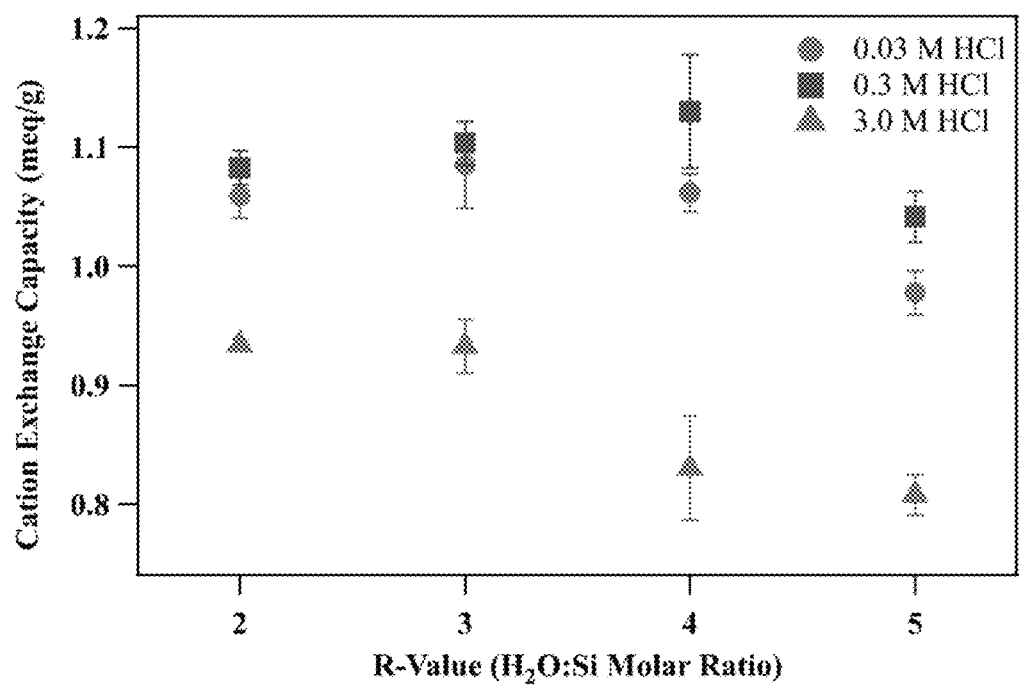
FIGS. 11A-11B show cation exchange capacity and density data of exemplary cation exchange membranes as a function of water:silicon ratio and acid strength, according to some embodiments.
Figure 11B:
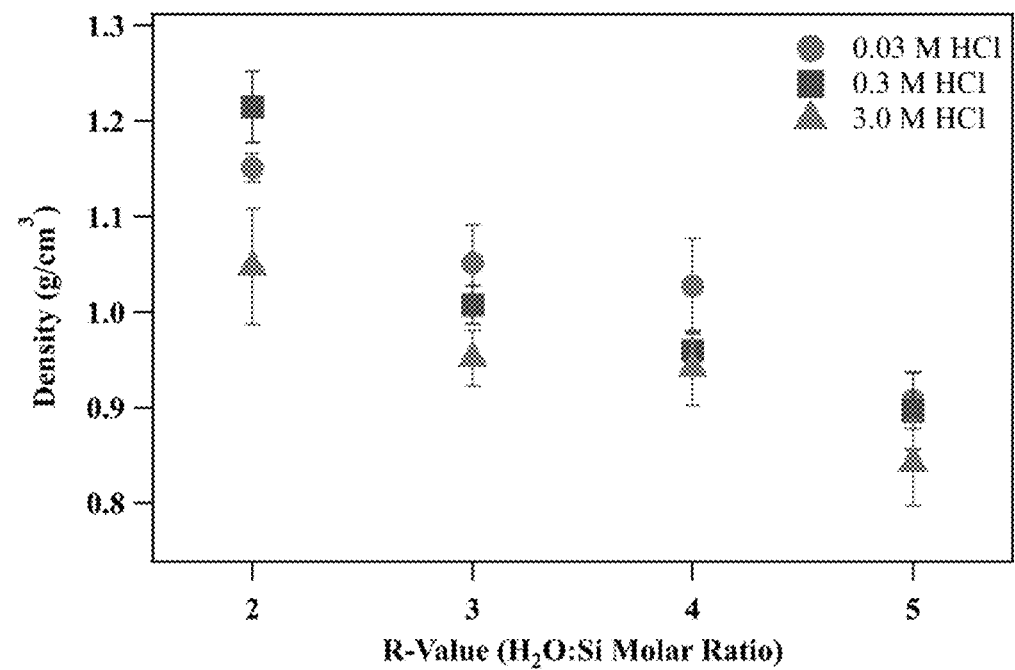

FIG. 11A shows the cation exchange capacity as a function of water:silicon molar ratio and HCl concentration in the precursor solution. This data demonstrates that lower water:silicon molar ratios and relatively low concentrations of acid improve the cation exchange capacity. FIG. 11B shows the density of the cation exchange membranes as a function of water:silicon molar ratio and HCl concentration in the precursor solution. This data demonstrates that lower water:silicon values and relatively low concentrations of acid increase the density of the cation exchange membranes.

Example 7

This example shows performance characteristics of an exemplary cation exchange membrane. The cation exchange membranes were prepared on non-woven glass fiber porous support membranes (thickness=460 um prior to coating) by soaking each porous support membrane in a solution of TEOS:MPTES for 1 minute, letting the porous support membrane dry, and soaking it in the TEOS:MPTES mixture again for 1 minute. In this experiment, the TEOS:MPTES mass ratio as well as the water:silicon molar ratio in the TEOS:MPTES precursor solution were altered. The initial acid (HCl) concentration was held constant at 0.3 M. The resulting cation exchange membranes were dried flat, rinsed with deionized water, and oxidized in 20% hydrogen peroxide for 24 hours. After oxidation, the cation exchange capacity of these resulting cation exchange membranes was measured.

Figure 12A:
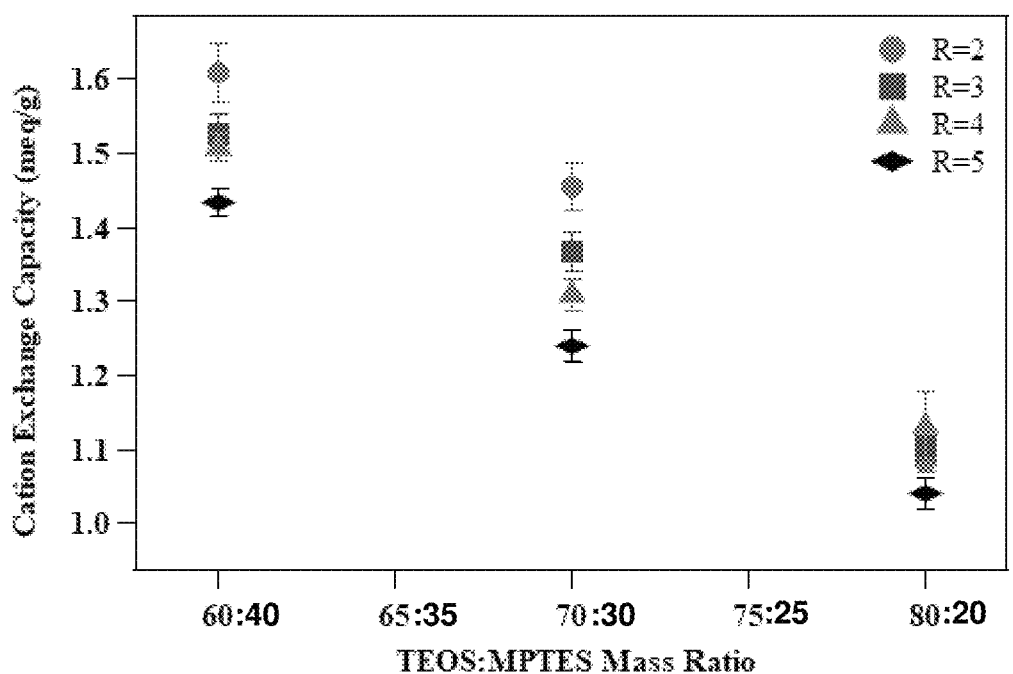
FIGS. 12A-12C show cation exchange capacity and density data of exemplary cation exchange membranes as a function of precursor component ratio and water:silicon ratio, according to some embodiments.
Figure 12B:
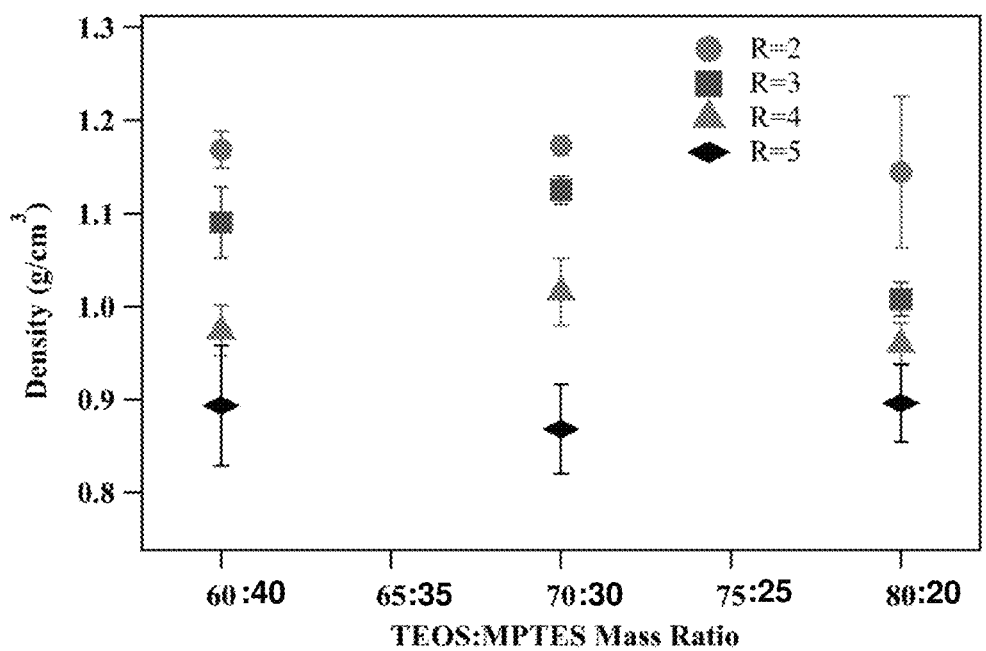
Figure 12C:
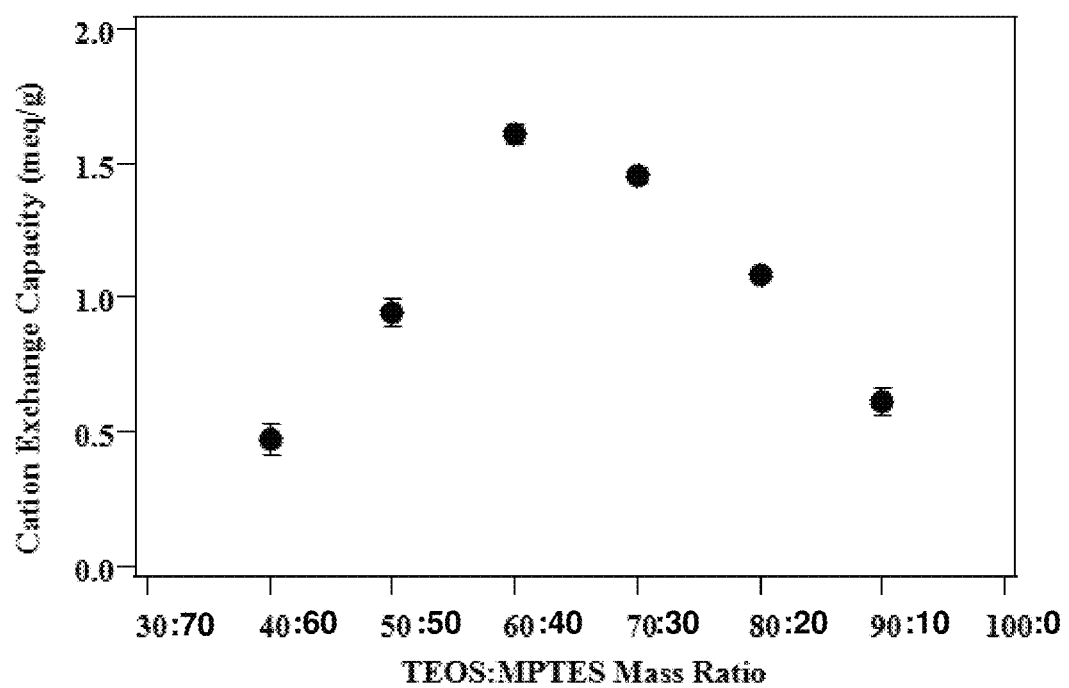
Figure 13A:
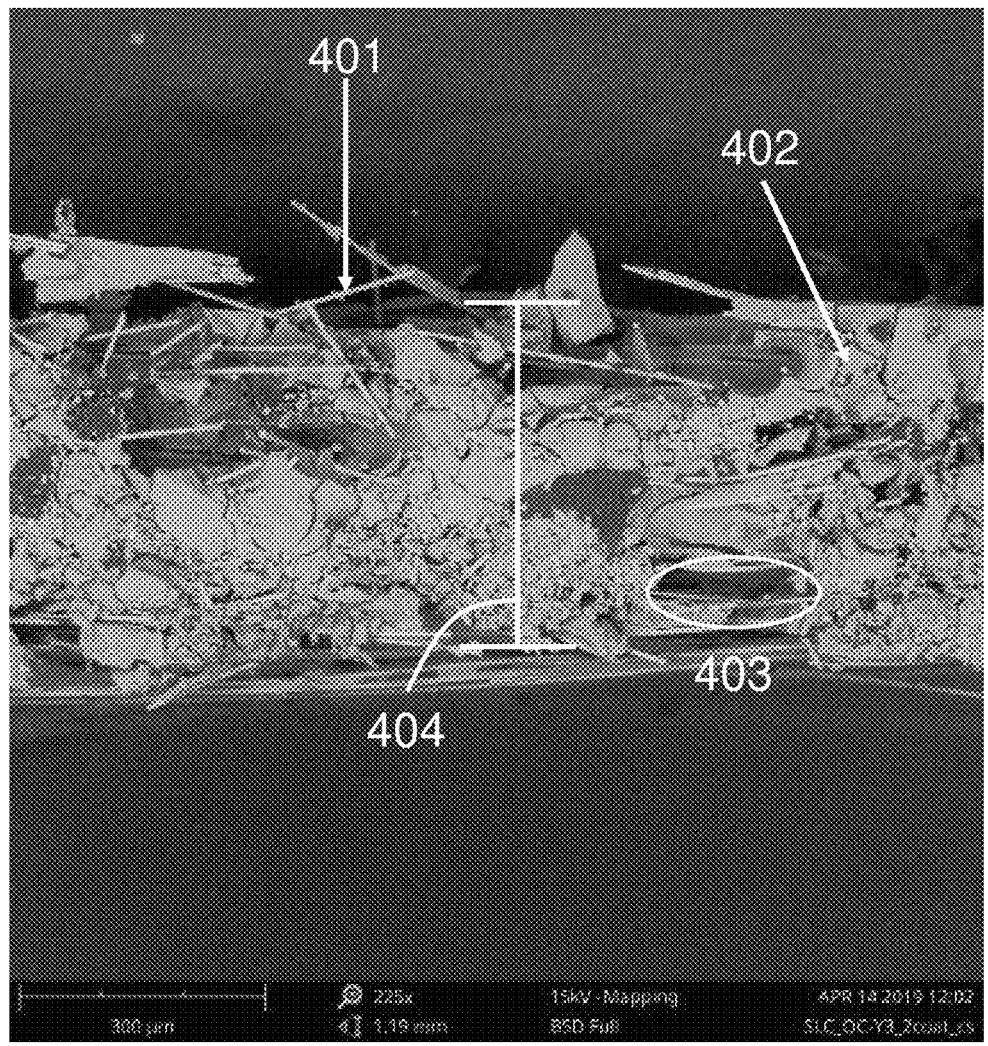
FIGS. 13A-13E are scanning electron microscopy (SEM) images of exemplary cation exchange membrane, according to some embodiments.
Figure 13B:
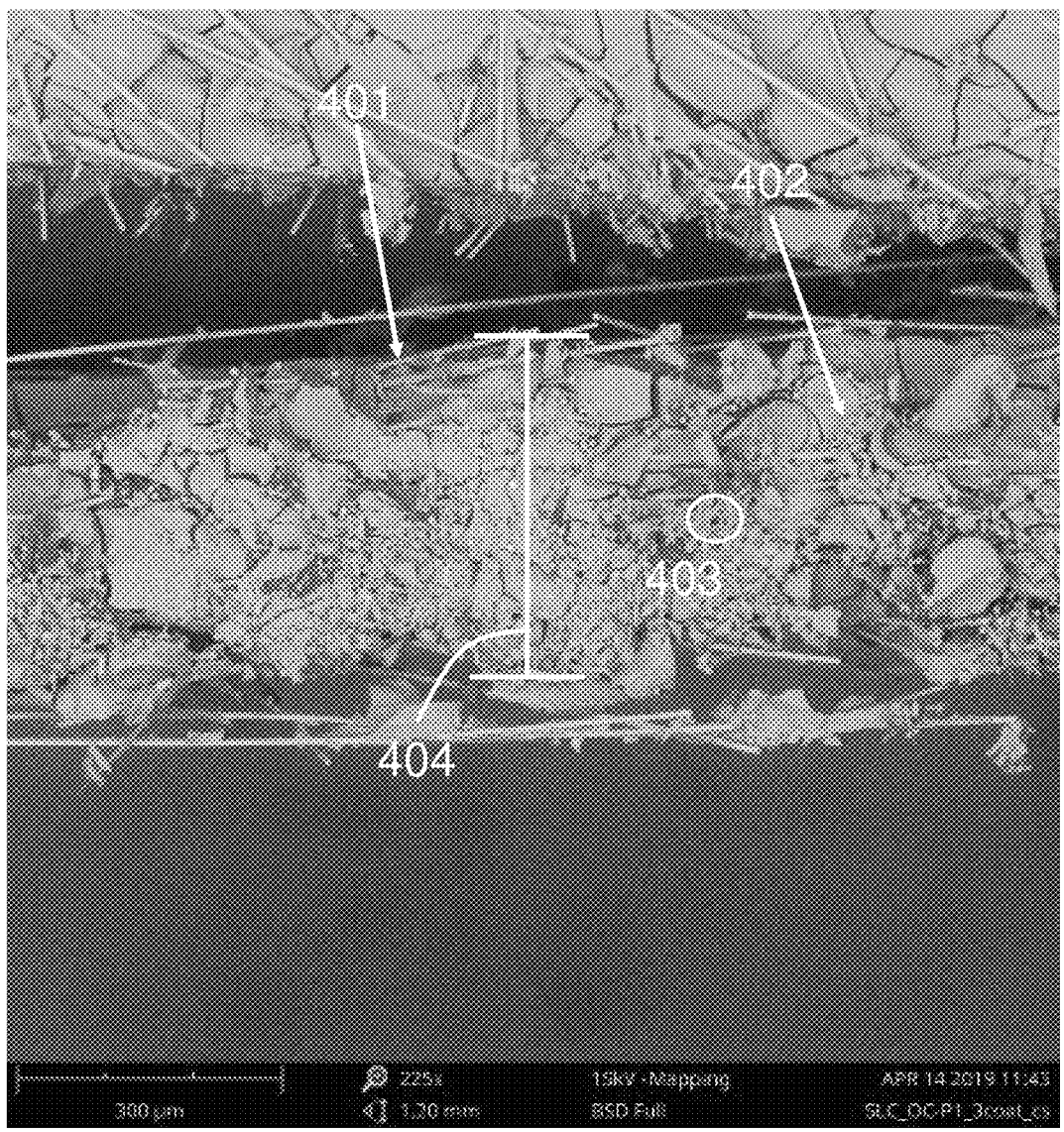
Figure 13C:
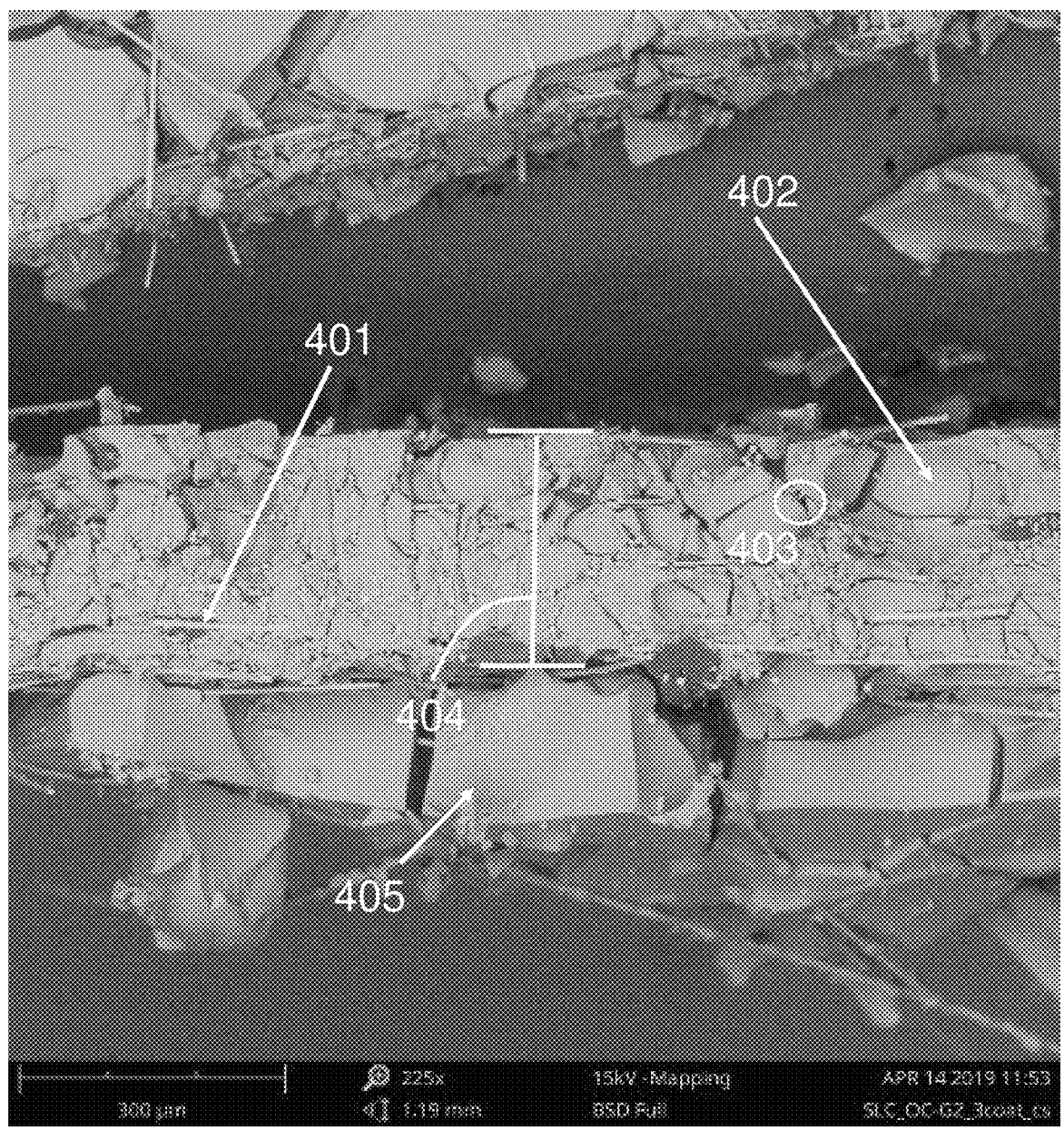
Figure 13D:
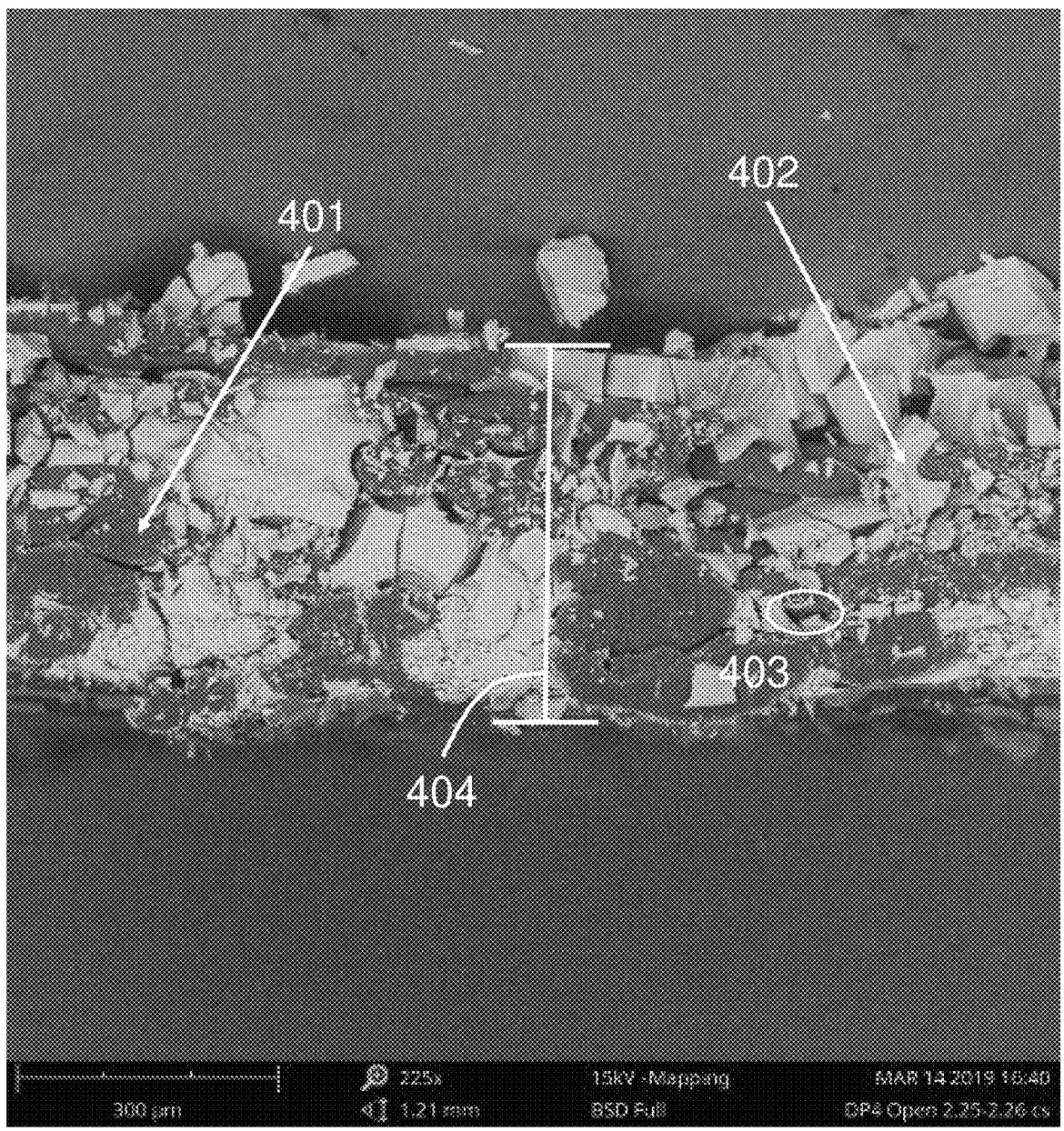
Figure 13E:
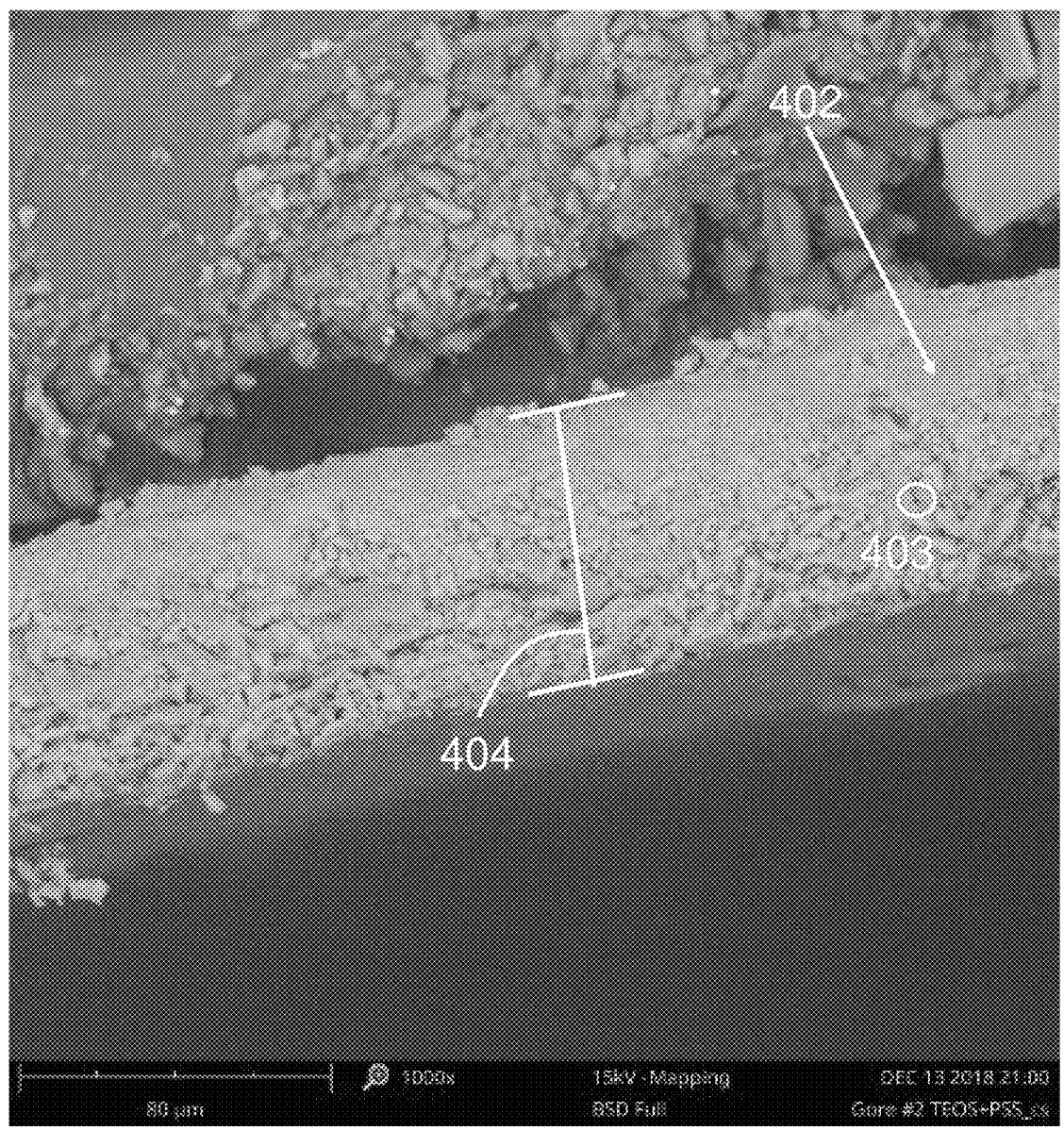

FIG. 12A shows cation exchange capacity as a function of TEOS:MPTES mass ratio and water:silicon molar ratio. Increasing the amount of MPTES increases the number of sulfonic acid groups that are present and therefore increases the cation exchange capacity within the measured range of TEOS:MPTES ratios. As seen in Example 6, the lower the water:silicon value, the higher the cation exchange capacity. FIG. 12B shows the density of cation exchange membranes as a function of the TEOS:MPTES mass ratio and water:silicon molar ratio. The acid concentration was held constant. Changing the TEOS:MPTES mass ratio does not show a large effect on the density of the membrane. As seen earlier in Example 6, the lower the water:silicon ratio, the higher the density. FIG. 12C shows cation exchange capacity as a function of TEOS:MPTES mass ratio and using water:silicon molar ratio of 2:1 (i.e., R=2). FIG. 12C indicates that while the cation exchange capacity increases with increasing MPTES content in the solution of TEOS:MPTES up until a certain point, at even higher ratios of MPTES, the cation exchange capacity begins to decrease (see data points at TEOS:MPTES mass ratio of 40:60 and 50:50).

Example 8

This example shows characterization of exemplary cation exchange membranes. Multiple materials with different structures were investigated as porous support membranes for the silica-based ceramic. Porous support membranes were screened with comparable formulations of the silica-based ceramic prepared through the co-condensation and subsequent gelation of tetraethyl orthosilicate (TEOS) with (3-mercaptopropyl)triethoxysilane (94% pure, MPTES) in the presence of acidic water. Specifically, TEOS was stirred with MPTES (80/20 by mass) with 0.3 M HCl (2 mol Si:1 mol $H_2O$) on a hotplate at 40° C. for 4 hours. After mixing the solution containing the silicon-containing precursors, the solution was one phase, and a known volume (50 µL/cm²) of the solution was either dropcast on the porous support membrane or the porous support membrane was submerged in an excess of the solution for greater than 5 minutes but less than 1 hour.

SEM was used to determine if the amount the silica-based ceramic filled the macropores of the porous support membrane was sufficient without having excess silica-based ceramic material on the resulting membrane surface. The cation exchange membranes fabricated in this example included samples with a porous support membrane that showed incomplete macropore filling (e.g., one sample had silica-based ceramic filling 75% of the pore volume of the porous support and a thickness of surface excess: 0 microns), complete macropore filling with little surface excess (e.g., one sample had silica-based ceramic filling 99% of the pore volume of the porous support and a thickness of surface excess of 0-50 microns), and complete macropore filling with surface excess of silica-based ceramic (e.g., one sample had silica-based ceramic filling >99.5% of the pore volume of the porous support and thickness of surface excess of 100-200 microns).

Additionally, the cation exchange membranes fabricated included samples with complete macropore filling without significant excess ceramic on support structures composed of other materials. For example, a cation exchange membrane with a woven glass fiber porous support membrane had silica-based ceramic filling 98% of the pore volume of the porous support and thickness of surface excess of 0-130 microns. A cation exchange membrane with a polypropylene porous support membrane had silica-based ceramic filling 96% of the pore volume of the porous support and a thickness of surface excess of 0-80 microns). A cation exchange membrane with a polytetrafluoroethylene porous support membrane had silica-based ceramic filling >99.9% of the pore volume of the porous support membrane and a thickness of surface excess of 0-10 microns. Successful membranes were prepared using woven and non-woven support structures composed of glass fibers, polypropylene, polyethylene, polytetrafluoroethylene, and cellulose. Their porosities ranged from 55% to 99% and thicknesses ranged from 35 µm to 460 µm. FIGS. 13A-E are annotated SEM images of exemplary cation exchange membranes. The annotations indicate the porous support fibers 401, silica-based ceramic in the form of silica-based ceramic 402, unfilled void in porous support 403, membrane thickness 404, and surface excess 405.

Example 9

This example shows comparisons of the mechanical burst properties of various cation exchange membranes. The cation exchange membranes were fabricated by wicking a sol-gel mixture with porous support membranes and forming self-assembled silica-based ceramics comprising nanopores within the confines of the porous support membranes. Two potential porous support membranes tested were polypropylene-based and non-woven glass fiber-based porous support membranes. To perform mechanical burst tests, uncoated porous support membranes were first cut to 40 mm diameter disks and were edged with UV/visible light-cure alkoxy silicone prior to the sol-gel process. This built-in edging was about 2.5 mm wide and served as a gasket when clamped tightly by rings on both sides.

The polypropylene-supported cation exchange membranes were made on polypropylene porous support membranes, with a nominal thickness of 220 µm. The uncoated porous support membranes were first soaked in fresh 50 mL of tetraethyl orthosilicate (TEOS): (3-mercaptopropyl)triethoxysilane (MPTES) solution (mass ratio 80:20, molar ratio of water:silicon-containing precursor equaled 2:1, pH=0.523) for 10 min. The coated porous support membranes were allowed to dry in a fume hood for 20 hours, and then a second coating was applied by soaking in freshly made TEOS:MPTES solution (same composition) for 10 min. The coated porous support membranes were then dried again in the fume hood for 20 hours. A 20% by volume $H_2O_2$ solution was used to oxidize the resulting membranes by soaking them for 24 hours. The resulting oxidized membranes were then rinsed and kept hydrated in deionized water.

Non-woven glass fiber-based cation exchange membranes were made on non-woven glass fiber porous support membranes, with a typical thickness of 460 µm, porosity of around 60%, and density around 0.2 g/cm$^3$. The uncoated porous support membranes were first soaked in fresh 50 mL of TEOS:MPTES solution (mass ratio 80:20, molar ratio of water to silica equaled 2:1, pH=0.523) for 5 min. The coated membranes were allowed to dry in a fume hood for 20 hours, and then a second coating was applied by soaking the coated porous support membrane in freshly made TEOS:MPTES solution (same composition) for 10 min. The coated porous support membranes were then dried again in the fume hood for 20 hours. A 20% by volume $H_2O_2$ solution was used to oxidize the resulting membranes by soaking them for 24 hours. The resulting membranes were then rinsed and kept hydrated in deionized water.

Figure 14:
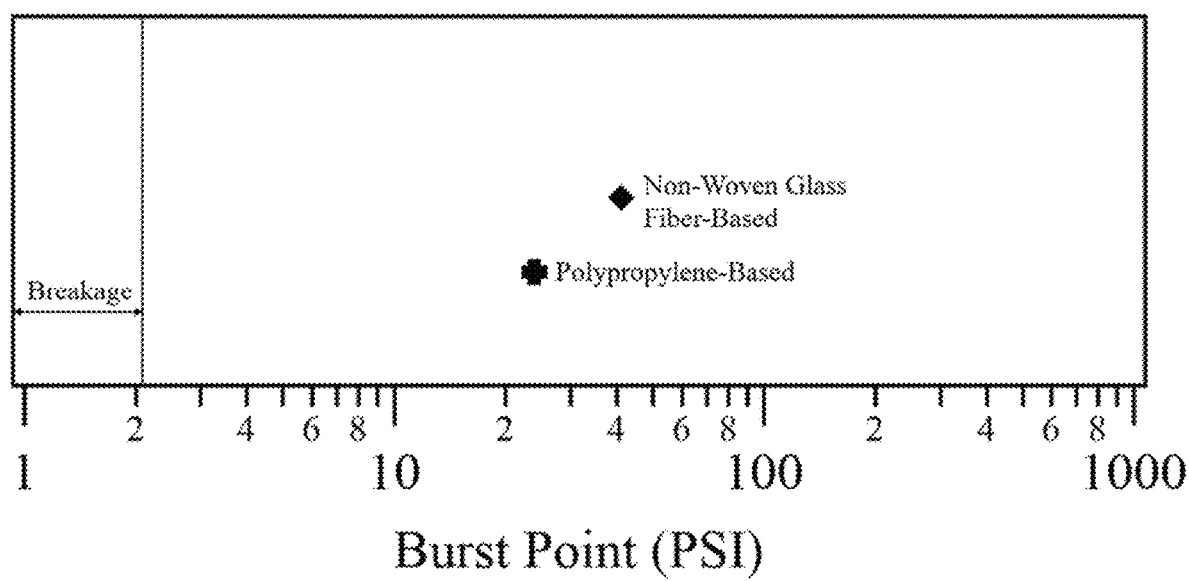
FIG. 14 shows mechanical burst test results for exemplary cation exchange membranes, according to some embodiments.

The average mechanical burst strength of polypropylene-supported and non-woven glass fiber-supported membranes were tested to be 23.9±1.6 PSI and 41.0±1.2 PSI, respectively. While these membranes had a lower mechanical burst strength than a commercially available polymer membrane (Nafion 212), this result does not impede their operation in a stack environment. The mechanical burst strengths of the polypropylene-supported and non-woven glass supported membranes are summarized in FIG. 14, along with the standard breakage burst pressure point of 2.1 PSI. This example shows that cation exchange membrane mechanical properties are, in some cases, tied to the porous support membrane itself. A thicker and more robust non-woven glass porous support membrane showed better mechanical properties than thinner polypropylene for the same TEOS:MPTES formulation. In addition to thickness, the presence of binder, material type and structure (e.g., cell or weave) can impact mechanical properties.

Example 10

Figure 15A:
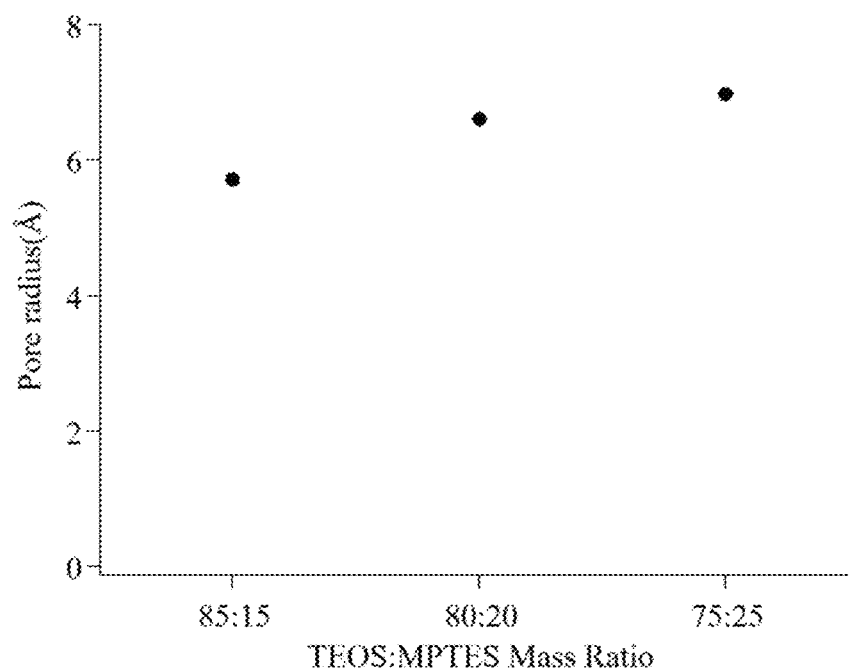
FIGS. 15A-15B show pore radius and volumetric porosity data of exemplary cation exchange membranes as a function of TEOS:MPTES mass ratio, according to some embodiments.
Figure 15B:
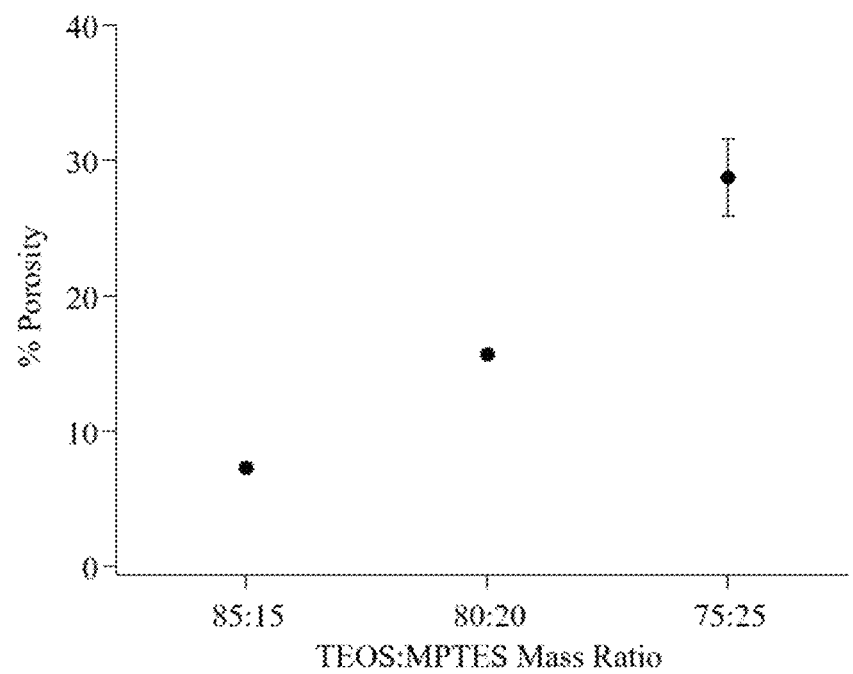
Figure 15C:
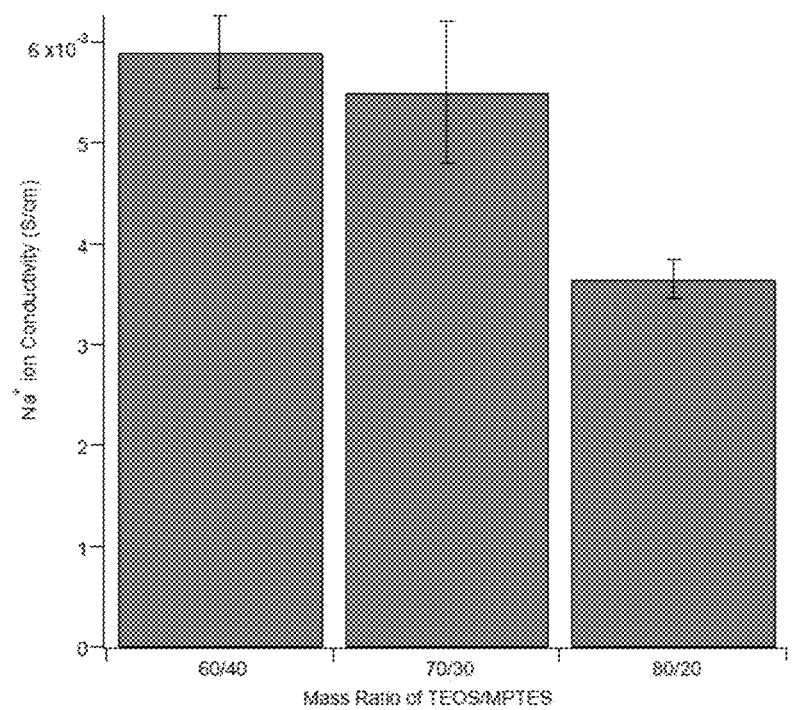
FIG. 15C shows sodium ion conductivity data of exemplary cation exchange membranes comprising a polymer porous support membrane with various mass ratios of TEOS to MPTES made with 3 sol-gel coatings, according to some embodiments.
Figure 15D:
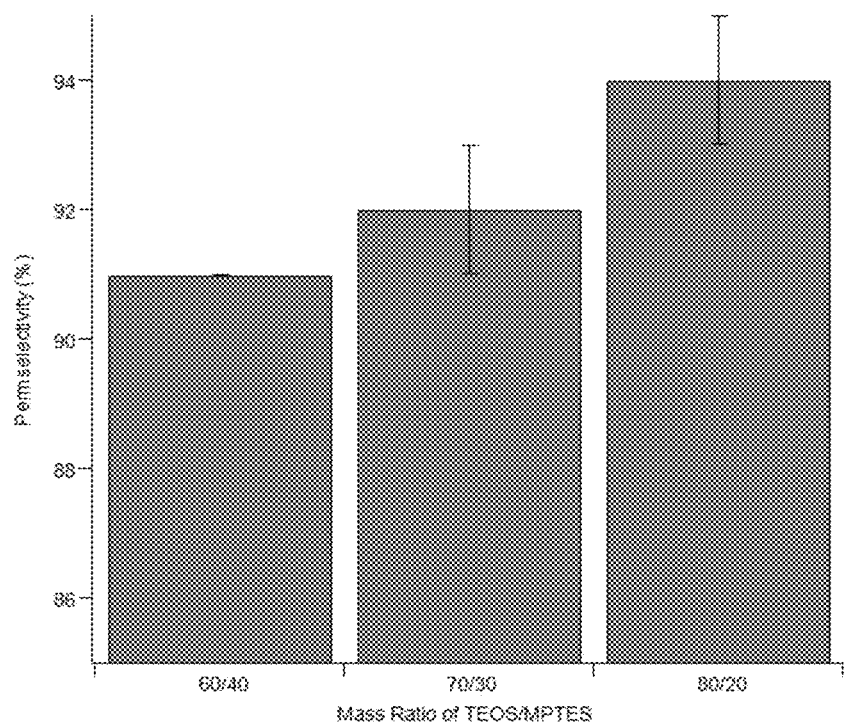
FIG. 15D shows permselectivity data of exemplary cation exchange membranes comprising a polymer porous support membrane made from sols having various mass ratios of TEOS to MPTES made with 3 sol-gel coatings, according to some embodiments.

This example shows structural properties of various cation exchange membranes. The cation exchange membranes of this example were fabricated on non-woven glass porous support membranes with polymer edging according to the following procedure. The porous support membranes were made from borosilicate glass fibers without a binder, with an average (mean) pore size of 1 micron. The porous support membranes were initially 254 microns thick prior to sol-gel impregnation. The porous support membranes were initially edged with a UV curable silicone to form a disk with an outer diameter of 35 mm and an inner active area diameter between 10 mm-15 mm. An initial mixture containing varying mass ratio of TEOS:MPTES (85:15, 80:20 and 75:25, 70:30, 60:40) were prepared and 0.3 M hydrochloric acid was added to each to achieve a final water:silicon molar ratio between 2:1. Each mixture was agitated and heated to 40° C. for 4 hours before being applied to the porous support membranes. The coated porous support membranes were allowed to dry overnight, and then a second coat was applied following the same procedure. The resulting cation exchange membranes were oxidized in 20% hydrogen peroxide for 24 hours at ambient temperatures prior to testing. SAXS analysis showed that the cation exchange membranes had an increasing trend in porosities from 7% to 30% and a slight increase in pore radius of the silica-based ceramic from 5.7 Å to 7.0 Å as the TEOS:MPTES mass ratio changed from 85:15 to 75:25, as shown in FIGS. 15A and 15B. FIG. 15C shows sodium ion conductivity measurements, indicating that sodium ion conductivity decreased as the TEOS:MPTES mass ratio changed from 60:40 to 80:20. FIG. 15D shows permselectivity measurements, indicating that permselectivities increase as the TEOS:MPTES mass ratio changed from 60:40 to 80:20.

Example 11

This example shows structural properties of various cation exchange membranes. The cation exchange membranes of this example were fabricated on non-woven porous support membranes with polymer edging according to the following procedure. The porous support membranes were made from polypropylene, with an average (mean) pore size of 5 microns. The porous support membranes were initially 190 microns thick prior to sol-gel impregnation. An initial mixture of MPTES and TEOS containing varying mole percentages of MPTES and (5 mol %, 10 mol %, 15 mol %, 25 mol %, 30 mol %, 35 mol %, 40 mol %) were prepared and 0.3 M hydrochloric acid was added to each to achieve a final water:silicon molar ratio between 2:1. Each mixture was agitated and heated to 40° C. for 1 hour before being applied to the porous support membranes. The coated porous support membranes were allowed to dry overnight, and then three additional coats were applied following the same procedure. The resulting cation exchange membranes were oxidized in 20% hydrogen peroxide for 24 hours at ambient temperatures prior to testing.

Figure 16A:
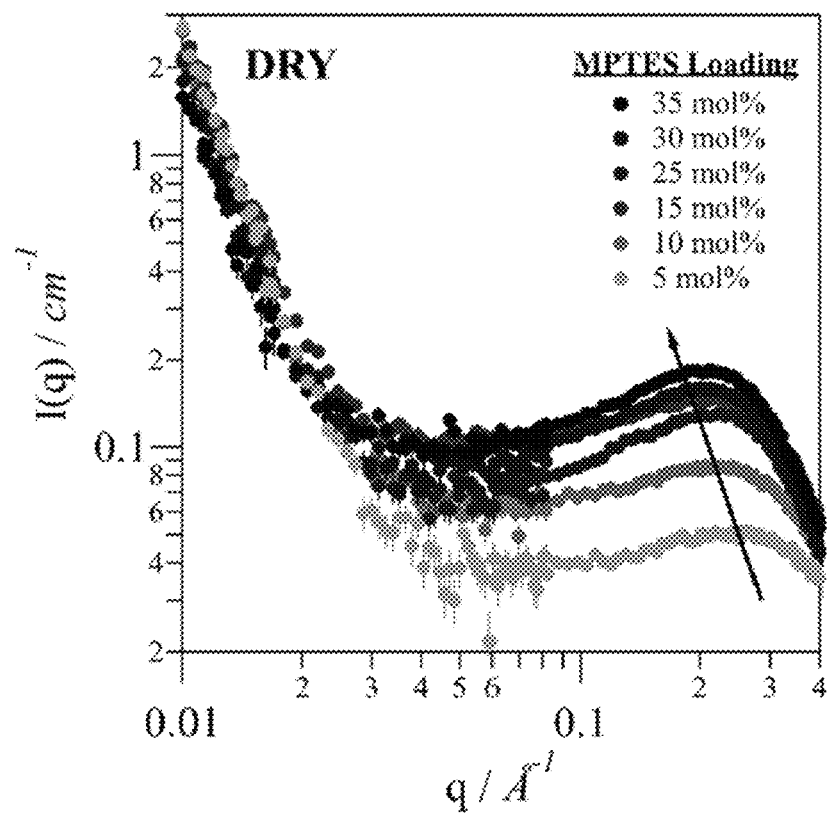
FIG. 16A shows small angle neutron scattering (SANS) data of dry exemplary cation exchange membranes made from sols having various mole percentages of MPTES, according to some embodiments.
Figure 16B:
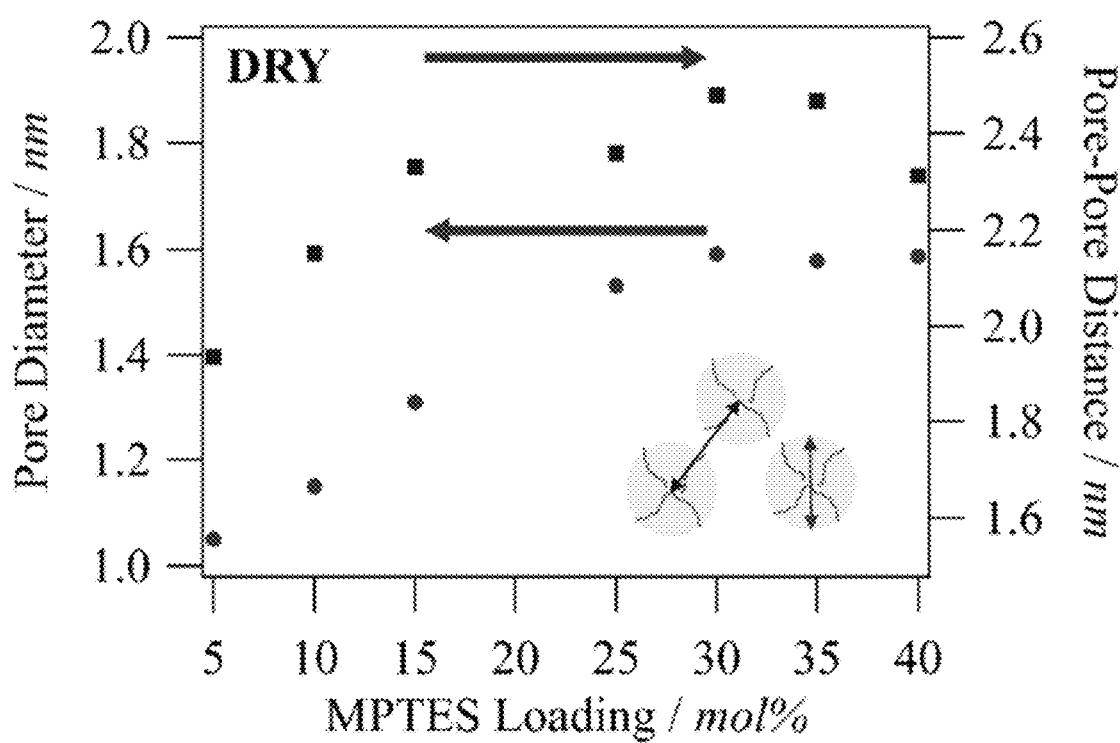
FIG. 16B shows pore diameter and pore-pore distance measurements from small angle neutron scattering (SANS) data of dry exemplary cation exchange membranes made from sols having various mole percentages of MPTES, according to some embodiments.
Figure 16C:
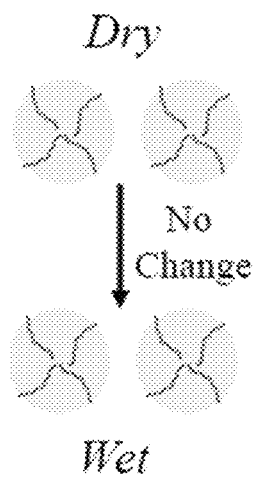
FIGS. 16C-16F shows small angle neutron scattering (SANS) data of dry and hydrated exemplary cation exchange membranes made from sols having various mole percentages of MPTES, according to some embodiments.
Figure 16C:
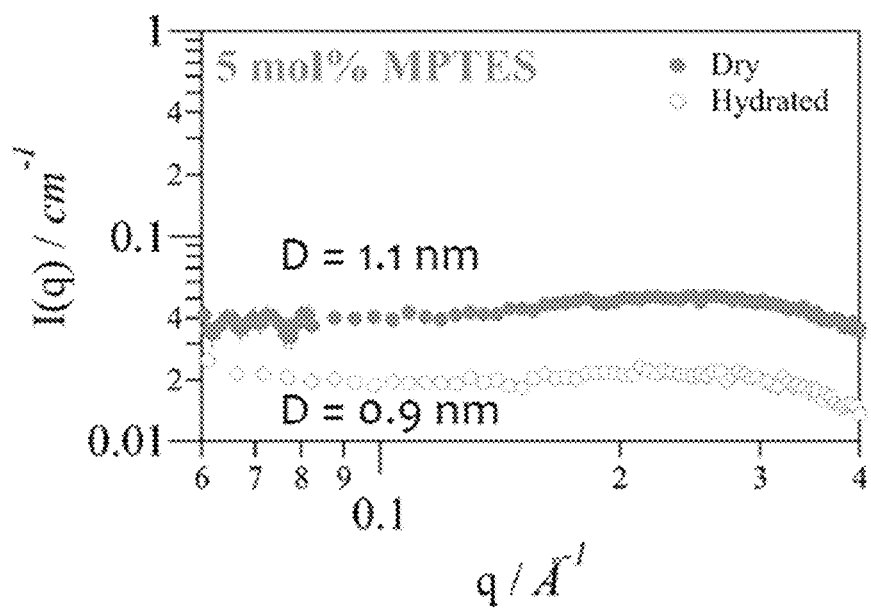
Figure 16D:
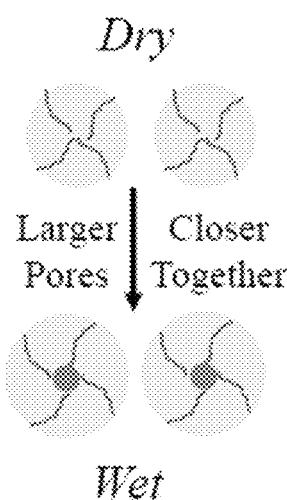
Figure 16D:
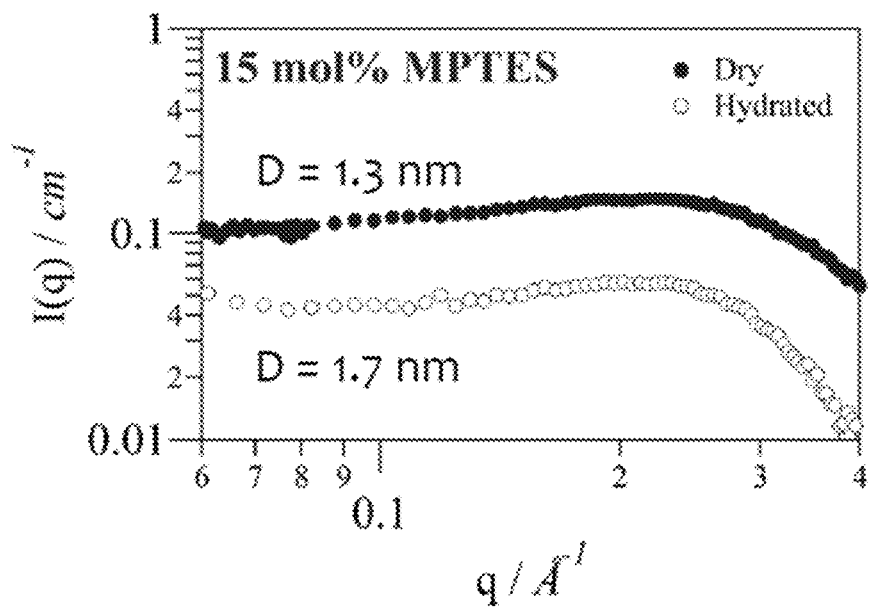
Figures 16E, 16F:
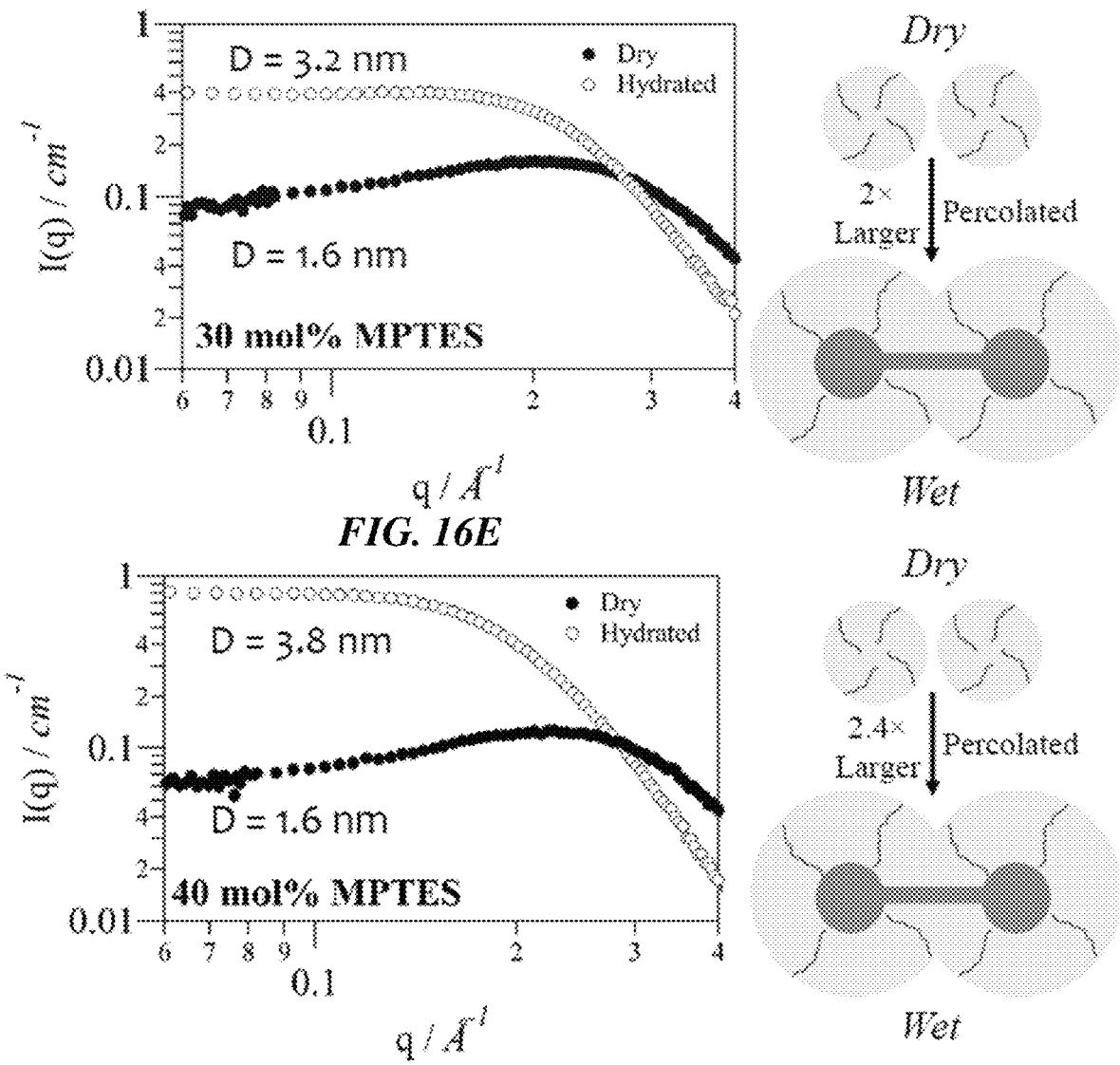

Small angle neutron scattering (SANS) experiments were performed on each cation exchange membrane in both a dry state and in a hydrated state. FIG. 16A shows one-dimensional SANS data each membrane in a dry state. The dry cation exchange membranes each displayed a peak, and membranes derived from high MPTES loadings tended to have peaks at lower q values. FIG. 16B shows measured average pore diameters (circles) and pore-pore distances (squares) for the dry membranes derived from fits of the SANS data using a Teubner-Strey model as described above. FIG. 16B shows a trend of higher MPTES loadings leading to greater pore diameters and pore-pore distances in the dry state.

FIGS. 16C, 16D, 16E, and 16F show comparisons of SANS data for the membranes (5 mol %, 15 mol %, 30 mol %, and 40 mol % MPTES, respectively) in their dry state (solid circles) and hydrated state (open circles). This data indicated that for low MPTES loadings such as 5 mol %, little to no change in pore structure (e.g., pore diameter, mathematical model) was observed between the dry and hydrated states. However, at the higher 15 mol % MPTES loading, the pore diameter increased from 1.3 nm to 1.7 nm upon hydration while the pores maintained a structure fitting a Teubner-Strey model. Surprisingly, at MPTES loadings of 30 mol % and 40 mol %, the pore diameters increased significantly upon hydration (by a factor of 2 and 2.4, respectively). Further, at these higher MPTES loadings of 30 mol % and 40 mol %, the pore structure of the silica-based ceramic changed from following a Teubner-Strey structure in the dry state to a core-shell structure in the hydrated state.

Figure 16G:
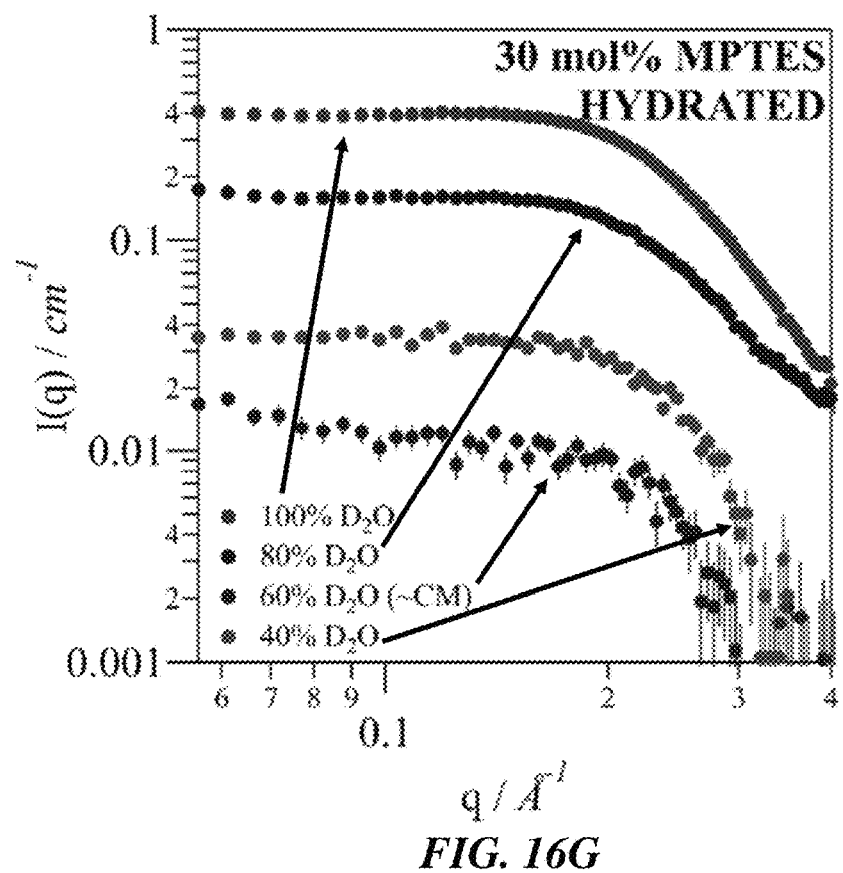
FIGS. 16G-16H shows small angle neutron scattering (SANS) data of hydrated exemplary cation exchange membranes made from sols having various mole percentages of MPTES as a function of percentage of deuterated water present, according to some embodiments.
Figure 16H:
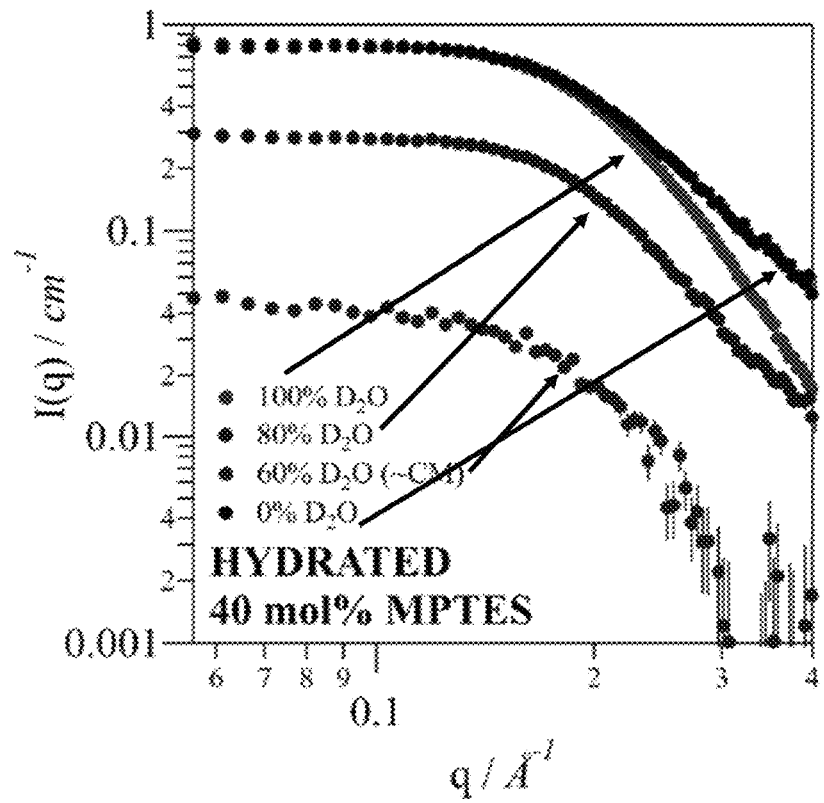

FIGS. 16G and 16H show SANS data for hydrated cation exchange membranes having 30 mol % and 40 mol % MPTES loading, respectively, as a function of percentage of deuterated water ($D_2O$) present. This data indicates a small shift in pore structure when deuterated water is present. This data also indicates that the membranes tested and shown in FIGS. 16G and 16H had a core-shell pore structure.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A cation exchange membrane, comprising: a silica-based ceramic, wherein the cation exchange membrane has a water uptake of greater than or equal to 10 wt % and a linear expansion, wherein the linear expansion is less than or equal to 10%.

2. The cation exchange membrane of claim 1, wherein the silica-based ceramic has an average pore diameter, wherein the average pore diameter is less than or equal to 10 nm.

3. The cation exchange membrane of claim 1, wherein the cation exchange membrane has a cation exchange capacity of greater than or equal to 0.01 meq/g.

4. The cation exchange membrane of claim 1, wherein the linear expansion is less than or equal to 5%.

5. The cation exchange membrane of claim 1, wherein the cation exchange membrane has a cation permselectivity of greater than or equal to 65%.

6. The cation exchange membrane of claim 1, wherein the cation exchange membrane has an osmotic water permeance of less than or equal to 100 mL/(hr·bar·m$^2$).

7. The cation exchange membrane of claim 1, wherein the silica-based ceramic has a silicon to carbon molar ratio, wherein the silicon to carbon molar ratio is greater than or equal to 1:100.

8. The cation exchange membrane of claim 7, wherein the silicon to carbon molar ratio is less than or equal to 3,000:1.

9. The cation exchange membrane of claim 2, wherein the average pore diameter is greater than or equal to 0.25 nm.

10. The cation exchange membrane of claim 1, wherein the cation exchange membrane has a volumetric porosity of greater than or equal to 1% and less than or equal to 70%.

11. The cation exchange membrane of claim 1, wherein the silica-based ceramic comprises pores, wherein the pores have an aspect ratio of less than or equal to 40:1.

12. The cation exchange membrane of claim 1, wherein the silica-based ceramic comprises pores, wherein the pores have an ordered structure.

13. The cation exchange membrane of claim 1, wherein the silica-based ceramic comprises pores, wherein the pores are substantially spherical.

14. The cation exchange membrane of claim 1, wherein the silica-based ceramic comprises pores, wherein the pores fit a spherical model of small angle scattering spectra with a $chi^2/N$ value of less than or equal to 10, where N is a number of small-angle scattering data points over a fitting range of the spherical model.

15. The cation exchange membrane of claim 1, wherein the silica-based ceramic has a fractal porous structure.

16. The cation exchange membrane of claim 1, wherein the silica-based ceramic comprises pores, wherein the pores have a log-normal polydispersity index of pore radius of less than or equal to 0.8.

17. The cation exchange membrane of claim 1, wherein the linear expansion is less than or equal to 0.5%.

18. The cation exchange membrane of claim 1, wherein the linear expansion is greater than or equal to 0.01%.

19. The cation exchange membrane of claim 1, wherein the cation exchange membrane has a cation permselectivity of greater than or equal to 85%.

* * * * *